(12) United States Patent
Savage

(10) Patent No.: US 7,441,200 B2
(45) Date of Patent: Oct. 21, 2008

(54) METHOD AND APPARATUS FOR DESIGNING, RENDERING AND PROGRAMMING A USER INTERFACE

(75) Inventor: Martin Savage, Montreal (CA)

(73) Assignee: Concepts Appsgo Inc., Montreal, Quebec (CA)

( * ) Notice: Subject to any disclaimer, the term of this patent is extended or adjusted under 35 U.S.C. 154(b) by 621 days.

(21) Appl. No.: 10/356,561

(22) Filed: Feb. 3, 2003

(65) Prior Publication Data

US 2003/0169293 A1  Sep. 11, 2003

Related U.S. Application Data

(60) Provisional application No. 60/384,375, filed on May 30, 2002.

(30) Foreign Application Priority Data

Feb. 1, 2002  (CA) .................... 2369854
May 30, 2002 (CA) .................... 2388101

(51) Int. Cl.
  *G06F 3/00* (2006.01)
  *G06F 9/00* (2006.01)
  *G06F 17/00* (2006.01)

(52) U.S. Cl. .................. 715/762; 715/744; 715/763; 715/764; 715/865; 715/866; 715/864

(58) Field of Classification Search .............. 715/762, 715/744, 763, 764, 765, 760, 746, 749, 864, 715/865, 866
See application file for complete search history.

(56) References Cited

U.S. PATENT DOCUMENTS

| | | | |
|---|---|---|---|
| 5,179,657 A | 1/1993 | Dykstal et al. | |
| 5,542,034 A * | 7/1996 | Petler | 716/1 |
| 5,596,702 A | 1/1997 | Stucka et al. | |
| 5,678,039 A | 10/1997 | Hinks et al. | |
| 5,786,815 A | 7/1998 | Ford | |
| 5,901,313 A | 5/1999 | Wolf et al. | |
| 6,005,568 A | 12/1999 | Simonoff et al. | |
| 6,020,881 A * | 2/2000 | Naughton et al. | 715/740 |
| 6,023,271 A | 2/2000 | Quaeler-Bock et al. | |
| 6,078,322 A * | 6/2000 | Simonoff et al. | 715/744 |
| 6,144,377 A | 11/2000 | Oppermann et al. | |
| 6,154,786 A | 11/2000 | Williamson et al. | |
| 6,185,600 B1 * | 2/2001 | Spence et al. | 709/203 |
| 6,195,091 B1 | 2/2001 | Harple et al. | |
| 6,208,994 B1 * | 3/2001 | Abdelnur | 707/103 R |
| 6,222,537 B1 | 4/2001 | Smith et al. | |
| 6,292,186 B1 | 9/2001 | Lehman et al. | |
| 6,342,907 B1 | 1/2002 | Petty et al. | |
| 6,353,445 B1 | 3/2002 | Babula et al. | |
| 6,496,202 B1 * | 12/2002 | Prinzing | 715/762 |
| 6,788,315 B1 * | 9/2004 | Kekic et al. | 715/733 |

(Continued)

*Primary Examiner*—Denniis-Doon Chow
*Assistant Examiner*—Anita D Chaudhuri
(74) *Attorney, Agent, or Firm*—McCarthy Tétrault LLP

(57) ABSTRACT

A method of displaying a user interface, comprising the steps of first obtaining a representation of the user interface. The representation includes conceptual components representing multi-dimensional arrays of elements of the user interface. The conceptual components include a vector parameter related to a multi-dimensional size of the array, and matrices having dimensions related to those of the array.

The method proceeds by executing a device-specific rendering algorithm on the representation of the user interface and displaying the user interface on the device.

35 Claims, 44 Drawing Sheets

U.S. PATENT DOCUMENTS

| | | | |
|---|---|---|---|
| 2002/0180784 A1* | 12/2002 | Brousssard | 345/744 |
| 2003/0046401 A1* | 3/2003 | Abbott et al. | 709/228 |
| 2003/0063120 A1* | 4/2003 | Wong et al. | 345/746 |
| 2003/0067485 A1* | 4/2003 | Wong et al. | 345/747 |
| 2003/0067489 A1* | 4/2003 | Candy Wong et al. | 345/765 |
| 2003/0070061 A1* | 4/2003 | Wong et al. | 712/220 |
| 2004/0163046 A1* | 8/2004 | Chu et al. | 715/517 |
| 2005/0246644 A1* | 11/2005 | Broussard | 715/746 |

* cited by examiner

| | | |
|---|---|---|
| 40 | A B<br>C D | Figure 5A |
| | | |
|---|---|---|
| | Yes No<br>No Yes | 42<br>Figure 5B |
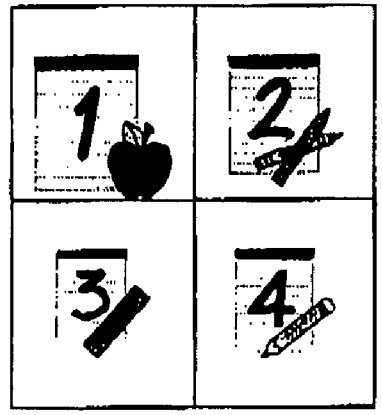
44 — Figure 5C
| | | |
|---|---|---|
| | { } { }<br>{ } { } | 46<br>Figure 5D |

| CC | | | | 60 |
|---|---|---|---|---|
| Data | | 105 | Modification Methods | 110 |
| Base d-size | | 150 | Initialization time<br>int insert(dnum start, dnum range)<br>int remove(dnum start, dnum range) | 155<br>160 |
| Constant Flags | | 175 | Initialization time | |
| End-User Resize Flags | | 180 | | |
| Directions | | 185 | | |
| Default Action Flag | | 190 | | |
| Tree Flag | | 192 | | |
| Semantic Type | | 195 | | |
| User-Defined Flags | | 200 | | |
| Labels Matrix 115 | String Max Length | 215 | | |
| | Bitmap Size | 220 | | |
| | Buffered Storage System OR | 225 | | |
| | Default Storage System OR | 230 | int setlabel(char *label, dnum index = dnumnull)<br>int setbitmap(Bitmap *bitmap, dnum index = dnumnull) | 235<br>240 |
| | User-Defined Storage System | 245 | int updatelabels(dnum pos, dnum range) | 250 |
| Read-Only Flags Matrix 120 | Constant Flag | 270 | Initialization time | |
| | Default Storage System OR | 275 | int setroflag(boolean flag, dnum index = dnumnull) | 280 |
| | User-Defined Storage System | 285 | int updateroflags(dnum pos, dnum range) | 290 |
| Images Matrix 125 | 2D size (width and height) | 320 | Initialization time | |
| | Default Storage System | 325 | Text & Graphical Commands (line, circle, bitmap generation, setfont, setpos... and dnum index = dnumnull as last parameter) | 330 |
| | User-Defined Storage System | 335 | int updatevalues(dnum pos, dnum range) | 340 |

Figure 9

| Container CC | | | 72 |
|---|---|---|---|
| Data | 105 | Modification Methods | 110 |
| Children Set | 365 | Initialization time | |
| Children Direction | 370 | | |
| Select CC Flag | 375 | | |
| Selected CC | 378 | int selectcc(int childindex) | 385 |
| Instances Matrix 360 — Matrix of instances of Children Set 365 | | int updatevalues(dnum pos, dnum range) | 395 |

Figure 10A

| Control CC | | | 74 |
|---|---|---|---|
| Data | 105 | Modification Methods | 110 |
| States Matrix | 405 | Initialization time<br>Matrix-related methods (insert, remove, setlabel, setbitmap, ...) | 410 |
| Selections Matrix 400 — Default Storage System | 420 | int setselection(dnum sel, dnum index = dnumnull) | 425 |
| Selections Matrix 400 — User-Defined Storage System | 430 | int updatevalues(dnum pos, dnum range) | 435 |

Figure 10B

| Text CC | | | 76 |
|---|---|---|---|
| Data | 105 | Modification Methods | 110 |
| Number of Dimensions | 455 | Initialization time | |
| Maximal Length | 460 | | |
| Text View | 465 | | |
| Texts Matrix 450 — Default Storage System | 470 | int settext(dnum pos, long lengthtoremove, char *string, long stringlength, dnum index = dnumnull) | 475 |
| Texts Matrix 450 — User-Defined Storage System | 480 | int updatevalues(dnum pos, dnum range) | 485 |

Figure 10C

| Control CC | | 70 |
|---|---|---|
| Data Members 105 | | Value 505 |
| Base d-size 150 | | {2} |
| Constant Flags 175 | | {TRUE} |
| End-User Resize Flags 180 | | {FALSE} |
| Directions 185 | | {w} |
| Default Action Flag 190 | | TRUE |
| Semantic Type 195 | | "" |
| User-Defined Flags 200 | | All 3 FALSE |
| Labels Matrix 115 | String Max Length 215 | 3 |
| | Bitmap Size (width and height) 220 | {0, 0} |
| | Strings (units of Labels Matrix 115, according to Buffered Storage System 225) | "me" "you" |
| Read-Only Matrix 120 | Constant Flag 270 | FALSE |
| Images Matrix 125 | 2D size (width and height) 320 | {0, 0} |
| States Matrix 405 | State d-size | {4} |
| | Constant Flags | {TRUE} |
| | End-User Resize Flags | {FALSE} |
| | Directions | {d} |
| | String Max Length | 1 |
| | Bitmap Size (width and height) | {0, 0} |
| | Strings (units of States Matrix 405) | "A" "B" "C" "D" |
| Selections Matrix 400 | End-User Selections (Default Storage System 420) | {1} {3} |

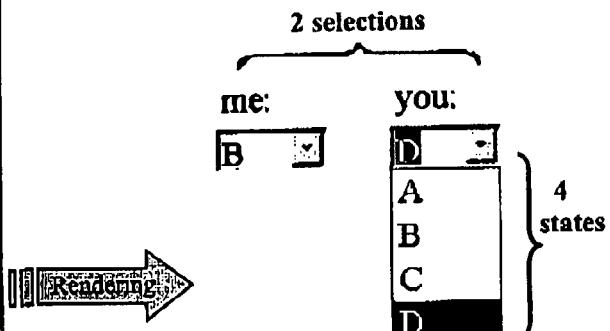

| Area | |
|---|---|
| Data | Type |
| Width | Integer |
| Height | Integer |

Figure 28A

| SC | |
|---|---|
| Data | Type |
| DC | DC |
| NumSCs | Integer |
| Child SC set | SC References |
| Surface | Area |
| Accumulated Surface | Area |
| Offset | Integer |
| Op | Operator (| or –) |

Figure 28B

| Unit | |
|---|---|
| Data | Type |
| SC | SC Reference |
| Pos | Integer |
| Op | Operator (| or –) |
| TopUnit | Unit Reference |
| NextUnit | Unit Reference |
| Surface | Area |

Figure 28C

| Evaluator | |
|---|---|
| Data | Type |
| InitFlag | Boolean |
| BestArea | Long |
| MinimalArea | Long |
| BestFibo | Long |

Figure 28D

| Line | |
|---|---|
| Data | Type |
| SC | SC Reference |
| Index | Integer |
| Offset | Integer |
| NumSCs | Integer |
| Op | Operator (| or –) |

Figure 28E

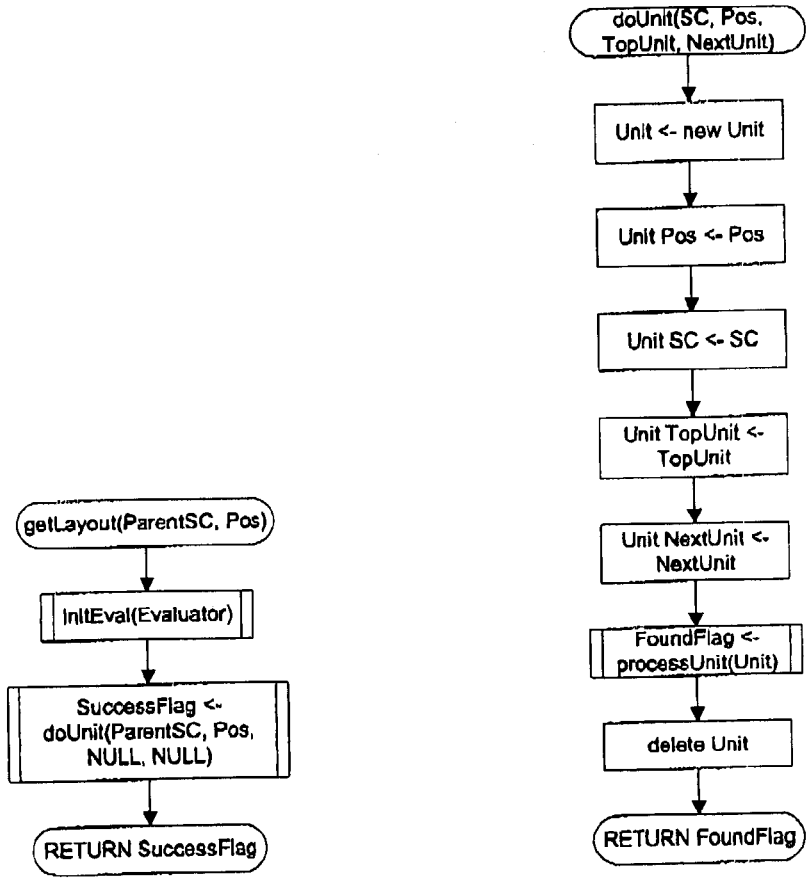
Figure 29A
Figure 29B
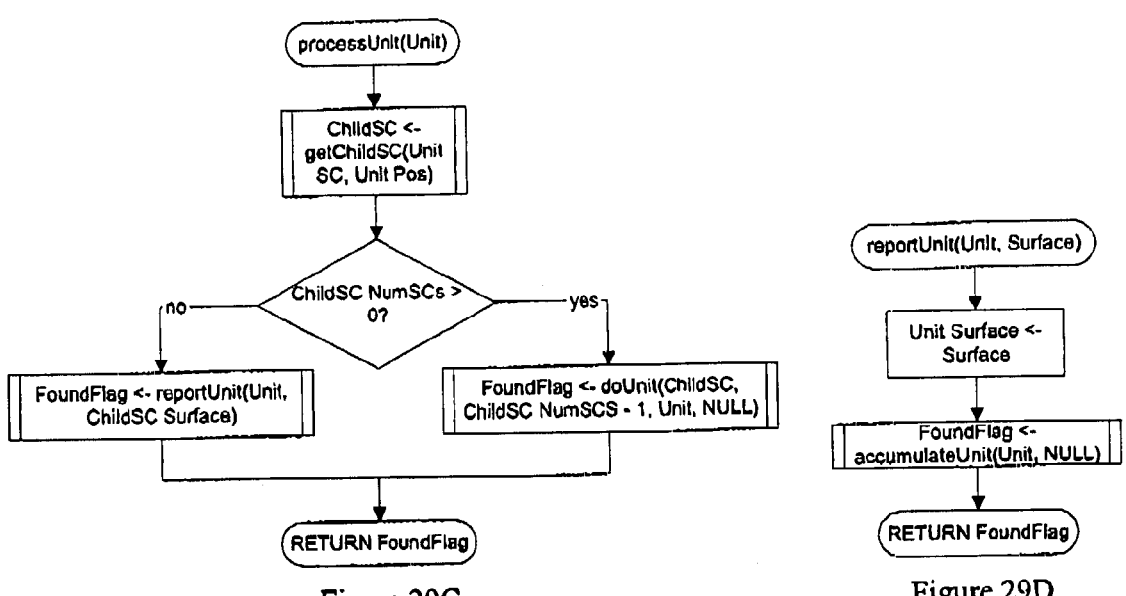
Figure 29C
Figure 29D

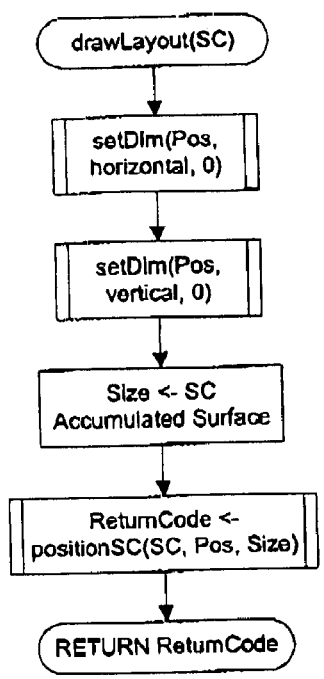
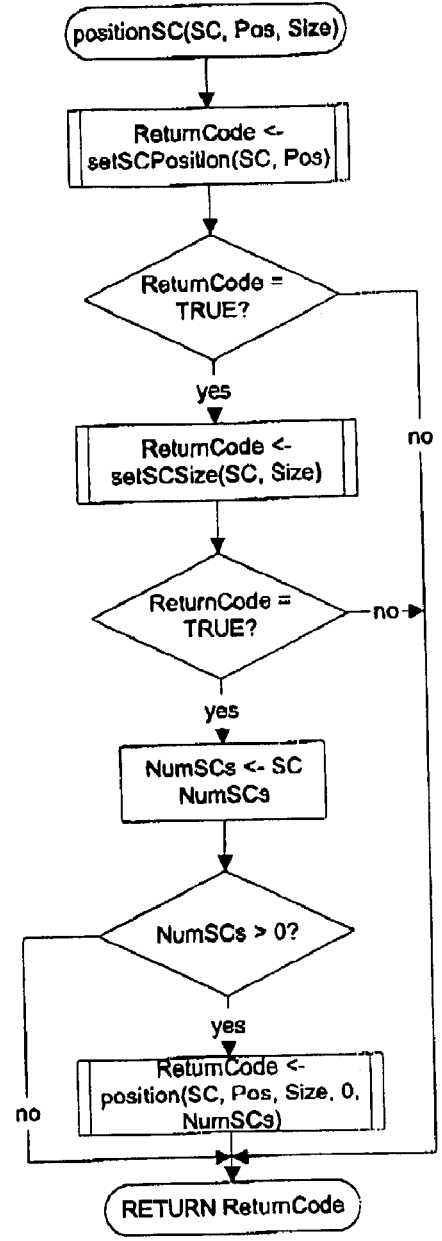
Figure 31A
Figure 31B

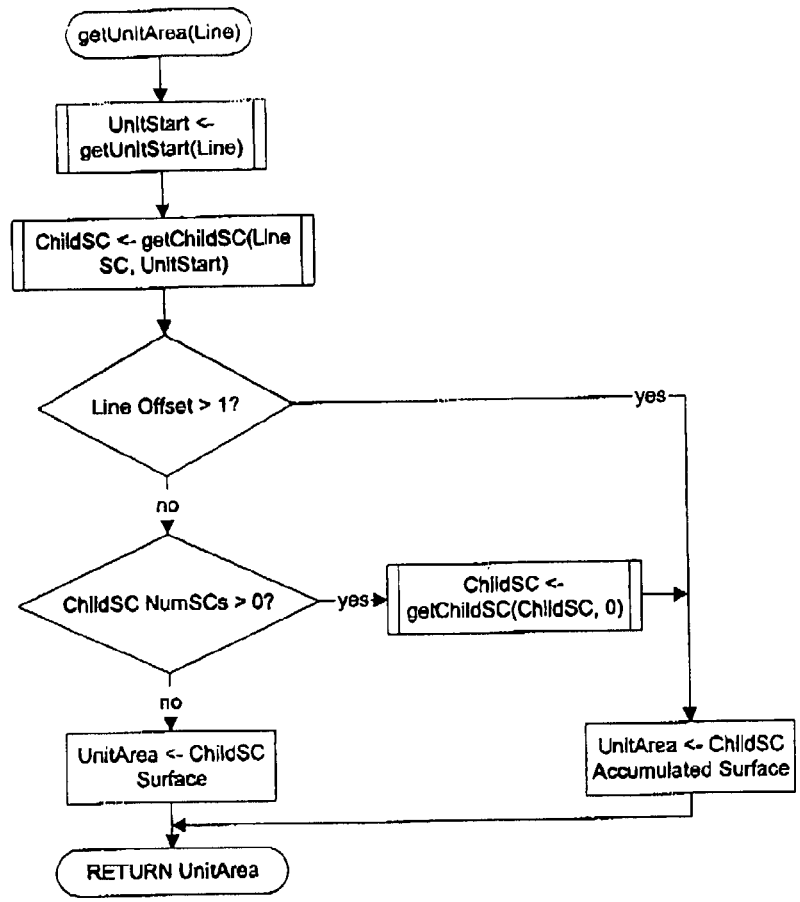
Figure 32C
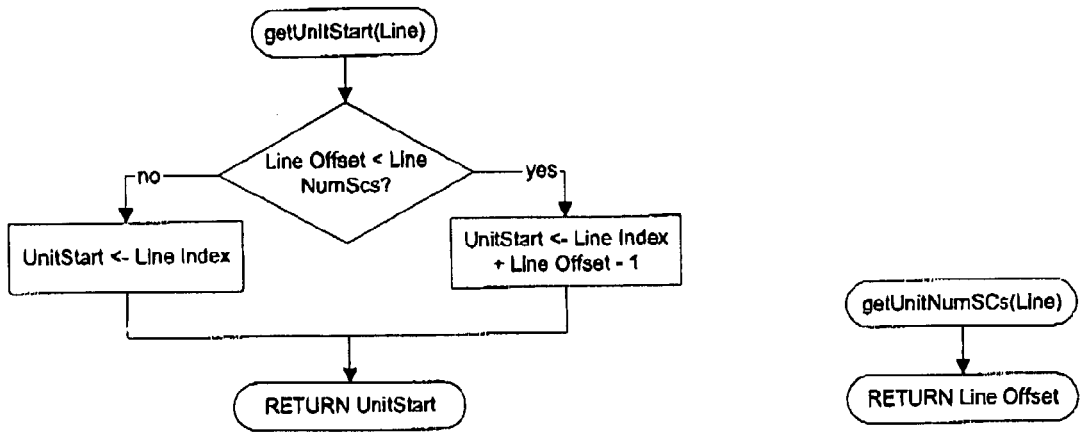
Figure 32D
Figure 32E

US 7,441,200 B2

METHOD AND APPARATUS FOR DESIGNING, RENDERING AND PROGRAMMING A USER INTERFACE

This application claims the benefit of U.S. Provisional Application No. 60/384,375 filed May 30, 2002, Canadian Application No. 2,369,854 filed May 30, 2002, and Canadian Application No. 2,388,101 filed Feb. 1, 2002, the contents of each of which are hereby incorporated by reference.

BACKGROUND OF THE INVENTION

1. Field of the Invention

The present invention relates to a method and apparatus for designing, rendering and programming a user interface.

2. Description of the Prior Art

Computer programs interact with their users through user interfaces, which translate user actions into input for the computer and present information to the user in human readable form. Such interfaces are usually designed to be easy to use. Each hardware device which runs the computer program may use a different interface. For example, Windows-based machines use a graphical user interface (GUI) which uses windows, menus and dialog boxes. These interfaces tend to show a lot of information and are typically the easiest to use. In smaller devices such as a cellular telephone, a personal digital assistant (PDA) or pager, the display is much smaller and the input device more limited. Accordingly, less sophisticated interfaces are usually used. Devices such as a PDA may still provide menus and windows to a certain extent, although the limited size inhibits them from using multiple windows. On a cell phone or pager with a very small display, windows may not be used at all.

One traditional way of designing user interfaces is by using specific components related to the development platform. The development platform can be a specific Operating System platform (such as Windows, Linux, or the Mac OS) or a specific device such as PDA, or a cell phone. For each of these platforms, a hierarchy of proprietary components is used, creating an incompatibility between each other. These components are usually related to visual capacities and specific capabilities of the target platform (components such as windows and buttons are common on GUIs whereas small menus are used on wireless devices), extending the incompatibility between GUIs and wireless interfaces. Moreover, they have inherent limitations: remote access is not available without external software and there is no multi-user collaboration functionality implemented.

In designing user interfaces, therefore, it is usual to design a separate interface for each type of device. In this way, the designer specifies the nature of the interface on each possible device. They must specify the location and type of each interface elements for each device. Naturally, this results in additional work for each device which is supported. Furthermore, it is difficult to support new or future devices if their capabilities are not yet known.

Mark-up languages such as HTML and XML are often used in Internet-based applications to work with several clients. However, the mark-up provides only one nominal view for the document. This view is usually not suitable for different types of devices. Web pages for PDA's and cell phones need to be created, and designed separately in WML rather than HTML to accommodate the limited interface. This requires additional design and development for each device of interest, and requires that the server know the destination device in order to choose the correct formatting.

Java is an attempt to overcome the GUI incompatibility by offering its adaptable set of proprietary components. However, Java still offers at least three sets of UI components: AWT/SWING for GUIs, J2ME for wireless devices and JTAPI for vocal access. It also doesn't really run remotely since applets must be downloaded first before running locally on the client.

None of the existing user interface components is really portable on different platforms creating a necessity of redesigning and recoding to support other existing platforms. All these incompatibilities between different user interfaces are noted in the following statement from the J2ME white paper:

"Consumer devices have substantial differences in memory size, networking, and user interface capabilities, making it very difficult to support all devices with just one solution."

SUMMARY OF THE INVENTION

In general terms, the present invention provides a conceptual user interface which may be rendered on any target device. By designing the interface with a universal definition, the interface may be displayed by any target device.

It will be appreciated that this may provide one solution that can support all devices whatever their differences are in memory size, networking and/or user interface capabilities. Users interfaces are not designed using specific components for specific target platforms; they are designed using three generic conceptual user interface components.

Using the generic conceptual components, user interfaces are designed according to the needs of the user not to the capabilities of a specific platform. The look and feel is rendered at run-time and depends on the targeted platform or device.

This methodology mitigates the problem of incompatibilities between the user interfaces of different platforms and also provides a new way of designing a user interface without having to think of where it will be deployed. The generic aspect and natural portability of the conceptual user interface generates a substantial relief for the software developers who are not obliged to understand the capabilities of the different platforms or devices. Instead, they may focus more on designing and defining the functionalities of the application than on accommodating it to run on specific platforms.

According to its conceptual nature, this invention mitigates the user interface incompatibilities for the existing platforms and devices and will accommodate future platforms or devices.

In accordance with one aspect of the present invention, there is a provided a method of displaying a user interface, comprising the steps of:

a) obtaining a representation of the user interface, the representation including conceptual components representing multi-dimensional arrays of elements of the user interface, said conceptual components including a vector parameter related to a multi-dimensional size of the array, and matrices having dimensions related to those of the array;

b) executing a device-specific rendering algorithm on the representation of the user interface;

c) displaying the user interface on the device.

In accordance with another aspect of the present invention, there is provided a method of encoding a user interface, comprising the steps of:

a) creating conceptual components representing a multi-dimensional array of elements of the user interface, said conceptual components including a vector parameter related to a multi-dimensional size of the array, and matrices having dimensions related to those of the array; and b) establishing connections between said conceptual components, said connections being indicative of relationships between said conceptual components.

In accordance with yet another aspect of the present invention, there is provided a method of selecting a layout for a user interface, comprising the steps of:

a) obtaining a semantic representation of the interface;
b) generating a plurality of parses of the interface;
c) measuring the suitability of each parse;
d) choosing a parse with high suitability.

In accordance with a further aspect of the present invention, there is provided a method of distributing a user interface to at least one of a plurality of client devices with differing input and output devices, said method comprising the steps of:

a) organizing the user interface into conceptual components representing multi-dimensional arrays of elements of the user interface, said conceptual components including a vector parameter indicative of a multi-dimensional size of the array, and matrices having dimensions corresponding to the array; and b) providing the representation of the user interface to at least one of the client devices to allow the client device to render the user interface using a selection of the matrices.

In accordance with a yet further aspect of the present invention, there is provided a data carrier containing processor executable instructions to instruct a processor to encode a user interface by:

a) creating conceptual components representing a multi-dimensional array of elements of the user interface, said conceptual components including a vector parameter indicative of a multi-dimensional size of the array, and matrices having dimensions corresponding to the array; and b) establishing connections between said conceptual components, said connections being indicative of relationships between said conceptual components.

In accordance with a still further aspect of the present invention, there is provided a server device for providing an application to client devices, the server device comprising:

a) an interface encoder for creating conceptual components representing a multi-dimensional array of elements of the user interface, said conceptual components including a vector parameter indicative of a multi-dimensional size of the array, and matrices having dimensions corresponding to the array; and for establishing connections between said conceptual components, said connections being indicative of relationships between said conceptual components.

In accordance with a yet still further aspect of the present invention, there is provided a client device for executing an application by providing output to a user and receiving input from the user, the client device comprising:

a) a processor;
b) a storage device containing processor implementable instructions for obtaining a representation of the user interface, the representation including conceptual components representing multi-dimensional arrays of elements of the user interface, said conceptual components including a vector parameter indicative of a multi-dimensional size of the array, and matrices having dimensions corresponding to the array;

b) a rendering engine operable on the representation of the user interface to produce a device-specific rendering of the user interface; and c) an output device for providing the rendering to the user.

BRIEF DESCRIPTION OF THE DRAWINGS

These and other features of the preferred embodiments of the invention will become more apparent in the following detailed description in which reference is made to the appended drawings wherein:

FIGS. 5A, 5B, 5C and 5D are schematic representations of data structures;

FIG. 9 shows the general data structure and the modification methods of the UI conceptual component;

FIGS. 10A, 10B and 10C respectively describe the data structure and modification methods of the container, control and text conceptual components;

FIG. 15 shows in a real example the interaction between the Selections Matrix and the States Matrix;

FIG. 16 shows, for a Control conceptual component, some possible renderings calculated from different combinations of States Matrix d-sizes, Bitmap Size and String Max Length values;

FIGS. 17A and 17B illustrate in a real example of the Children Direction influence on the rendering of a Container CC;

FIG. 28A to FIG. 28E show types used to design the GUI layout algorithm;

FIG. 31A to FIG. 31D show, using flowcharts, a layout display algorithm;

FIG. 32A to FIG. 32E show, using flowcharts, Line methods used in the layout display algorithm.

DESCRIPTION OF THE PREFERRED EMBODIMENTS

Figure 1:
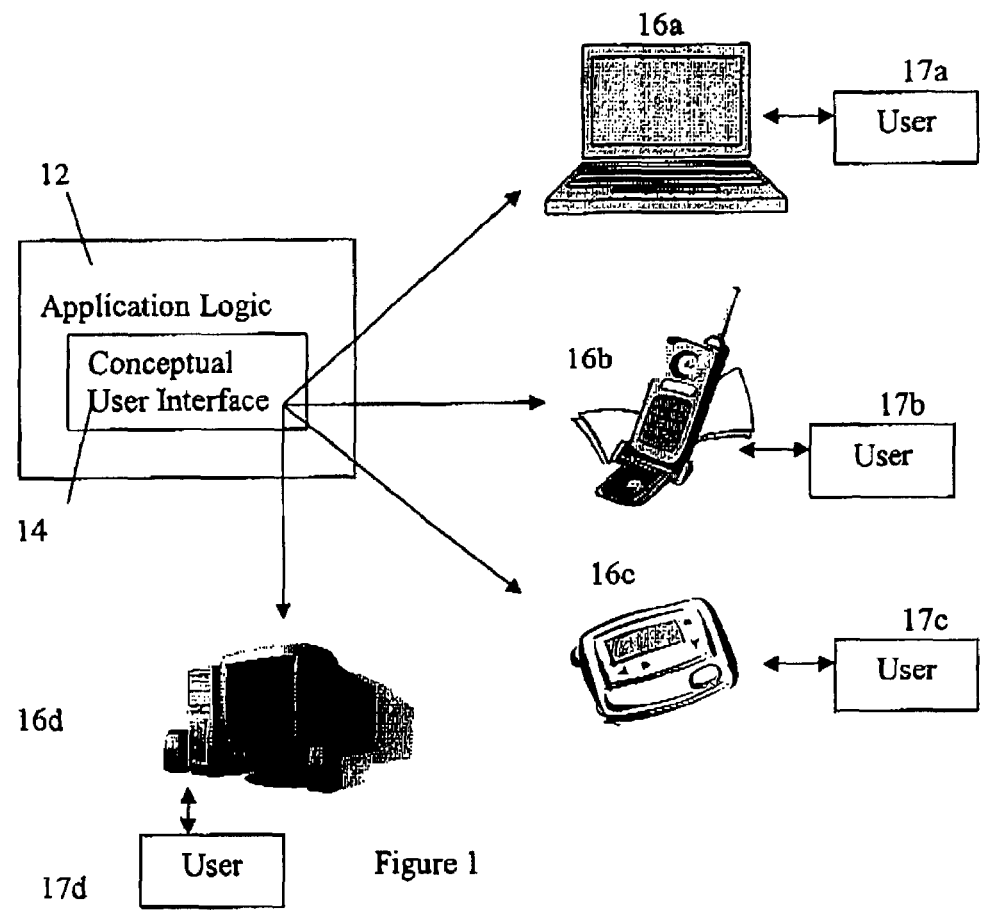
FIG. 1 is a schematic representation of an application for use with devices.

Referring to FIG. 1, an application environment is shown generally by the numeral 10. In this example, an application 12 incorporates a user interface 14. Users of various devices 16a, 16b, 16c, and 16d are used to run the application 12. The devices may be connected to the application 12 through a network, or alternations may be directly connected thereto. The application 12 may be incorporated into the devices 16. The users interact with the application 12 through the interface 14. The devices 16a, 16b, 16c, and 16d may include stand alone computers, laptops, cellular telephones, pagers, and the like. Each of these devices has different capabilities in its interface.

Figure 2:
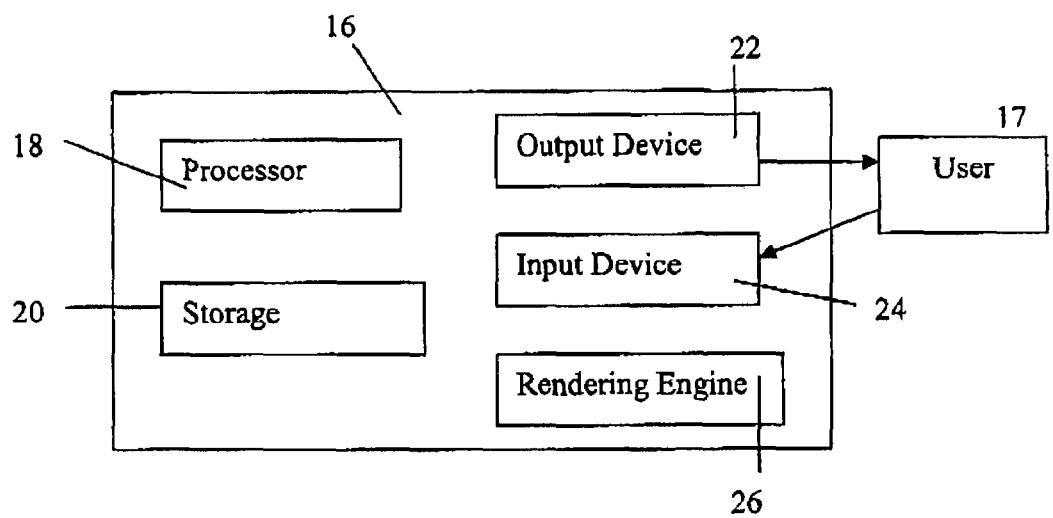
FIG. 2 is a schematic representation of a device in FIG. 1.

Referring to FIG. 2, a sample device is shown by the numeral 16. The device includes a processor 18, the storage 20, an output device 22, a rendering engine 26, and an input device 24. It will be appreciated that the form of these components differs for each device. Some devices may have faster and larger processors 18. Other devices may have more or less storage 20. The nature of the output device 22 may vary from a full screen display to a very small black and white display or an audio device such as headphones or speakers. The input device 24 may be a keyboard, a mouse, a touch screen or even a voice interface. The rendering engine 26 will therefore vary with each device and is tailored to the abilities of the input and output devices. Further details of the nature of the rendering engine will be provided below.

Referring to FIG. 1, in order for the application 12 to be operable on each device 16a, 16b, 16c and 16d, the interface 14 is encoded in a conceptual manner. The conceptual user interface may be provided to any device 16a, 16b, 16c, or 16d where, with reference to FIG. 2, the proprietary rendering engine 26 produces a rendered user interface to present on the output device 22.

Figure 3:
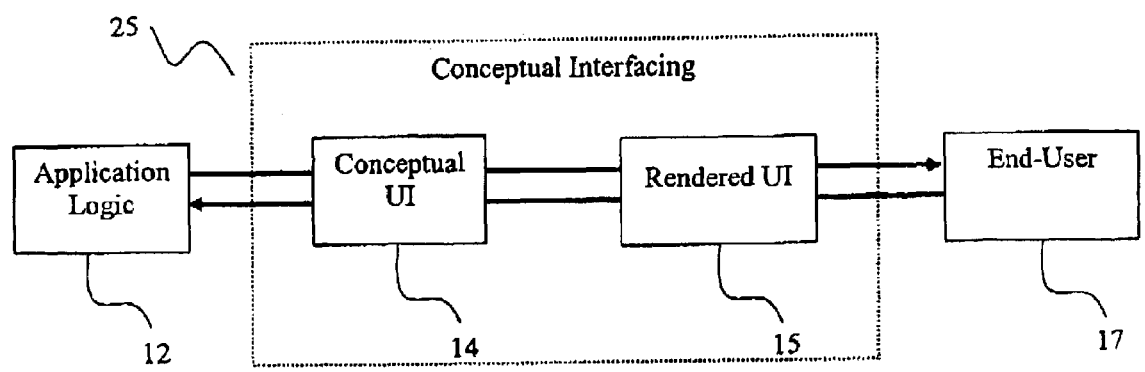
FIG. 3 is a schematic representation of the conceptual interfacing process that occurs in FIGS. 1 and 2.

With reference to FIG. 3, schematically shown therein is the flow of information between the Application Logic 12 and an End-User 17. Within the Application Logic 12, the Conceptual User Interface (UI) 14 is created by using Conceptual Components, which will be explained below. The Conceptual UI 14 is then converted into a Rendered UI 15, using algorithms proprietary to the targeted client platform/device, to be finally interpreted by the End-User 17. Conversely, the End-User 17 may modify the Application Logic 12 by applying actions to it. The Conceptual Interfacing methodology 25, includes the Conceptual UI 14 and the Rendered UI 15.

To understand the Conceptual Interfacing process 25, three different parts will be discussed in detail:
1. The Conceptual UI 14 that is stored as a stack of references to UI Conceptual Components.
2. The Conceptual Components needed to build a complete Conceptual User Interface.
3. The Rendered User Interface 15, which is a presentable version of the Conceptual UI 14, by generating in real-time a visible and interactive user-interface according to the specifications and capabilities of the End-User 17 target platform/device.

Figure 4:
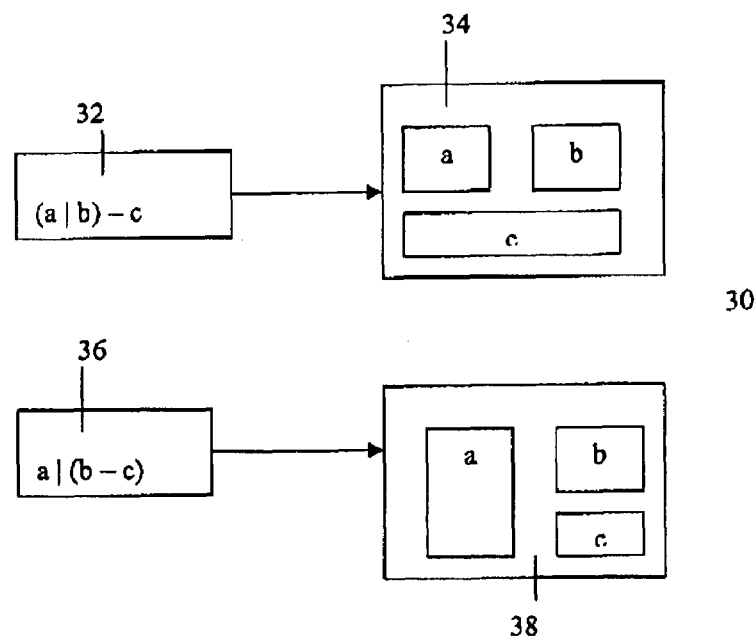
FIG. 4 is a schematic representation of elements layouts formulas and their corresponding output of a GUI user interface.

Referring therefore to FIG. 4, one aspect of the layout rendering suitable for a GUI is shown generally by the numeral 30. The layout rendering includes an operator denoted as pipe a vertical bar | and an operator denoted by a -. The operator | indicates that interface elements should be placed side by side. The operator-indicates that interface elements should be placed one on top of the other. The expression (a|b)-c shown as numeral 32 therefore corresponds to the notional display at numeral 34 where elements a and b are side by side and element c is underneath the block a and b. The precedence may be changed using bracketing and accordingly, the expression a |(b-c) at numeral 36 corresponds to the display at 38 where the element a is to the left of the block of b over c. Further details on the nature of the rendering and its applications will be detailed below.

The elements in the interface, which are notionally referred to as a, b, and c in FIG. 4 are made up of three types of components, namely containers, controls and text. The nature of these components will be explained further below. The structure of each of these components is shown generally in FIGS. 5A, 5B, 5C, and 5D.

The conceptual components may be referred to as multi dimensional matrixes. These may be of three, four or more dimensions and accordingly do not easily correspond to a real world depiction. By way of example, therefore a 2×2 matrix is shown in FIGS. 5A, 5B, 5C, and 5D by way of introduction. Higher dimensional structures will be explained below.

Referring therefore to FIG. 5A, a labels matrix is shown generally by the numeral 40. The labels matrix is 2×2, and each cell contains a label, shown as A, B, C, and D. The label may be text or a bitmap and is used to identify the component to the user.

Referring to FIG. 5B, a read only flag matrix is shown generally by the numeral 42. Each cell of the matrix contains an indication of either yes or no. Typically, this will be encoded as 1's and 0's in binary. The flag matrix is used to control whether elements may be modified by the user.

Referring to FIG. 5C, an images matrix is shown generally by the numeral 44. Each cell of the matrix corresponds to an optional image that constitute a tailored rendering if desired by the programmer. Finally, FIG. 5D shows a values matrix 46 where the entries, in this example selections for a control component from an empty separate state matrix, correspond to those in FIGS. 5A, 5B and 5C. In this example, these matrixes taken together represent a control component of a user interface.

Figure 6A:
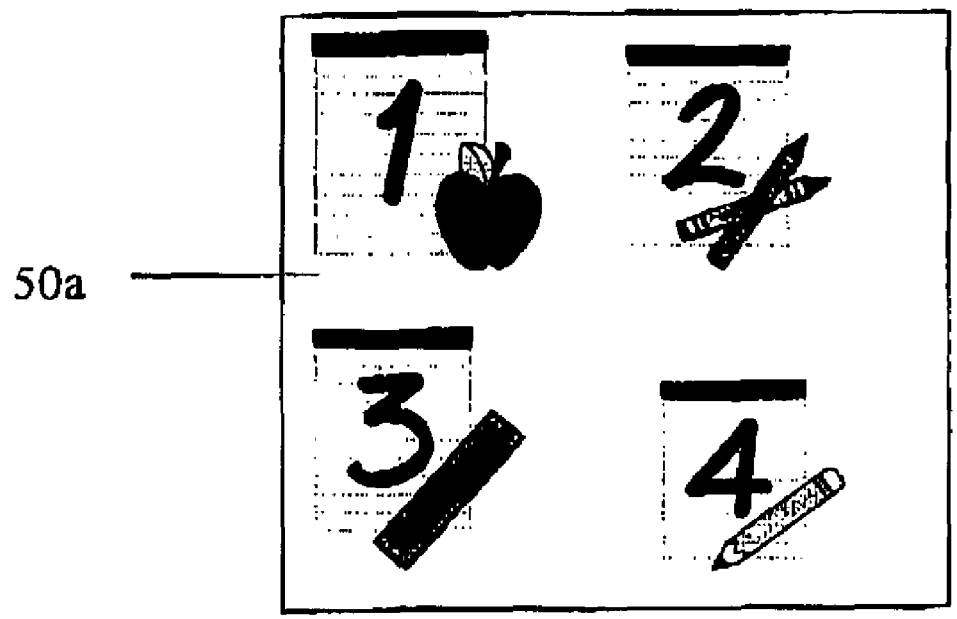
FIGS. 6A and 6B are schematic representations of renderings of the data structures of FIGS. 5A, 5B, 5C and 5D.
Figure 6B:
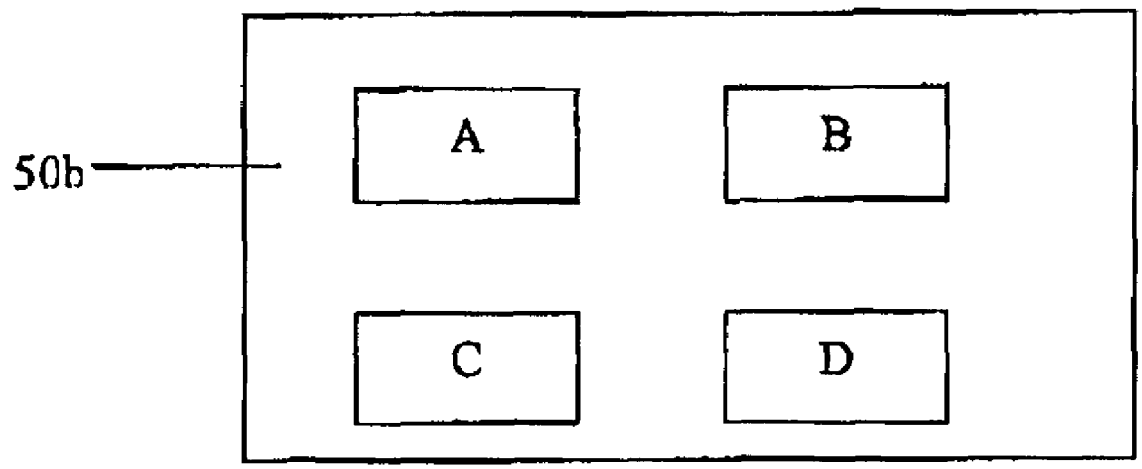

Referring to FIGS. 6A and 6B, example renderings of the structure shown in FIGS. 5A, 5B, 5C, and 5D is shown by the numerals 50a and 50b. In FIG. 6A, the interfaces rendered using the images matrix 44. Accordingly, the labels matrix 40 is not used in the display, only the images. The images would have the functionality of buttons, since they belong to a control component. In FIG. 6B, the interfaces rendered using text in the labels matrix 40. This may be used on a device where the display 22 is limited in capability. Therefore, the labels matrix 40 is used to designate each possible choice. Again, they would appear as buttons with labels inside, this time borrowing the target device look and feel.

The above structures provide the basis for developing a conceptual user interface. Their operation will now be described in further detail.

A Conceptual UI is a user-interface model composed of abstract components such as containers, controls and texts instead of device-specific components such as windows, forms, buttons, menus, check boxes and edit boxes. To be able to conceptualize any user interface into a few abstract components, preferably, a mathematical model is used. This mathematical model includes multi-dimensioned numbers, vectors, sets, matrices, trees and matrices of trees. Only mathematically proven concepts make possible the transition from a device-capabilities-based model (such as Win32, AWT, RIMOS) to a fully user-need-based model (Conceptual UI).

Figure 7:
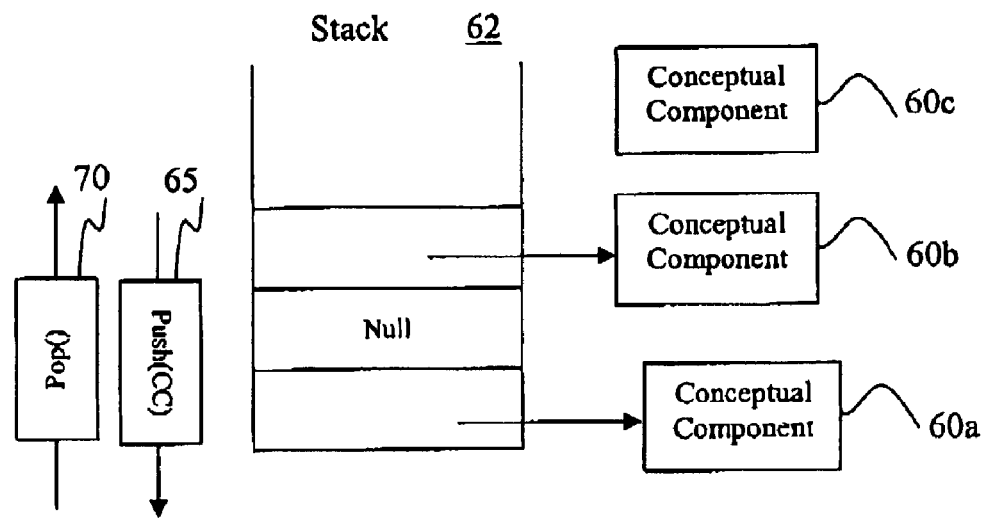
FIG. 7 is a schematic representation of a conceptual user interface stack.

Referring to FIG. 7, the implementation of a Conceptual UI is a simple Stack 62 of references to conceptual components, detailed in the next section. References in the stack may be null as well (the reason will be explained later). Both stack and conceptual components are entirely managed by the application logic 12. The application logic 12, created by the programmer, can create conceptual components by defining them and calling their constructors. He can then add the references of the newly created conceptual components to the Conceptual UI Stack 62 via the Push(CC) 65 method, and can later remove existing references from the Conceptual UI Stack 62 by calling the Pop( ) 70 method. The push and pop methods will be explained in details shortly.

The Conceptual Component may be understood as the base unit defining user-interface information presented to the user. When a Conceptual Component is created in the application, it is not immediately rendered to the user. The rendering of this Conceptual Component to the user happens only when the programmer adds the conceptual component's reference to the Conceptual UI Stack 62. Once a Conceptual Component is referenced in the Conceptual UI Stack 62, it is considered "linked". A Conceptual Component not referenced in the Conceptual UI Stack 62 is considered "unlinked". Referring to FIG. 7, the Conceptual Component 60a and the Conceptual Component 60b are linked, whereas the Conceptual Component 60c is unlinked.

At application initialization, the Conceptual UI Stack 62 is always empty. Like any stack, the Conceptual UI has two methods: Push(CC) 65 and Pop( ) 70.

The Push(CC) 65 adds a reference, at the top of the stack, that points to either a valid Conceptual Component or a distinguished null value. When a new Conceptual Component is pushed in the Conceptual UI Stack 62, it becomes linked and the previously pushed Conceptual Component (if any) becomes read-only. User interaction always takes place only on the Conceptual Component located at the top of the stack, even if all linked Conceptual Components are rendered. When the null value is pushed in the Conceptual UI Stack 62, no user interaction is allowed for any linked Conceptual Components, until either Pop( ) 70 is called or a new Conceptual Component is pushed.

The Pop( ) 70 method removes the last pushed reference from the top of the stack. User interaction is redirected to the new top Conceptual Component, if not null. For the sake of clarity, the Conceptual User Interface will be referred to as the CUI.

Any platform user-interface in order to be effective only needs the three following basic element types:

1. Containers that are sets of elements. Some elements within a container may be containers as well, allowing a hierarchical organization of the elements required to build a user-interface.
2. Controls where selections from the end-user can be made, allowing the user to command the application logic 12.
3. Texts where the end-user can enter character strings that are interpreted either by the application logic 12 or by other end-users.

In conventional user interface APIs, a complex hierarchy of component types is declared to express those three UI basic types. In Graphical user-interfaces, windows, forms and menus are examples of containers; buttons, check boxes, list boxes, menu items are examples of controls; text fields, edit boxes, and note boxes are examples of texts. It will be understood that the three UI basic types have been mapped into three and only three Conceptual Components. These Conceptual Components encapsulate all the required container, text and control functionality making it possible for the software developer to design a complete and effective conceptual user-interface. Consequently, a conceptual user-interface is fully portable across all platforms and devices. Furthermore, using this UI modeling approach, the software developer does not need to know which specific UI components must be used for a specific target platform or device. He defines which specific functionality is needed, translates it into a conceptual user-interface with Conceptual Components and the choice of the required specific native components is automatically made in the rendering process.

A Conceptual Component (CC) is the base unit of a conceptual user-interface that can become a container, a control or a text. Conceptual Components (CC) include Container CCs, Control CCs and Text CCs. These are the three CC types.

An abstraction model is used to organize in a user-friendly way many values that will be presented and modified by the end-user. To be efficient for the rendering on various client devices, a user-interface abstraction model needs to distinguish between homogeneity and heterogeneity for its values: which ones have the same attributes (e.g. a two-dimensioned array of text cells in a spreadsheet application) and which ones don't (e.g. a set of controls and texts). Thus a CC should be able to hold multiple values if necessary, to implement the concept of homogeneity (for example, in Windows a list box holds a 1-dimensioned array of states). For this reason, each CC has a matrix of values. The value type depends on the CC type. The value type of a Container CC is a set of other CCs (and some of them can also be Container CCs, which makes up a CC tree). The value type of a Text CC is an editable text. The value type of a Control CC is a selected state.

Each value within the CC is also associated with an image. A value is composed of a CC set, a text or a selected state and an image. If the image width and height are greater than zero in the application logic, the image will be used in the rendering when possible (mostly in GUIs), since not all user interfaces can display graphics.

Figure 8:
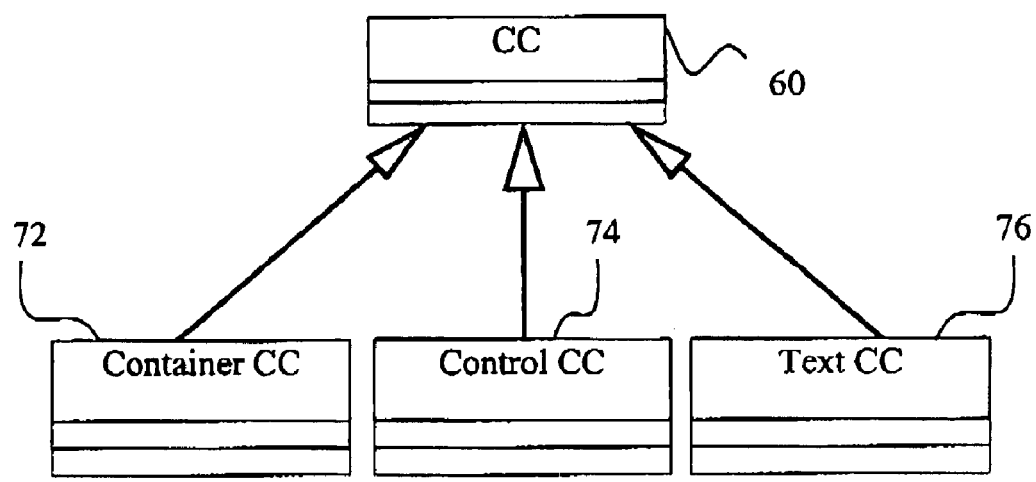
FIG. 8 presents an inheritance diagram of the UI conceptual components.

Referring to FIG. 8, an inheritance diagram is shown representing the three CCs needed to build conceptual UIs. The Container CC 72, the Control CC 74 and the Text CC 76 are all inherited from the CC 60. The CC 60 contains the common functionality of Container, Control and Text CCs. And since any CC value can be represented by an image, the image processing resides in the CC 60 base class. So, the three CC types are sufficient to define any user interface.

Since a CC holds a matrix and since a matrix can spread on many dimensions (multi-dimensioned matrix), four mathematical concepts will be explained before describing the operation of a CC.

The concept of a d-number ("d-" stands for "dimensioned-") is a multi-dimensioned number, composed of a number of dimensions, greater than or equal to 0, and a set of integer values associated to each dimension. It will be appreciated that for the sake of modelling the number of dimensions may be greater than 3. For example, $\{3, 2, 5\}$ is a 3d-number with values 3 for the first dimension, 2 for the second and 5 for the third dimension. The 0d-number is expressed as $\{\ \}$. The number of dimensions and the values of a d-number may be modified. Arithmetic Operators such as $=, +, -, <, >, <=, >=, ==, !=$, may apply between two d-numbers. When these operators are used, it is assumed that both d-numbers have the same number of dimensions and that the operator is applied for the corresponding values of the two operands for all dimensions. For example, $\{3, 4\} < \{6, 5\}$ is "true" because 3<6 and 4<5, but $\{1, 3\} < \{2, 2\}$ is "false", since 1<2 but 3>2 (the operator < is "false" for the second dimension). When one operand is 0, the 0 in fact means a d-number that has a number of dimensions equal to that of the other operand and that all values are 0. So $\{6, 5\} >= 0$ is "true" but $\{6, -3, 2\} > 0$ is "false". There are many modification methods, like in FIG. 9, that use type dnum for parameters, which is the type of a d-number. Value dnumnull always refers to the 0d-number $\{\ \}$.

The concept of d-size is a d-number used to represent a multi-dimensioned area. The number of units in the area is the product of all dimension values. For example, d-size $\{7, 6\}$ describes a 2-dimensioned area of 7×6=42 units; a d-size $\{7, 6, 3\}$ describes a 3-dimensioned area of 7×6×3=126 units. The 0d-size $\{\ \}$ always has 1 unit. The units within the d-size are undefined.

The concept of a d-coordinate is a d-number used to locate a unit within a d-size. The coordinate must always have the same number of dimensions than its corresponding d-size. Usually, d-coordinate>=0 and d-coordinate<d-size (or d-coordinate<=d-size for element insertion purposes). For example in a d-size $\{7, 6, 3\}$, a d-coordinate should be 3-dimensioned and can vary between a minimum of $\{0, 0, 0\}$ and a maximum of $\{6, 5, 2\}$. The 0d-coordinate unit always refers to the only unit of 0d-number $\{\ \}$.

The concept of a matrix is a collection of values of the same type, located into the units of a multi-dimensioned area. The matrix always has a d-size and content, which is the set of elements. Elements of the matrix can be of any data or object type (number, structure, array, even another matrix).

Figure 11:
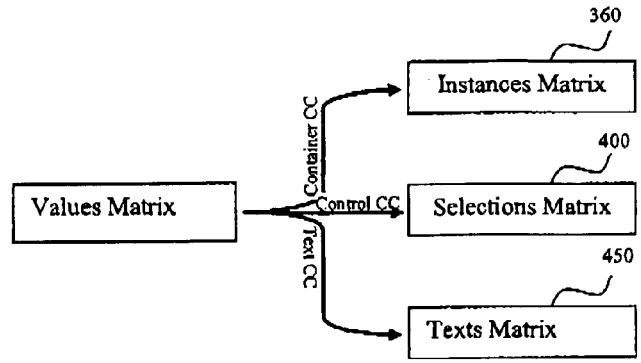
FIG. 11 illustrates the meaning of the term Values Matrix for each Conceptual Component.

Referring to FIG. 11 and for the rest of this document, we employ the term "Values Matrix" to mean either a Matrix of Instances 360 if the CC is a container, a Matrix of Selections 400 if the CC is a control or a Matrix of Texts 450 if the CC is a text. The Instances Matrix 360, Selections Matrix 400 and Texts Matrix 450 will be detailed in further sections of this document. Note that the CC type cannot be modified throughout its lifetime.

With reference to FIG. 9, the CC 60, following an object-oriented concept, contains Data 105 and Modification Methods 110. The Data 105 of the CC encapsulates three matrices that, along with the Values Matrix, will form the complete user information: the Labels Matrix 115, the Read-Only Flags Matrix 120 and the Images Matrix 125. The Modification Methods 110 are methods used to modify or update the Data 105 of the CC 50. In the Modification Methods 110 column, "Initialization time" always means that the associated Data 105 member is set once at the creation of the CC. All information set at Initialization time cannot in any way be modified for lifetime of the CC.

Figure 13:
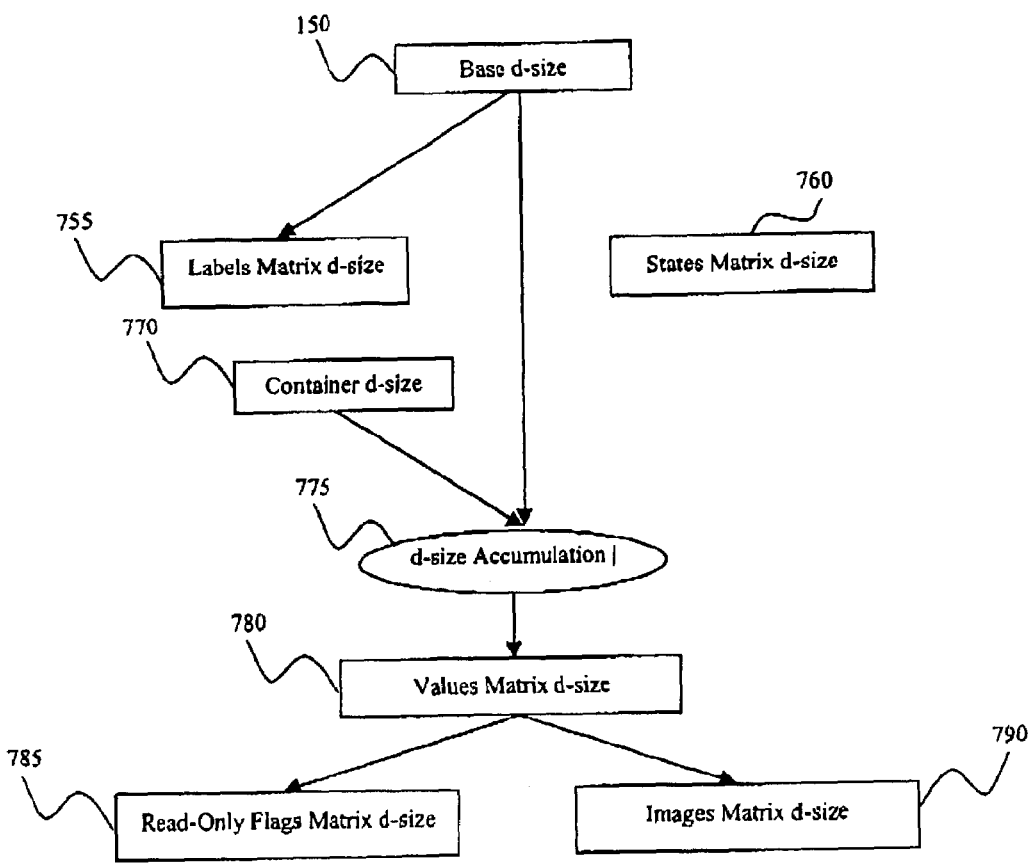
FIG. 13 shows the different d-sizes (Base, Labels Matrix, States Matrix, Container, Values Matrix and Read-Only Flags Matrix)

Still referring to FIG. 9, the Base d-size 150, entered at Initialization time will be used as the foundation for the calculation of the Labels Matrix 115 d-size, Read-Only Flags Matrix 120 d-size, Images Matrix 125 d-size and also the Values Matrix d-size. Referring to FIG. 13, it is shown that the Base d-size 150 is used to calculate these four different d-sizes that are used by the CC. The calculation of those d-sizes from the Base d-size 150 will be explained in further sections.

Returning to FIG. 9, the Constant Flags 175 is a list of flags used to put constraints on the Base d-size 150. The number of elements in this list of flags is equal to the number of dimensions of Base d-size 150 to have one Constant Flag 175 per Base d-size 150 dimension. When one Constant Flag 175 is "true", it means the corresponding Base d-size 150 value, specified at CC Initialization time, cannot be modified afterwards. When it is "false", the Base d-size 150 value, still set first at Initialization time, can grow or shrink via insertion or removal of elements. The Variable d-size is a d-size that includes only the dimensions of the Base d-size 150 where the Constant Flags 175 is "false"; this means the Variable d-size can have a number of dimensions less or equal than the Base d-size 150. For example, consider a Base d-size 150 of $\{2, 3\}$ and Constant Flags 175 equal to $\{true, false\}$, which means the first dimension value of the Base d-size 150 (2) is constant (constant flag is "true" on the first dimension), however the second dimension value of the Base d-size 150 (3) can grow or shrink (constant flag is "false" on the second dimension). The Variable d-size in this case includes only the second dimension where Constant Flag 175 is "false", resulting in a 1d-size of $\{3\}$. The insert(dnum start, dnum range) 155 (start>=0, start<=Variable d-size and range>=0) and remove (dnum start, dnum range) 160 (start+range<=Variable d-size 150, start>=0 and range>=0) will insert and remove elements in the dimensions where Constant Flags 175 is "false". Notice that the start and range parameters in insert and remove methods should have the same number of dimensions than Variable d-size, not Base d-size 150.

Figure 14:
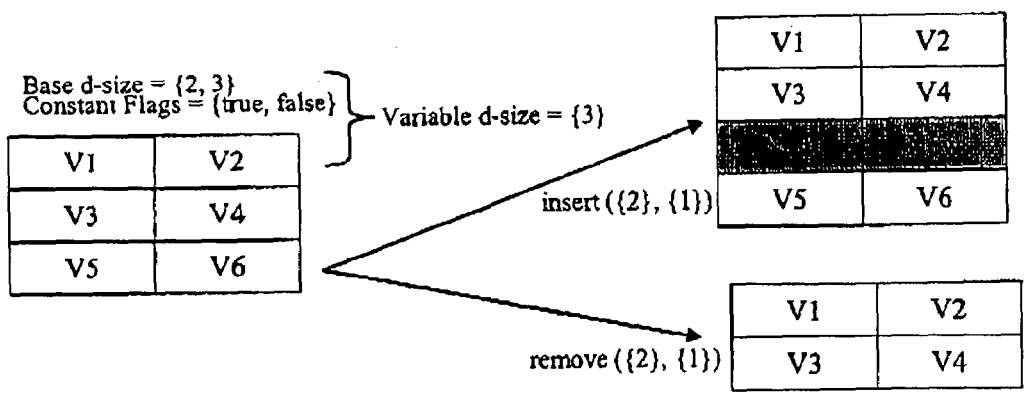
FIG. 14 shows the effect of Constant Flags on the insert/remove methods.

Referring now to FIG. 14, the previous example is presented schematically. Consider an insert($\{2\}$, $\{1\}$) method. As presented in FIG. 14, the insertion takes place only on the second dimension where Constant Flag is "false". After the insertion, the new Base d-size is $\{2, 4\}$. Two new empty values are added to the matrix while the six existing values (V1 to V6) stay in the new matrix. However V5 and V6 are shifted one row down because of the insertion position $\{2\}$.

Consider now a remove($\{2\}$, $\{1\}$) method. The removal as presented will also take place on the second dimension changing the Base d-size to $\{2, 2\}$. Only the first four values (V1 to V4) stay in the new matrix. Values V5 and V6 are removed because the removal position $\{2\}$ matched their row.

Referring to FIG. 9, the Constant Flags 175 are also used for the rendering. A practical illustration of the use of the Constant Flags 175 in the rendering is scroll bars existing in Windows. For example, when the number of elements displayed in a window is constant on the horizontal direction (i.e. Constant Flag 175 is "true" on the first dimension) there is no need for a horizontal scroll bar since all the existing elements are already displayed. However if the number of elements can grow (i.e. Constant Flag 175 is "false" on the first dimension), there must be a horizontal scroll bar that enables the end-user to scroll all over the elements. The same concept applies on the Vertical direction in Windows (considered in this example the second dimension). This shows that the modification of the Constant Flags 175 over any dimension can result in a modification of the final rendering of the client device.

Figure 18:
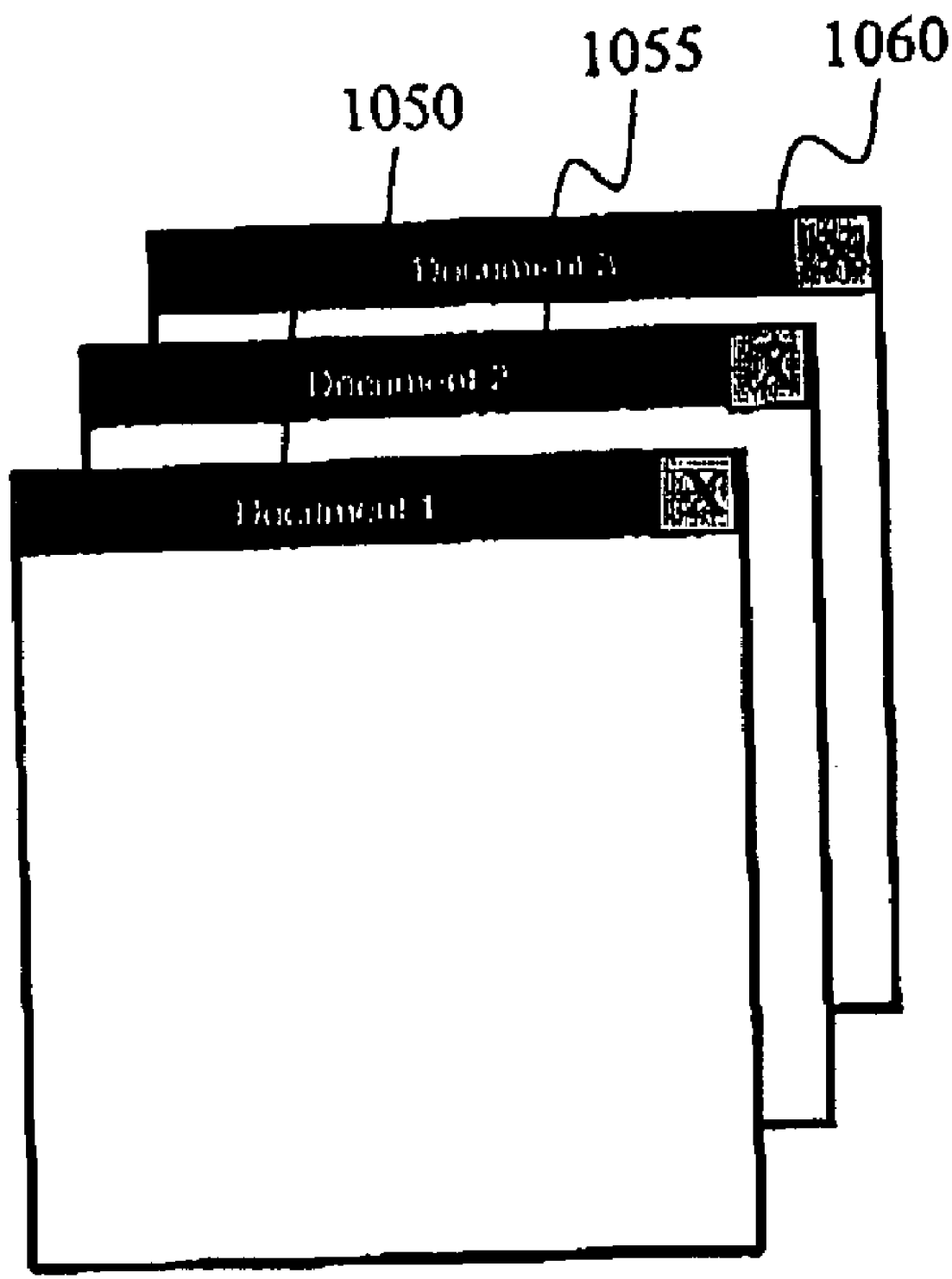
FIG. 18 illustrates MDI windows that occur when End-User Resize flag of a 1-dimensioned CC is "true".

The End-User Resize Flags 180 are, just like the Constant Flags 175, a list of flags, and the number of elements is also equal to the number of dimensions of Base d-size 150 in order to have one End-User Resize Flag 180 per Base d-size 150 dimension. A Resize Flag 180 with value "true" means that the end-user is allowed to change the corresponding Base d-size 150 value by sending insert/remove events to the Conceptual Component. A "false" flag means the end-user cannot insert/remove units from the corresponding Base d-size 150 value. Therefore, the user is forbidden to send insert/remove events. When the Constant Flags 175 is "true" on a dimension, the End-User Resize Flag 180 is automatically set to "false" on this dimension. The user cannot change the size of a dimension when it is already set constant. However if the Constant Flag 175 is "false", the End-User Resize flag 180 can be "true" or "false", allowing or prohibiting the end-user to change the dimension size. Referring to FIG. 18, a practical illustration of the use of the End-User Resize Flags 180 is a multiple document interface (MDI) in Windows. In the conceptual UI model, a MDI window is presented by a CC of 1-dimensioned matrix, where the Constant Flag is set to {false}. In a MDI window, any of the documents (document1 1050, document2 1055, document3 1060) is subject to insertion/removal. In this example the end-user is allowed to close an existing document and create a new document (End-User Resize Flag is "true").

Referring to FIG. 9, the Directions 185 data member is a list of directions, and the number of elements is also equal to the number of dimensions of Base d-size 150 in order to have one Direction 185 per Base d-size 150 dimension. Each Direction 185 in the list takes one of the three possible values: Width, Height or Depth. It specifies the direction of its corresponding Base d-size 150 dimension that will preclude when the CC is rendered to the user. Any rendering must occur in a 3-dimensional space, which forces conversion back and forth between abstract n-dimensional CCs and its corresponding concrete, rendered 3-dimensional space (those n-dimensioned to 3-dimensioned and 3-dimensioned to n-dimensioned conversions will be explained below). The Directions 185 are used in the rendering for this conversion process.

Referring to FIG. 9, the Default Action Flag 190, if set to "true", specifies that no event generated from user interaction in the CC will be passed on to the application logic, for further processing. Instead, the default behavior of user interaction in the CC will take place, without notifying the application that a change has occurred. For example, for most text-entry fields, the application never changes its normal behavior based on modification events such as additions and removals of letters, and therefore the application should not know about these events. The Default Action Flag 190, if set to "true", can considerably speed up processing when there is a long delay between the user interaction on the client device and the reception of the event by the application. If the Default Action Flag 190 is set to false, user input is temporarily disabled when the user modifies the component. The user input will be re-enabled when the Push(CC) 65 (the CC may be null) and then Pop( ) 70 methods in FIG. 7 are called. In the meantime, the user is prohibited from entering other information while a previous command is still executing. For example in an address book, after the user has entered the first name, surname and phone of a contact he presses a submit button, he must be prevented from typing other information while the submission is being processed. Any attempt to modify the application at this time will be discarded, ensuring a safe use of the application.

Referring to FIG. 9, the Tree Flag 192, if set to "true", specifies that the CC matrix will instead be implemented as a tree of homogeneous values. It is a practical flag for creating trees of values that look similar. An example among others is the Tree View in Windows. Thus, if the Tree Flag 192 is set to "true", the Base Size 150, the Constant Flags 175, the End-User Resize Flags 180 and the Directions 185 are irrelevant and therefore not used for the CC 50. Only the number of dimensions from the Base Size 150 would be required, because in many cases, we want to limit the number of levels the tree may have. For trees that require "unlimited" number of levels, just put a large number of dimensions is put in Base Size 150. However, the int insert(dnum start, dnum range) 155 and int remove(dnum start, dnum range) 160 method are still used, this time to add or remove values in the tree. The start parameter is the path in the tree where the insertion/removal happens. The range parameter specifies how many values to insert/remove. Usually, range in this case should be a 1d-number, but nothing prevents an implementation with multiple dimensions. In this case, the first dimension would be the number of elements on the start level, then, on the next level, the second dimension would be inserted for each element of the first dimension, and so on. Renderings should include expand/collapse options to manipulate the tree. It would be also possible to keep track of expansions/collapses within the CC by adding the required variables and methods, but it is not necessary to do so. The Tree Flag 192 default value is "false", if not defined at Initialization time.

Referring to FIG. 9, the Semantic Type 195 is a string that is used to identify a convention if applicable. Many applications have user interface fields that refer to known conventions, such as date, time, phone number, postal code, password, etc. Many user interfaces have specific controls (semantic controls) that handle these commonly used fields. Their look and feel might be different across platforms, but ultimately they refer to the same human convention. If the CC refers to a human convention, the Semantic Type 195 string will be one entry from a pool of predefined convention strings like "date", "time", "zip code", and "password". If the user interface does not have a semantic control for a given convention, the Semantic Type 195 string is not used. An empty string in the Semantic Type 195 indicates that the CC does not refer to any human convention.

The User-Defined Flags 200 respectively address the Labels Matrix 115, the Read-Only Flags Matrix 120 and Values Matrix (including the Images Matrix 125). Further details about the three matrices will be given below, however they may be considered generally as matrices of user information elements. By default, these information elements will be stored in internal memory by the Rendered UI, on behalf of the programmer. However, if a User-Defined Flag 200 is "true", its corresponding information elements must instead be defined by the programmer in his source code, that is in the application logic 12 (only the viewed part of the information will reside in the Rendered UI memory, for displaying purpose). The programmer will have to redefine the retrieval methods to get accurate data from its proprietary storage mechanism. The User-Defined Flags 200 are usually required when the information consumes too much memory to be blindly stored by the Rendered UI internal mechanism. For example, in an Excel sheet, the cells are not all stored in Windows Rendered UI memory using a huge string array. In this case, the Excel programmer holds a structure where only the non-empty cells are stored. The programmer of a conceptual Excel application must set the sheet component User-defined Flag 200 for the Values Matrix to "true" and establish links between the sheet component and his own structure by redefining the retrieval methods. The User-Defined Flags 200 are also useful when all the corresponding information elements can be retrieved using a mathematical formula. Instead of storing all information elements of the formula in memory, by setting to "true" the User-Defined Flags 200 the programmer can dynamically call the formula within the retrieval method when needed and avoid wasting memory space.

Referring to FIG. 9, the Labels Matrix 115 is used to describe the Values Matrix to the user. A label is a small description that is composed of a text string and/or a bitmap. Referring to FIG. 9, the Labels Matrix d-size 755 is equivalent to the Base d-size 150.

Referring to FIG. 9, the String Max Length 215 contains the maximal length the text string of any label in the Labels Matrix 115. If the String Max Length 215 if 0, no text string can be entered within labels.

The Bitmap Size 220 specifies the size, in pixels, of all bitmaps in Labels Matrix 115. If the Bitmap Size 220 width and/or height are equal to zero, then the Labels Matrix 115 cannot contain any bitmap.

Notice that if in the Labels Matrix 115, both String Max Length 215 and Bitmap Size 220 are zeroed, the Labels Matrix 115 cannot contain any label is therefore not used to qualify the Values Matrix.

The Labels Matrix 115 content will be either stored in a Buffered Storage System 225 residing in the application logic 12, the Default Storage System 230 residing in the CC or a User-Defined Storage System 245 residing in the application logic 12, depending on the label User-Defined Flag 200 and the Constant Flags 175.

If the label User-Defined Flag 200 is set to "false" and for all Base d-size 150 dimensions, the Constant Flag 175 is "true" (constant), the Buffered Storage System 225 is used. In this case, the application must supply at initialization time a buffer of length (String Max Length 215+1)×Product of Labels Matrix 115 d-size. The buffer contains the text strings if String Max Length 215 is greater than 0 and, if Bitmap Size 220 is not null, a buffer of length Size Of Bitmap Structure× Product of Labels Matrix 115 d-size that will contain bitmaps.

If the label User-Defined Flag 200 is set to "false" and at least for one Base d-size 150 dimension a Constant Flag 175 is "false" (not constant), the Default Storage System 230 is used. Empty label elements can be created with insert(dnum start, dnum range) 155.

For both Buffered Storage System 225 and Default Storage System 230, the method setlabel(char*label, dnum index=dnumnull) 235 is used to modify the text string of the label element pointed to by index d-coordinate and method setbitmap(Bitmap*bitmap, dnum index=dnumnull) 240 must be used to modify the bitmap of the label element pointed to by index. In both methods, the index parameter is a d-coordinate within Labels Matrix 115 d-size (index>=0 and index<Labels Matrix 115 d-size).

If the label User-Defined Flag 200 is set to "true", the User-Defined Storage System 245 is used. The updatelabels (dnum pos, dnum range) 250 can be used to refresh the label rendering whenever a corresponding change in the proprietary label storage mechanism of the application logic has occurred. The pos and range parameters must have the same number of dimensions than Labels Matrix 115 d-size, pos>=0, range>=0 and pos+range<=Labels Matrix 115 d-size.

Referring to FIG. 9, the Read-Only Flags Matrix 120 content determines whether or not the Values Matrix elements enable user input. If "true" user input is disabled, otherwise it is enabled. Referring to FIG. 13, the Read-Only Flags Matrix d-size 785 is equivalent to the Values Matrix d-size 780. The calculation of the Values Matrix d-size 780 is explained later in this document.

Returning to FIG. 9, the Constant Flag 270 is set at initialization time. If its value is "true", all Values Matrix elements in the CC are considered read-only for the CC lifetime. Consequently, the Read-Only Flags Matrix 120 will never be created nor accessed by the application logic. Methods updateroflags(dnum pos, dnum range) 290 and setroflag(boolean flag, dnum index=dnumnull) 280 cannot be called. However, if the Constant Flag 270 is set to "false", the Read-Only Flags Matrix 120 values can be set to "true" or "false" to forbid or allow user editing on the corresponding Values Matrix elements within the CC. Methods updateroflags(dnum pos, dnum range) 290 and setroflag(boolean flag, dnum index=dnumnull) 280 can be called to modify Read-Only Flags Matrix 120 content.

The Read-Only Flags Matrix 120 content will either be the Default Storage System 275 residing in the Rendered UI or a User-Defined Storage System 285 residing in the application logic, depending on the read-only User-Defined Flag 200.

If the read-only User-Defined Flag 200 is set to "false", the Default Storage System 275 is used. The method setroflag (boolean flag, dnum index=dnumnull) 280 modifies the read-only flag element pointed to by index. The index parameter is a d-coordinate within Read-Only Flags Matrix 120 d-size (index>=0 and index<Read-Only Flags Matrix 120 d-size).

If the read-only User-Defined Flag 200 is set to "true", the User-Defined Storage System 275 is used. Method updateroflags(dnum pos, dnum range) 290 will refresh the read-only flag rendering whenever a corresponding change in the proprietary read-only storage mechanism of the application logic has occurred. The pos and range parameters must have a number of dimensions equal to the Read-Only Flags Matrix 120 d-size, pos>=0, range>=0, pos+range<=Read-Only Flags Matrix 120 d-size.

The Images Matrix 125 is used by the application logic to express CC values (either containers, control selections or texts) with a graphical representation. Referring to FIG. 8, the Images Matrix d-size 790 is equivalent to the Values Matrix d-size 780. The calculation of the Values Matrix d-size 780 is explained later in this document.

Returning to FIG. 9, in any user interface, an image is a two-dimensional array of pixels. The 2D size 320 specifies, in pixels, the width and height of all images in the Images Matrix 125. It is set at Initialization time. Both width and height must be greater than or equal to 0. If 2D size 320 is not 0 for width and height, and the values User-Defined Flag 200 is set to "false", the images are stored in a Default Storage System 325 and can be modified via a set of Text & Graphical Commands 330. The index parameter at the end of all Text & Graphical Commands 330 is a d-coordinate within Images Matrix 125 d-size (index>=0 and index<Images Matrix 125 d-size). If 2D size 320 is not 0 for width and height, and the values User-Defined Flag 200 is set to "true", the images are stored in a User-Defined Storage System 335. Method updatevalues(dnum pos, dnum range) 340 (pos>=0, range>=0, pos+range<=Images Matrix 125 d-size) will refresh the image rendering whenever a corresponding change in the proprietary value storage mechanism of the application logic has occurred. If 2D size 320 width or height is 0, the Images Matrix 125 becomes inactive and is not used by the application logic.

The application logic may use the Images Matrix 125 to precisely control the rendering and user input of each Values Matrix element (Children Set instance, selection or text as explained with reference to FIG. 11). The rendering process of the Values Matrix is decided as follows.

If the Rendered UI targets a sophisticated platform where the user can view/manipulate images and the Images Matrix 125 is used (that is, the 2D size 320 applicable to all images is not null), the Images Matrix 125 takes precedence over the Containers, Selections or Texts Matrix and images are displayed. Images from the descendent CCs (if the CC is a container) are also displayed within the CC images, at the specified position.

If the Rendered UI targets a limited platform where the user can barely view/manipulate images or the Images Matrix 125 is not used (that is, the 2D size 320 applicable to all images is null), the Values Matrix is directly used by the Rendered UI, which will use device components to render the values.

Before detailing the Values Matrix content, which is dependent of the CC type, consider the Values Matrix d-size, which calculation method applies to all CCs. The Values Matrix d-size is calculated from two factors: d-size accumulation and Container d-size.

D-size accumulation, expressed with operator |, happens when each element of a matrix is another matrix, as it happens in CC trees. For example, a two-dimensional matrix of d-size {4, 2} may contain elements that are three-dimensional matrices of d-size {3, 5, 2}. The d-sizes of the two matrices can be accumulated to form one matrix of d-size {4, 2, 3, 5, 2} (e.g. {4, 2}|{3, 5, 2}={4, 2, 3, 5, 2}). D-size accumulation is associative (e.g. {4, 2}|{3, 5, 2} is equivalent to {4, 2, 3}|{5, 2}), but not commutative (e.g. {4, 2}|{3, 5, 2} is not equal to {s 3, 5, 2}|{4, 2}).

Figure 12A:
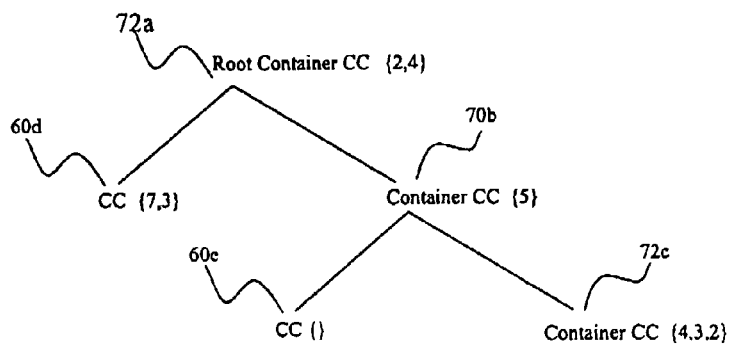
FIG. 12A shows a example of a tree of Conceptual Components (CCs)

Referring to FIG. 13, the Container d-size 770 of a CC is itself an accumulation of all the Base d-sizes 150 of its parent Container CCs, from the root Container CC to the Container CC that directly references the CC. The Container d-size 770, to exist, must apply to a linked CC, else it is always { }. With reference to FIG. 12A that shows a linked CC tree with the base d-size of each CC (the Container CC 72c has no children). The Root Container CC 72a will always have Container d-size { } (1 unit). The CC 60d and Container CC 72b Container d-size is {2, 4} (8 units), since they are the children of Root Container CC a. The CC 60e and CC 72c Container d-size is {2, 4, 5} (40 units). This Container d-size is the accumulation of CC 72a and Container C 72b base d-sizes.

Referring to FIG. 13, for any Container CC, the Values Matrix d-size 780 is the d-size Accumulation 775 of its Container d-size 770 and its own Base d-size 150. For example, returning to FIG. 12A, the Values Matrix d-size of Container CC 72c would be {2, 4, 5}|{4, 3, 2}={2, 4, 5, 4, 3, 2} (960 units).

The Values Matrix content and proprietary settings will now be further described for all the Container CC 72, the Control CC 74, and the Text CC 76.

Referring to FIG. 10A, a Container CC 72 is used as a set of other CCs, referred to as child CCs. A Container CC 72 is used to build complex user interfaces, by building a tree of CCs. When rendered, a Container CC 72 may end up, for example, as a menu or a window containing controls built from child CCs.

The Children Set 365 is a list of references to child CCs associated to optional labels (made of text strings and bitmaps) that must be given at initialization time. The Children Set 365 can be empty if desired. The Children Set 365 is subject to restrictions if the Semantic Type is not null and refers to a valid convention. In this case, the Children Set 365 (and all the descendants) must follow that convention to be effective. Furthermore, the Read-Only Flags Matrix values and the user-defined flag for values of the Container CC 72 also apply for all the child CCs values. For example, if a Container CC 72 is not editable (read-only flag is "true") its entire child CCs are not editable as well.

Each child CC also contains an internal Parent variable that will always reference its current Container CC 72. When a CC is not referenced by a Container CC 72, the Parent variable is set to null. Only CCs where Parent is null can be pushed in and popped out of the CUI. The Root Container CC 72 of each tree is the Container CC 72 that is directly referenced by the CUI.

Since the Children Set 365 of the Container CC 72 is set at Initialization time, the order of creation of the CCs that will be part of a CC tree becomes fundamental. CCs must be created following their bottom-up order in the tree. For example, referring to FIG. 12A, a convenient creation order of the CC tree is by first creating CC {7, 3} 60d, then CC { } 60e, then Container CC {4, 3, 2} 72c, then Container CC {5} 72b that immediately references CC { } 60e and Container CC {4, 3, 2} 72c at initialization time, and finally Root Container CC {2, 4} 72a, which references CC {7, 3} 60d and Container CC {5} 70b at Initialization time. The destruction order of the CCs in the CC tree always happens in the reverse order of their creation.

Referring to FIG. 10A, all CCs referenced by a linked Container CC 72 are linked as well and will be rendered to the user. It means that a root Container CC 72 that is pushed in the CUI is not alone to become linked. All its descendants are also linked and consequently rendered to the user. The entire tree is considered linked.

Figure 12B:
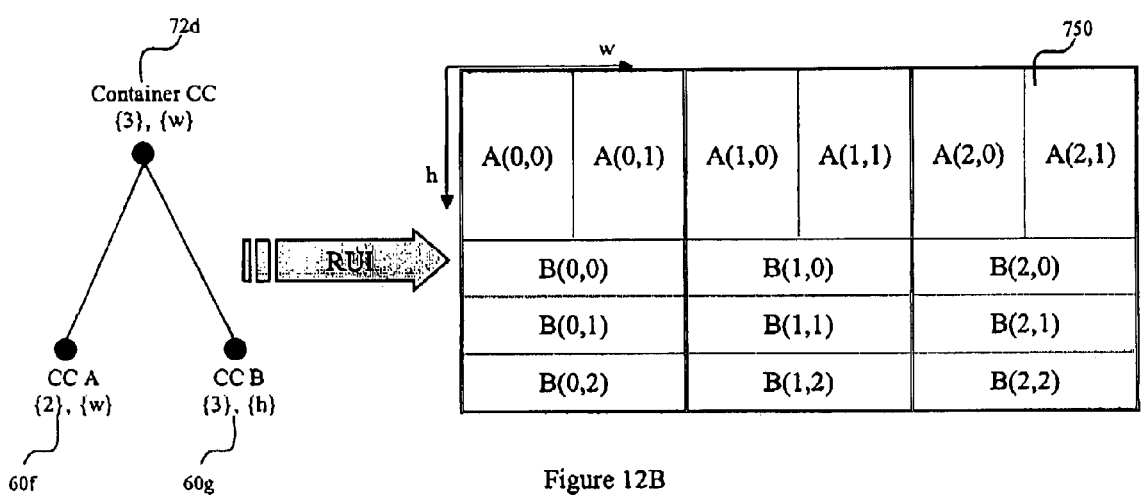
FIG. 12B shows the Rendered UI of a Container Conceptual Component with two child Conceptual Components.

The main difference between Container CCs 72 and other CC types is that the Values Matrix unit is not predefined (like selections for Control CCs and texts for Text CCs). The Container CC 72 uses the Children Set 365 to define the unit of its Values Matrix. The Children Set 365 is seen as a structure, an organization, a type, a template or a model that cannot be modified throughout the Container CC 72 lifetime. Instances of this Children Set 365 structure will populate the Values Matrix. Referring to FIG. 12B, the Container CC 60d has two children, namely CC A 60f and CC B 60g, that could be of any CC type. The Values Matrix, which d-size is {3}, will have instances of the set composed of CC A 60f and CC B 60g. Since the base d-size of CC A 60f is {2}, each unit in the Container CC 72d Values Matrix will have two instances of CC A 60f. Since the base d-size of CC B 60g is {3}, each unit in the Container CC 60d Values Matrix will have three instances of CC B 60g. The rendered UI (RUI 750) shows the layout of the output rendered to the end-user and the coordinates of CC A 60f and CC B 60g values.

Figures 16, 17A, 17B:
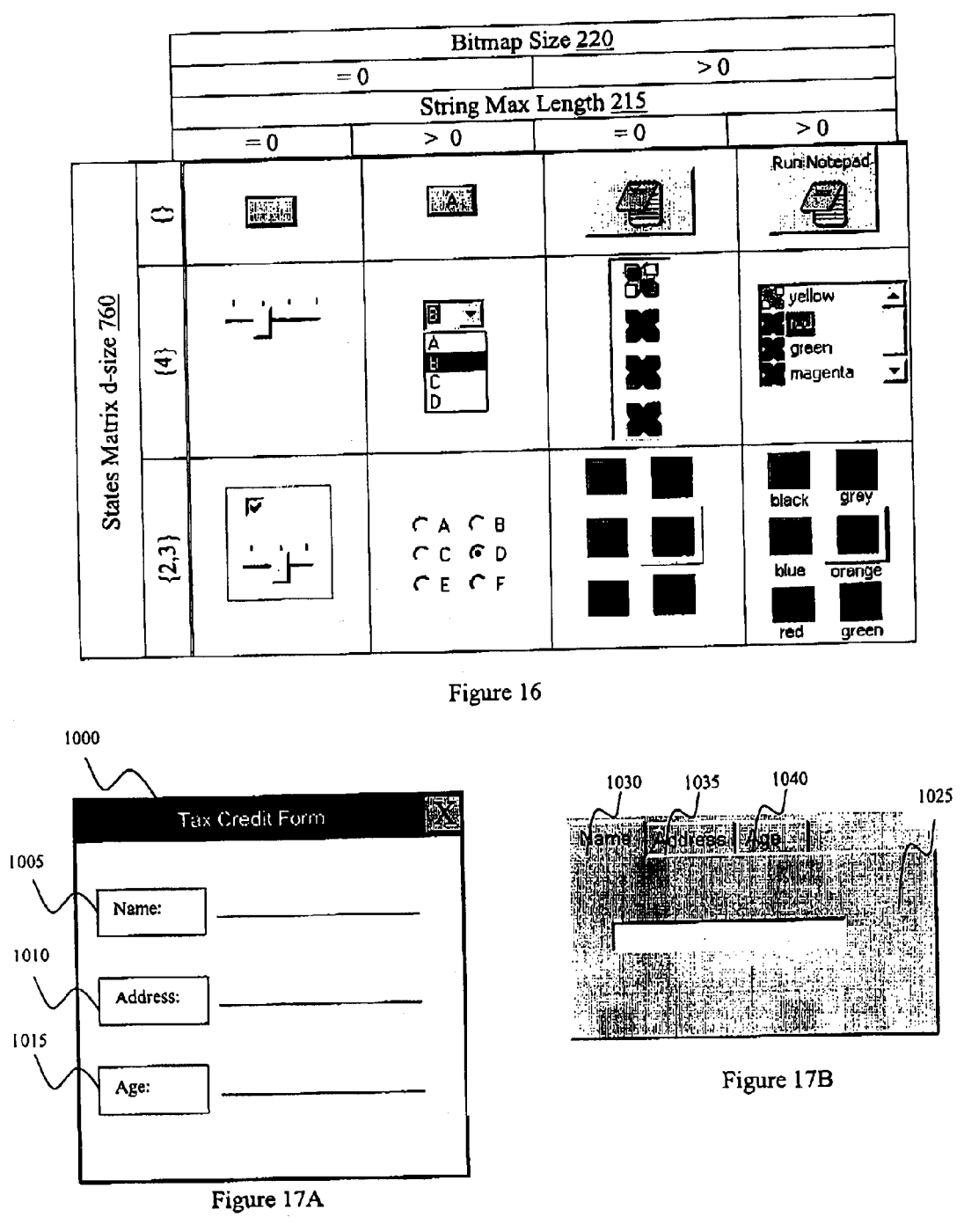

Referring to FIG. 10A, the Children Direction 370, set at initialization time, specifies the direction on which all child CCs will be represented, when rendered to the user. The Children Direction 370 takes one of the three possible values: Width, Height or Depth, always considering that the rendering is occurring in a 3-dimensioned space. The Children Direction 370 gives the user the ability to choose the space direction where child CCs accumulate. It is strictly applied when the Container CC has dimensions in its Values Matrix. However, when the Container CC has no dimension in its Values Matrix (its Children Set 365 is displayed once and is never replicated), the Children Direction 370 is superseded by the device proprietary field positioning rules. In this case, the children are positioned according to the client device conventions. On certain devices though, the Children Direction 370 might still influence the rendering, which is why it is important to define it even when there is no dimension in the Values Matrix. For example, consider FIG. 17A. In this case, the tax credit form 1000 has a Children Direction of Width or Height, which means all fields (Name 1005, Address 1010 and Age 1015) are displayed on the same panel. Referring to FIG. 17B where the same Container CC has a Children Direction of value Depth, the rendering corresponds to a Tab Control 1025 where each tab item (Name 1030, Address 1035 and Age 1040) refers to one piece of information (one child CC) and the end-user can switch between tab items. Referring to FIG. 17B, the Container CC 72d and the CC A 60f have one dimension along the width, whereas the CC B 50g has one dimension along the height, as shown in the rendered UI (RUI) 750.

Returning to FIG. 10A, the Select CC Flag 375, set at Initialization time, enables the application logic 12 to force the end-user to use only one child at a time. When true, the end-user can only interact with the child CC indexed by Selected CC 378. The application logic 12 can modify the Selected CC 378 with method selectcc(int childindex) 385, allowing the end-user to interact with another child. If the childindex parameter is less than 0 or greater than the number of child CCs in the Children Set 365, no child CC is presented to the end-user to interact with.

Returning to FIG. 10A, the Instances Matrix 360, which is the Container CC 60 Values Matrix, holds the instances of the Children Set 365. Method updatevalues(dnum pos, dnum range) 395 (pos>=0, range>=0, pos+range<=Instances Matrix d-size) will refresh the rendering whenever a corresponding change in the Children Set 365 instances has occurred.

An implementation might include labels (both strings and bitmaps) naming each child CC. Even if child CCs have their own labels, they might be matrices and therefore not have a single label defining the whole matrix. Therefore, each element of the Children Set 365 can have an extra label.

Referring to FIG. 10B, a Control CC 74 includes a States Matrix 405 containing the states and a Selections Matrix 400 (which is the Control CC 70 Values Matrix) storing the different selection d-coordinates of States Matrix 405 units. These selections are available for the end-user to control the application logic behaviour. The following example clarifies the difference between a State and a Selection. Referring to FIG. 15, a Control CC 74 is presented with all its Data Members 105 and their actual Value 505. As shown, the Control CC 74 has a Base d-size 150 of {2} and "me:" "you:" as label strings. The States Matrix of the Control CC 74 has a d-size of {4} and "A", "B", "C", "D" as label strings. Given the Control CC 70 Data Members 105 values, for the Windows platform, within a window client area, the rendering of the Control CC 70 comprises two combo boxes having both the same States Matrix (4 states). The rendering rules that were used in this example will be explained in a later section of this document. In this example, the end-user current combo box selections are "B" and "D". Accordingly, the Selections Matrix will be composed of two d-coordinates indicating the right states indexes, namely {1} and {3}. This example shows that the States Matrix and the Selections Matrix are different but complementary for building complete and complex controls.

Referring to FIG. 10B, the States Matrix 405, as for the CC 60 from FIG. 9, is constituted from:

1. A States Matrix d-size, which similar to the Base d-size is the d-size of the States Matrix 405.
2. A set of attributes equivalent to those of the CC matrix, applied to each States Matrix 405 dimension, including: Constant Flags, End-User Resize Flags and Directions. Those attributes have been explicitly defined for the CC matrix.
3. A Labels Matrix similar to the one defined in the CC.

For a Control CC, FIG. 16 shows the interaction between the States Matrix d-size 760, the Bitmap Size 220 and the String Max Length 215 when it comes to rendering the CC. Note that for each combination of States Matrix d-size 760, Bitmap Size 220 and String Max Length 215, the rendering shown takes the three values into account, but can be different from one platform to another (it is shown with Windows in the example) and also from one context to another. Within a menu context for example, menu items would be chosen for the rendering. The states are composed, when String Max Length 215 is >0, from labels extracted from the states Labels Matrix. For States Matrix dimensions where String Max Length 215 is zeroed, the States are unnamed.

Referring to FIG. 16, consider first a States Matrix d-size 760 of { } (first row) and a null Bitmap Size 220 (first column). The generated rendering represents a selection over { } state (1 state since { } always represent 1 element). The selection can change from nothing ({ }) to nothing ({ }), which why is it is expressed in Windows as a button. Depending on the String Max Length 215, the rendered button can contain a label (String Max Length 215 is >0) or be represented as an empty button (String Max Length 215 is 0). The current selection of a button is always { }.

Still referring to FIG. 16, consider now a States Matrix d-size 760 equal to {4} (second row) and a null Bitmap Size 220 (first column). The generated rendering must represent a selection over {4} (4 states). Those states can be either unnamed (String Max Length 215 is 0) or named (String Max Length 215 is >0). If states are unnamed, it can be expressed in Windows as a track bar with 4 different states (since in Windows track bars do not contain any labels). However, if the states are named, a possible Windows rendering could be a combo box having 4 states (combo box can be chosen because it is a Windows component that contains labels). So for the same States Matrix 760 d-size value, rendering possibilities change according to the String Max Length 215 values. Notice that as presented in FIG. 16, in both renderings the current selection is {1}.

Consider now a States Matrix d-size 760 equal to {2, 3} (third row) and a null Bitmap Size 220 (first column). The generated rendering must represent a selection over {2, 3} (6 states). Those states can be either unnamed (String Max Length 215 is 0) or named (String Max Length 215 is >0). If states are unnamed, it can be expressed in Windows as a check box that sets the first dimension value and a track bar that sets the second dimension value. Both the check box and the track bar were chosen for rendering because they do not contain labels. However, if the states are named, it can be expressed in Windows as radio boxes setting the first and second dimension value. The radio boxes are spread in width and height since the State Matrix d-size 760 is two-dimensioned. As presented in FIG. 16, in both renderings the current selection is {1, 1}.

Notice that all the cases discussed, Bitmap Size 220 was null (there is no bitmap). In the case Bitmap Size 220 was not null, the rendered components would have had a bitmap associated to a string (if String Max Length 215 is >0) or only a bitmap (if String Max Length is 0). A rendering possibility is also shown for each case. It will be seen that the choice of different Windows components is not discussed in the samples shown in FIG. 16. The rendering rules will be discussed in detail in further detail below.

Returning to FIG. 10B, The Selections Matrix 400 (the Control CC 74 Values Matrix) holds all the selections in the Control CC 74. If the values (d-coordinates in this case) User-Defined Flag is set to "false", the Default Storage System 420 will store the Selections Matrix 400 of the Control CC 74. The selection values can be changed anytime with method setselection(dnum sel, dnum index=dnumnull) 425. The parameters should satisfy sel>=0, sel<States Matrix 405 d-size, index>=0 and index<Selections Matrix 400 d-size. The end-user may also send setselection events to the application logic, with the same parameters, i.e. setselection(dnum state, dnum index=dnumnull) 425.

If the values User-Defined Flag is set to "true", the Selections Matrix 400 is stored in a User-Defined Storage System 430. Method updatevalues(dnum pos, dnum range) 435 (pos>=0, range>=0, pos+range<=Selections Matrix 400 d-size) will refresh the state rendering whenever a corresponding change in the proprietary state storage mechanism of the application logic has occurred.

With reference to FIG. 10C, a Text CC 76 is used to enter text strings. The Text CC 80 consists of a collection of characters such as 'U', 'S' or '$'. There are also control characters, such as LF (line feed) to indicate a line is over and FF (form feed) to indicate a page is over.

The Number of Dimensions 455, entered at Initialization time, specifies the number of dimensions of the text, which is greater or equal to 0. The Text CC 76 is multi-dimensioned, as a collection of characters can span over multiple dimensions. A 0d text is always a single regular character (not a control character). No extra characters can be added or removed. A 1d text is one list of characters (a line), whereas a 2d text is a list of list of characters (a page), and so on. On any dimension, insertion and deletion are possible. Control characters are used to switch to the next unit in a given dimension. LF switches to the next unit in dimension 1 (a switch to the next line) and FF switches to the next unit in dimension 2 (a switch to the next page).

The Maximal Length 460, set at Initialization time, is a number indicates the maximal character count for all texts in the Values Matrix. The number of characters in any Text CC 76 text value will never exceed the Maximal Length 460. However, if the Maximal Length 460 is set to −1, the text can have any length and the number of characters in the Text CC 80 can grow indefinitely.

The Text View 465, entered at Initialization time, is a d-size specifying the number of characters rendered to the user on each text dimension. It can be considered as a view area, expressed in text character units. The Text View 465 must have the same number of dimensions than the text Number of Dimensions 455. It is used in the rendering process to define the dimensions of the displayed text component, especially when the Values (texts) Matrix has multiple dimensions.

The Texts Matrix 450 (the Text CC 80 Values Matrix) holds all texts in the Text CC 76. If the values (texts in this case) User-Defined Flag is set to "false", the Default Storage System 470 contains all texts of the Texts Matrix 450. The settext (dnum pos, long lengthtoremove, char*string, long stringlength, dnum index=dnumnull) 475 method modifies, for the text pointed to by index, its content, at the d-coordinate specified by pos, by removing lengthtoremove characters and adding stringlength characters taken from string. For this method, index>=0, index<Texts Matrix 450 d-size, pos must point to a text character and from pos, lengthtoremove must not exceed the number of characters. There is also a settext event that can be invoked from the end-user. It has the same parameters as settext(dnum pos, long lengthtoremove, char*string, long stringlength, dnum index=dnumnull) 475.

If the values User-Defined Flag is set to "true", the Texts Matrix 450 is stored in a User-Defined Storage System 480. Method updatevalues(dnum pos, dnum range) 485 (pos>=0, range>=0, pos+range<=Texts Matrix 450 d-size) will refresh the text rendering whenever a corresponding change in the proprietary text storage mechanism of the application logic has occurred.

It will be understood that the data structures described above allow user interfaces to be modelled conceptually. Once the user interface is enclosed as a CUI, it may be rendered on a particular target device.

The Rendered UI (RUI) is the concrete, 3D replica of the Conceptual User Interface (CUI) that is visible and controllable from the end-user. Like the CUI, it is also a stack of trees that are modeled according to their corresponding ones in the CUI, but containing Device Components (DC's) instead of conceptual components. Unlike the three kinds of CCs, the set of possible Device Components is different from one client platform to another.

A DC is a tangible version of a linked CC (a CC accessible from the CUI) that uses for rendering specific, native components (NC's) that are proprietary to the device operating system such as, in Windows for example, an overlapped window, a push button, a checkbox, a dialog box, toolbar. Therefore, DCs are different from one platform to another.

The Rendered User Interface (RUI) must fill the following tasks.

1. It selects the required DC types to render CCs. A DC, contrary to a CC, is not conceptual, and is truly rendered to the end-user using Conceptual Components (CCs). Many types are possible. There is always one associated DC for one linked CC, but its type is selected depending on the parent DC type and the CC attributes set at initialization time.
2. When requested by the application logic, it takes device-specific events from the end-user and converts them into Conceptual Events sent to the corresponding CC, if applicable. All Conceptual Events are returned to and then processed by the application logic.
3. It stores all the CC values that are not user-defined. Retrieval and modification methods can be called to get and set values.

The number of DC types, unlike the three CC types, can be extended to reflect different client contexts. For instance, in Windows, a Control CC with a 0-dimensioned states matrix can be rendered as a Menu Command DC or a Push Button DC, depending on the context (overlapped window menu or client window).

The RUI makes the link between an abstract CUI and a specific platform user interface made of NCs. Therefore, its rules and links to device NCs must be coded once per platform by using platform-centric methods.

Figure 25:
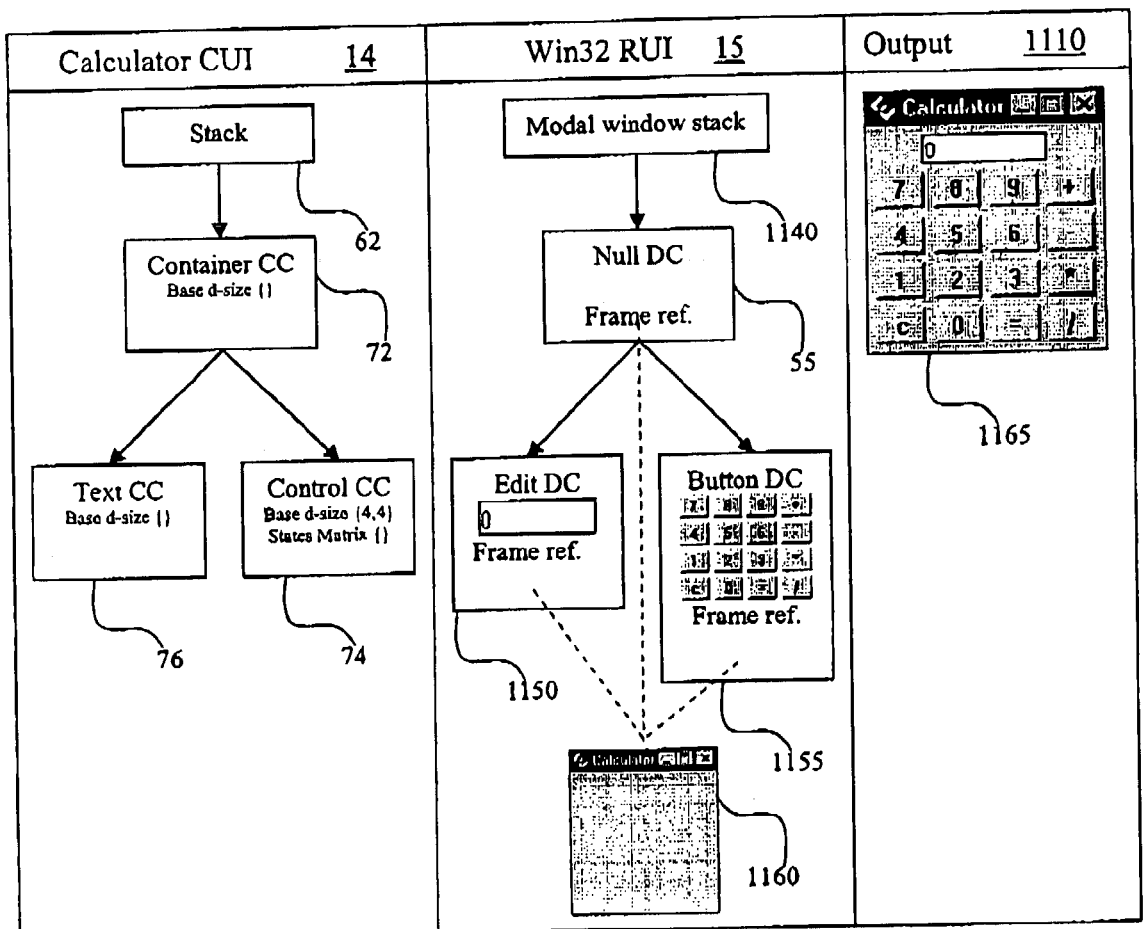
FIG. 25 shows an example of the rendering of a Calculator Conceptual UI using Windows GUI.

Any RUI, to render a CUI, must hold a structure that tracks the one in the CUI. As an example, referring to FIG. 25, schematically shown is a simple Calculator CUI 14 rendered with the Windows RUI 15 and the Output 1110 generated from the Windows RUI 15. The Calculator CUI 14 has only one element pushed in the Stack 62: a Container CC 72 that holds both the numeric display and the buttons matrix. The numeric display is a Text CC 76 with a 1-dimensioned text. The Control CC 74 contains the entire buttons matrix: its base d-size is {4, 4} (16 selections) among { } states (1 state). The application logic is responsible for setting the matrix labels and modifying the numeric display when setselection conceptual events are received.

The Windows RUI 15 is, for a Windows environment, a Modal window stack 1140 which is initially empty. When a CC tree is pushed in the Stack 12, the Windows RUI 15 will also push a Windows DC tree on the Modal window stack 1140. In the example, for each CC of the CC tree (Container CC 72, Text CC 76 and Control CC 74), there is a corresponding DC in the DC tree (Null DC 55, Edit DC 1150 and Button DC 1155). The number of DC types for the Windows environment is far larger than the three applicable for CCs to reflect the richness of the GUI.

The type of each DC in the tree is determined by examining the parent DC type and the CC attributes set at Initialization time. There is no parent DC type for the Container CC 72, so by default for containers, a Null DC 55 is created. Since the Null DC 55 has no frame, it creates one (an overlapped window 1160 in this case because it is the Root DC and the first pushed DC in the RUI—it would have been a modal dialog box otherwise) and removes it when it is destroyed. This frame reference will be passed to all children of the Null DC 55.

The Edit DC 1150, associated to Text CC 76, contains a matrix of Edit controls. Since the values matrix d-size is { }, there will be only one Edit control in the matrix. This Edit control will have as parent window the overlapped window 1160 sent by Null DC 55.

The Button DC 1155, associated to Control CC 74, contains a matrix of Button controls with style Pushbutton. The values matrix is {4, 4}, allowing 16 selections within a state matrix of d-size { } (1 state). Within an overlapped window, the only child control allowing a state change from { } to { } is the pushbutton. When it is pressed, it triggers the setselection({ }, index within {4, 4}) event. Thus, there will be a matrix of 16 pushbuttons. These pushbuttons will have as parent window the overlapped window 1160 sent by Null DC 55.

The resulting window 1165 in the Output 1110 column is laid out according to the DC order and the most natural layout of controls within the overlapped window. In this case, it is logical to place the button matrix below the edit field. The layout has been obtained from an algorithm explained below.

It will be recognized that it is possible to physically separate the Win32 RUI 15 (and the output 1110) from the Calculator CUI 10 by a network. The Win32 RUI 15 would be constructed from the remote Win32 RUI 15 by establishing an appropriate communication protocol between the local and remote devices. Furthermore, it is straightforward to devise a multi-user access to a single application from different devices, since it is the responsibility of each device to render the generic source application. Therefore, each user would "see" what others do on their respective device, unless establishing in the implementation proprietary CC Values matrices for each user. In this case, each user would have the impression to interact with a single thread, but really, a single thread would handle all users.

Device Components (DCs) act like intermediates between Conceptual Componentes (CCs) and Native Components (NCs). Any DC performs an implementation of a logical use case of NCs. For example, it is logical in Windows to create a dialog box, then child controls within the dialog box. It is not logical, even if it is technically possible, to create an edit child control within a push button child control. The set of DC types is created to ensure logical combinations of NCs, to manage logical usage of the targeted platform UI, when rendering a CC tree.

Figure 21A:
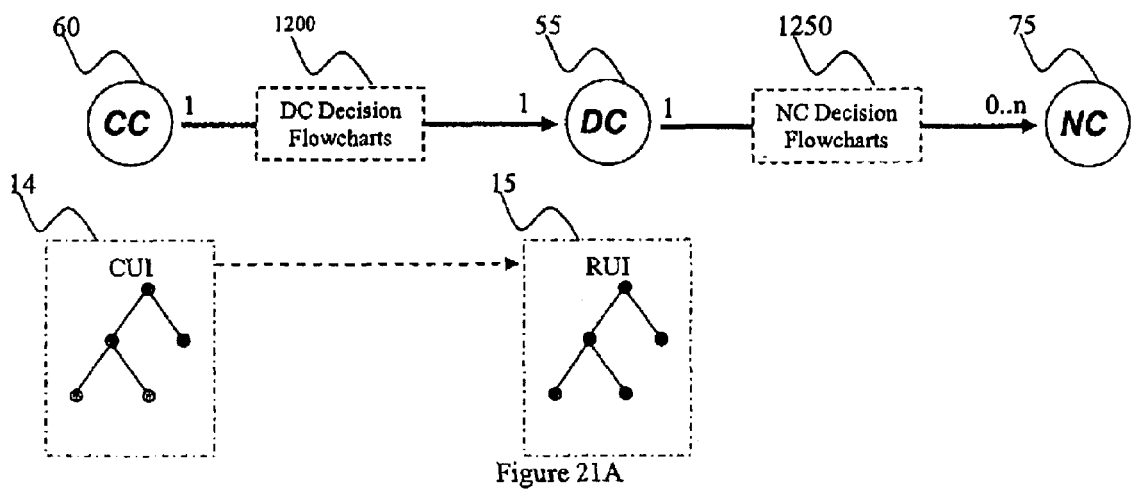
FIG. 21A shows the two steps for rendering a Conceptual Component into Native Components.

Referring to FIG. 21A, the steps required to render a CC tree in the CUI 14 stack begin by creating the Device Component tree in the RUI 15 stack. For each CC 60 in the CUI 14, a Device Component (DC) 55 in the RUI 15 must be initiated with a correct DC type. Since there can be many types of DCs 55, depending on the complexity of the platform user-interface, a set of DC decision flowcharts 1200 proprietary to the end-user device is required. Second, the DCs 55 in the RUI 15, according to their type, must generate all NCs 75 that form the rendered output. The passage from a DC 55 to NCs 75 is based on a set of NC decision flowcharts 1250 proprietary to the end-user device. A set of DC decision flowcharts 1200 and a set of NC decision flowcharts 1250 for the Windows platform (in FIG. 23A to FIG. 23H and FIG. 24A to FIG. 24E) provide a detailed example on how such flowcharts should be devised.

The creation of a DC tree in the RUI 15 follows the top-down method, as opposed to the CC tree in the CUI 14, created by the bottom-up approach. It means the Root DC 55 is created first, then its children, then its grandchildren, etc., following the tree structure of the corresponding CC tree from the CUI 14.

Figure 21B:
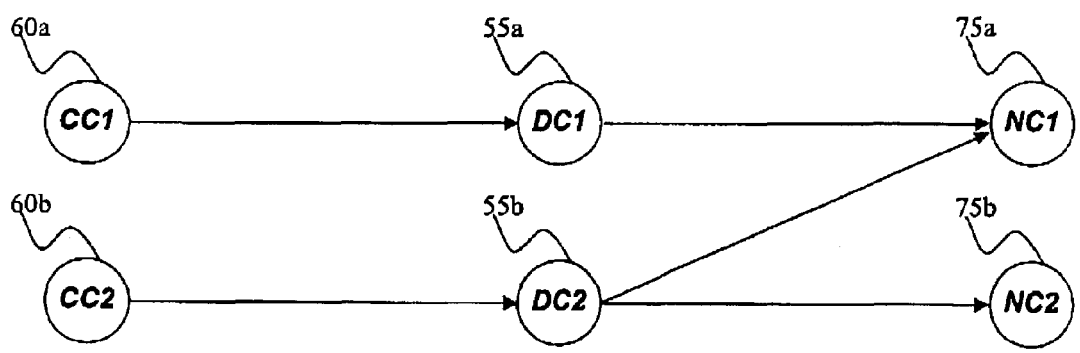
FIG. 21B shows that different device components (DCs) can be rendered using common native components.

The CC 60b to DC relationship is one-to-one. Referring to FIG. 21B, two Conceptual Components, CC1 60a and CC2 60b are respectively associated to Device Components DC1 55a and DC2 55b according to the DC decision flowcharts proprietary to the client device. However, the DC to NC relationship is always one-to-many. By using the proprietary Native Component (NC) decision flowcharts, the DC1 55a generates one NC, NC1 75a, whereas the DC2 55b generates two NCs, NC1 75a and NC2 75b. Furthermore, NCs can be reused by more than one DC type. For example, NC1 75a is used by both DC1 55a and DC2 55b.

Figure 33:
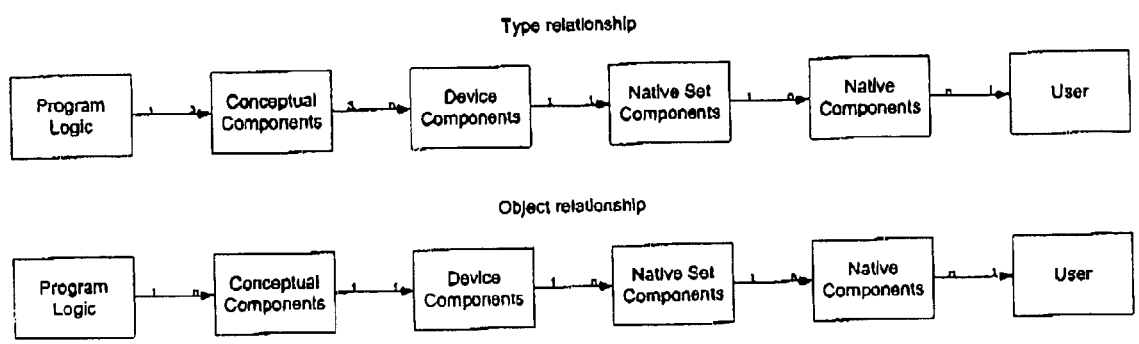
FIG. 33 shows a relationship between types and objects in the Conceptual interfacing process.

To generalize the relationships of types and objects from FIG. 21, referring to FIG. 33, the rendering implementations experiments show that the type and object relationship summary shown therein should be followed, regardless of the target device. In the type relationship chain. There is one application type (program logic) that addresses three conceptual component types. These three types may be converted to many device component types, using state machines as explained further below. A device component type is always associated to a single native set component type, which shows that the native set component type is driven by the DC type. However, native set components (NSCs) are made of 0 to many called native components types here (native widget types), to accommodate DCs if a single NC is not sufficient (for instance, a Text CC with one value would have one NSC made of two NC, a static label and an Edit field). Finally, the set of native component types used are rendered to a certain type of user, which depends on the nature of the application.

The object relationship is different from the type relationship. The program logic may generate as many CCs as required. However, as we've seen, there is one DC object for each CC object so the DC tree has the same topology as the CC tree. DCs may generate many NSCs, which in turn can generate many native components, presented to the user. By strictly following the type-object relationship in any rendering implementation, and the guidelines described below (using Windows as an example target device) to identify and implement DCs and NCs, a programmer implementing such rendering will save a lot of hassles.

Figure 22:
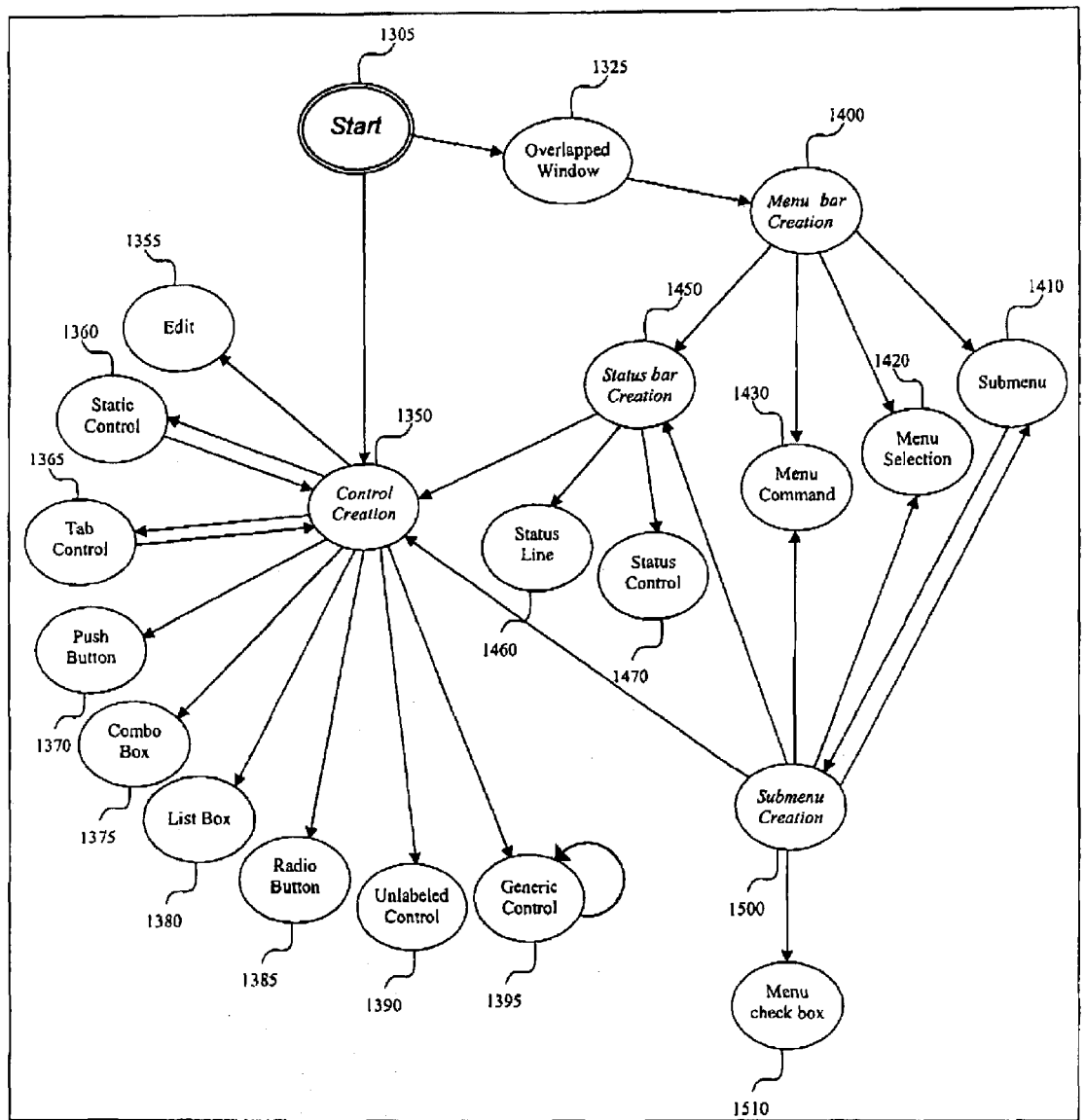
FIG. 22 shows the state machine composed of Windows device components as states, and their possible transitions when creating a device component tree.

Any set of DC types can be organized in a state machine to illustrate the creation order of DCs when generating DC trees. Referring to FIG. 22, the Windows state machine 1300 represents Windows DC types such as Tab Control 1365, Menu Command 1430 and Overlapped Window 1325. All states are terminal states, except for the states in italic (Start 1305, Menu bar Creation 1400, Status bar Creation 1450, Control Creation 1350 and Submenu Creation 1500) which are transitory states. The construction of a DC tree from a CC tree will follow this state machine and always begins at Start 1305. Depending on the Root CC, a transition will be made either to Control Creation 1350 or Overlapped Window 1325. If the transition is made to Control Creation 1350, another transition is immediately required to determine the DC type of the Root CC, since Control Creation 1350 is transitory. This transition will end to one of many DC types, such as Combo Box 1375 or Unlabeled Control 1390. Then, for children of the Root CC, other transitions begin from the current state. Thus, the state machine 1300 can be applied to all CCs of a CC tree, allowing the construction of the DC tree. The state machine 1300 rules for all transition are detailed in FIG. 23A to FIG. 23H flowcharts.

It will be understood that more sophisticated state machines 1300 (with more states) can, and should, be devised for Windows. The one shown here simply illustrates that construction of complex Windows rendering of applications can be performed from conceptual concepts. Also, the state machine (with accompanying flowcharts) techniques used in this case for Windows are equally applicable to any other platform, simple or complex and should be considered as guidelines for constructing rendering adapters.

Figure 23A:
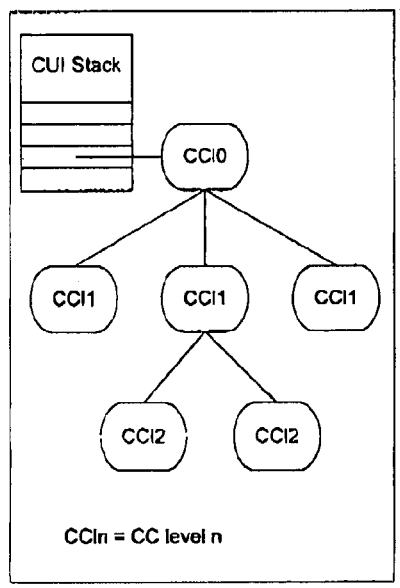
FIG. 23A to FIG. 23H show, using flowcharts, the DC tree construction algorithm for the Windows GUI.

Based on FIG. 22 state machine 1300, now referring to all figures from FIG. 23A to FIG. 23H, a DC tree construction algorithm has been devised with a hierarchy of flowcharts, applicable to the Windows GUI. For the sake of simplicity, it does not take into account for all CCs the images matrix superseding the conceptual Values Matrix, the semantic type and for Container CCs, the select CC flag. Referring to FIG. 23A, the terminology used to understand the following flowcharts specifies that CC0 means CC level 0 (Root CC in fact), CCl1 means CC level 1, which is any child of the Root CC, CCl2 means CC level 2, which is any grandchild of the Root CC, and so on. CCln means a CC at level n, and CCln+1 means any child of a CCln. The same leveling terminology also applies to DCs.

Figure 23B:
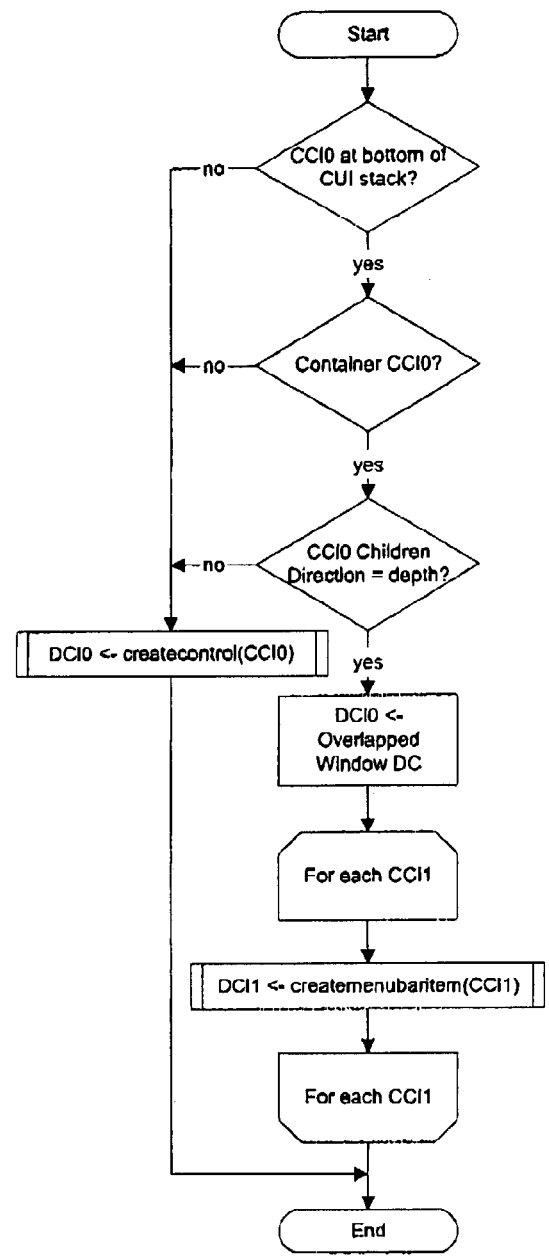

Referring to FIG. 23B, the main flowchart of the DC tree construction algorithm is shown. At this point, it is determined whether the DCs will be within a modal dialog box purely made of child controls or within the main overlapped window, since many DC types such as Menu Selection DC and Status Line DC are only useable in overlapped windows (in dialog boxes, these DC types cannot be used). The rule of thumb for using overlapped window-related DC types is the CC tree being the first pushed on the CUI stack and the Root CC being a Container CC where children direction is depth (by convention for sophisticated GUIs with wide displays, the depth can always be processed in a proprietary fashion, to ease the access to information). In this case, the DC created from the CCl0 is the Overlapped Window DC itself, and children are assumed to be menu bar items for now. If not, the DC created from the CCl0 is a child control that will be enclosed within a modal dialog box.

Figure 23C:
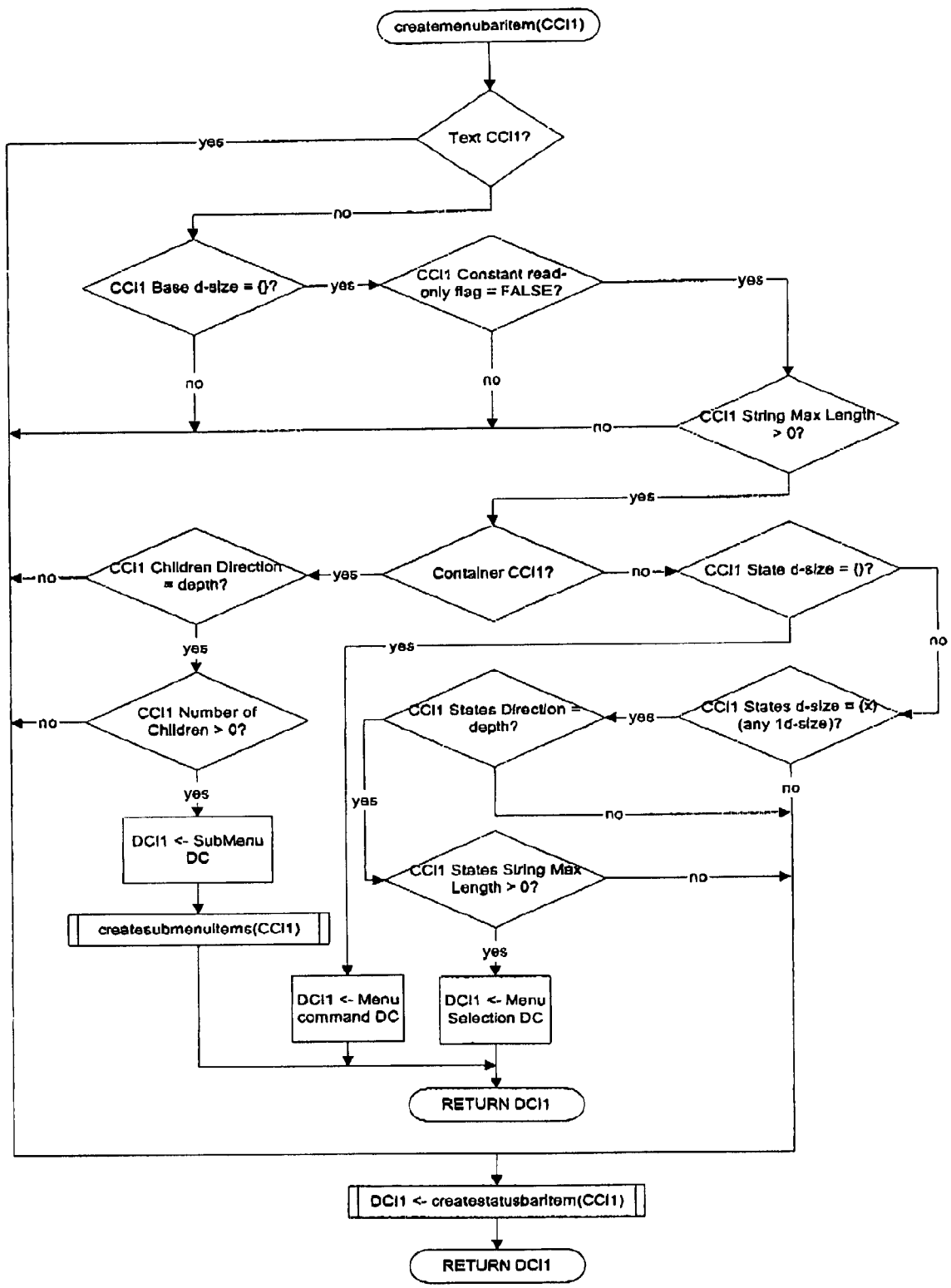

Referring to FIG. 23C, the menu bar item construction flowchart verifies if the CC is qualified to become a menu bar item. In order to qualify, the CC must not be a Text CC, must be 0-dimensioned and constantly read-only. If the CC is a Control CC, its states matrix must either be 0-dimensioned (generating a Menu Command DC) or 1-dimensioned, along the depth, with labels (generating a Menu Selection DC). If the CC is a Container CC, there must be children aligned on the depth direction. In this case, a Submenu DC is generated. Any other kind of CC is assumed to build a corresponding DC which type is linked to the overlapped window status bar.

Figure 23D:
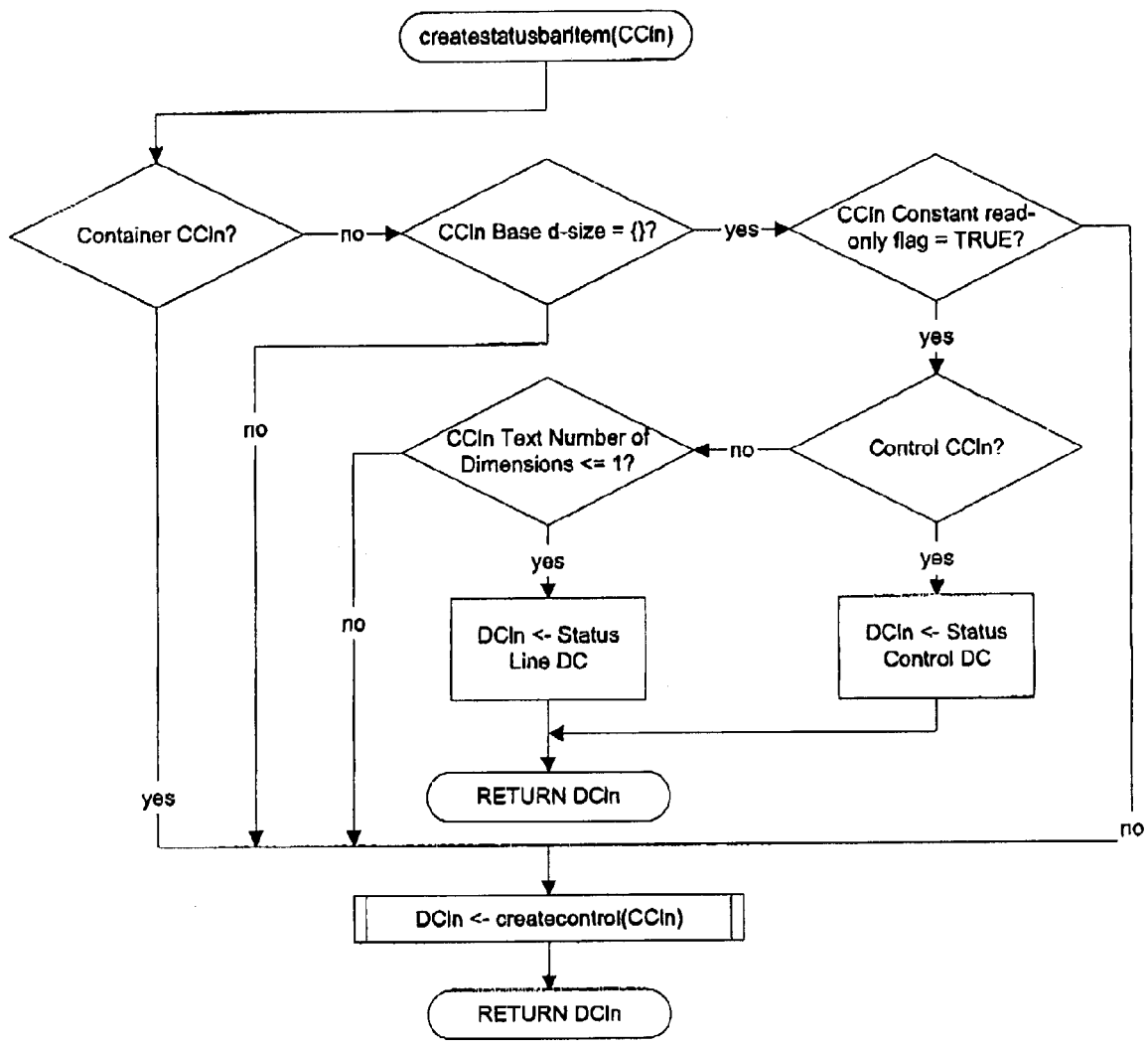

Referring to FIG. 23D, the status bar item construction flowchart verifies if the CC is qualified to become a status bar item. Basically, the CC must not be a Container CC, must be 0-dimensioned, not constantly read-only and having a string label. If the CC is a Control CC, the DC generated is a Status Control DC, where only the current selected state is displayed in the status bar, besides the label if any. If the CC is a Text CC, the text number of dimensions must be less than or equal to 1 (a line or a single character). If so, a Status Line DC is generated. Any other kind of CC is assumed to build a corresponding DC which type is linked to the overlapped window client rectangle, where child controls take place.

Figure 23E:
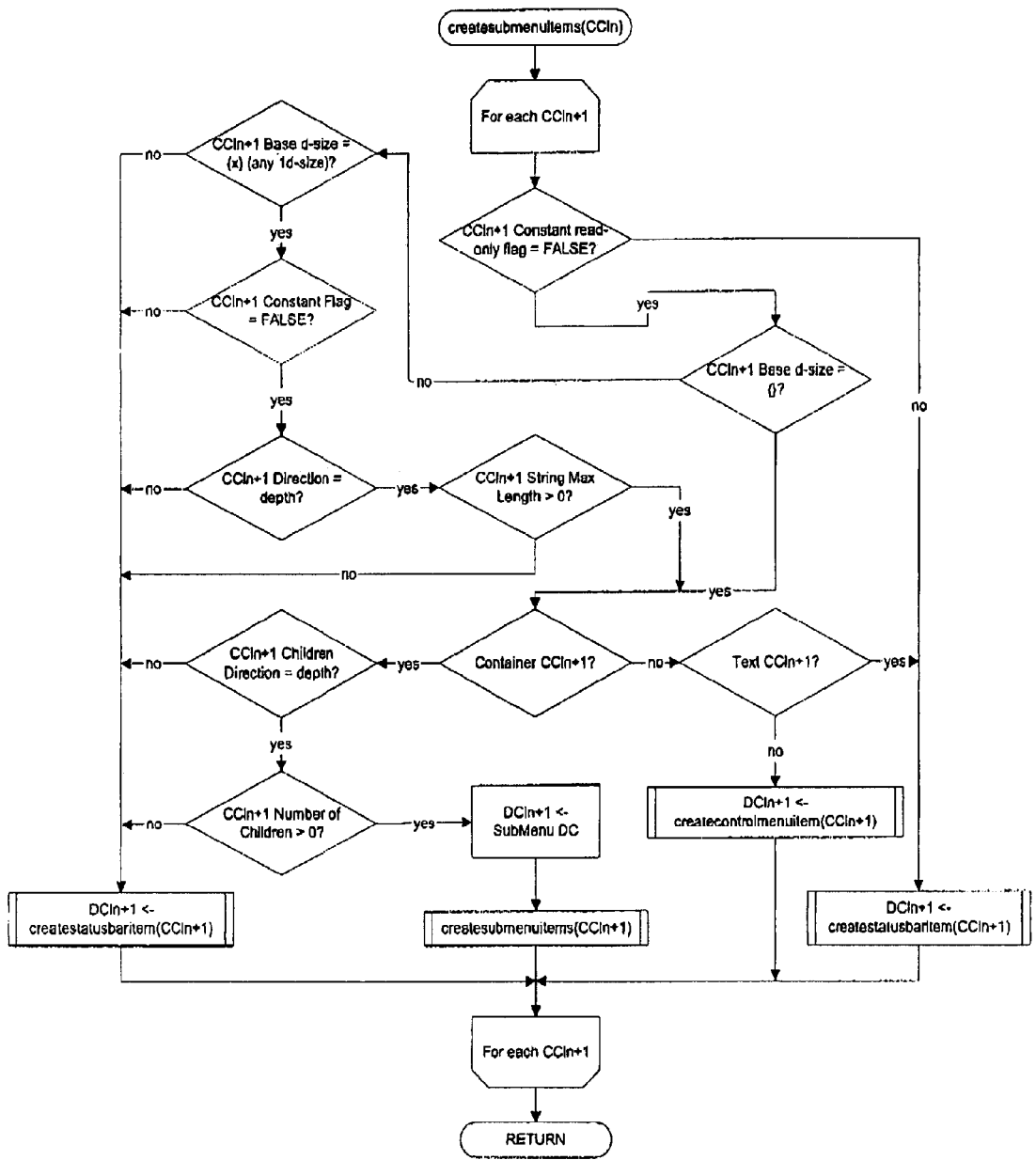
Figure 23F:
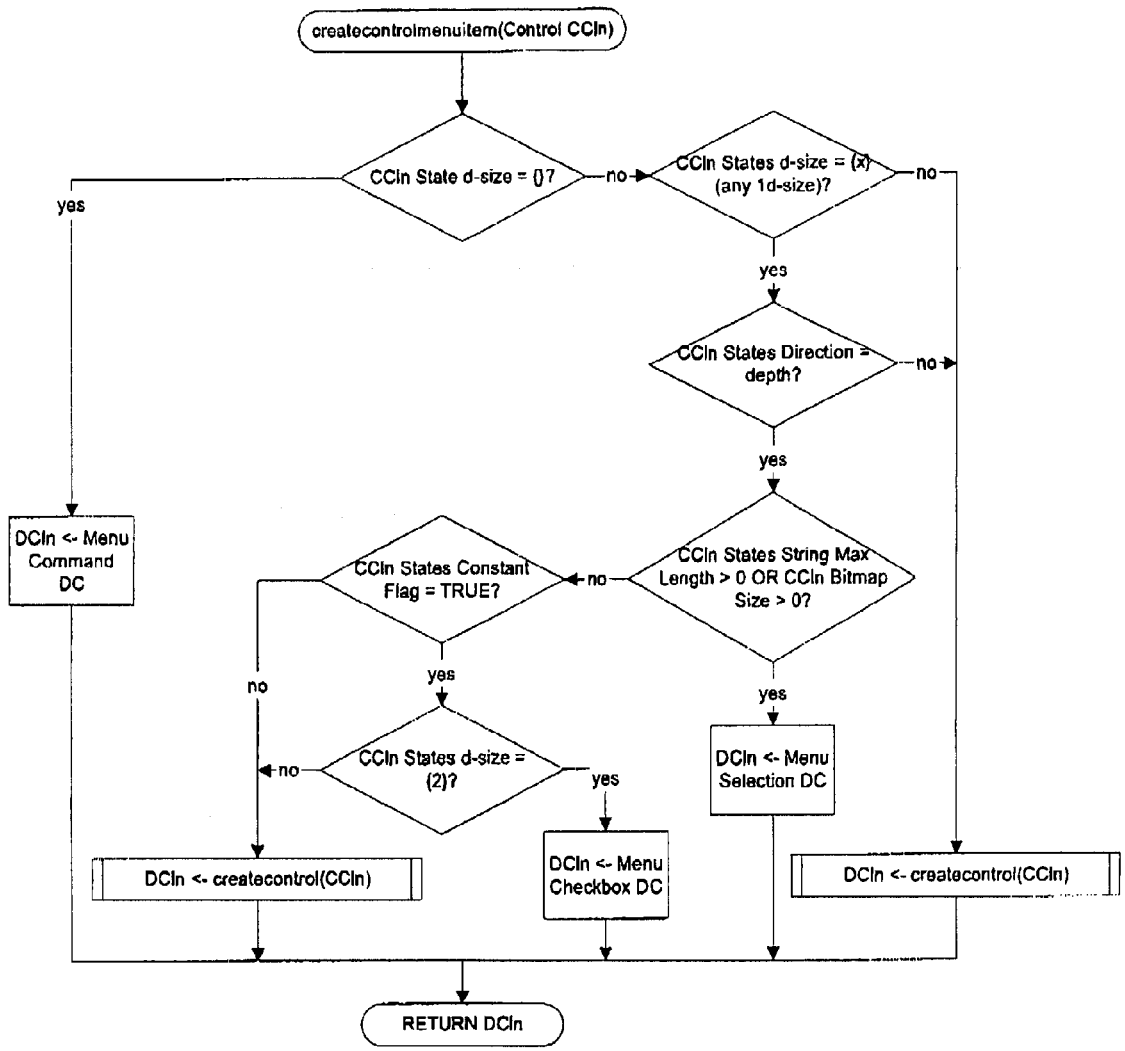

Referring to FIG. 23E and FIG. 23F, the submenu item construction flowchart has almost the same behavior as the menu bar item construction flowchart from FIG. 23C. Referring to FIG. 23E, the main exception is to allow 1-dimensioned CCs to become submenu items, as long as the dimension constant flag is false, aligned on the depth direction and has labels. Furthermore, referring to FIG. 23F, there is another exception that happens when the states are unlabeled, constant and their number is 2 (generating a Menu Checkbox DC). Any other kind of CC is assumed to build a corresponding DC which type is linked to the overlapped window status bar in FIG. 23E or to the overlapped window client rectangle in FIG. 23F.

Figure 23G:
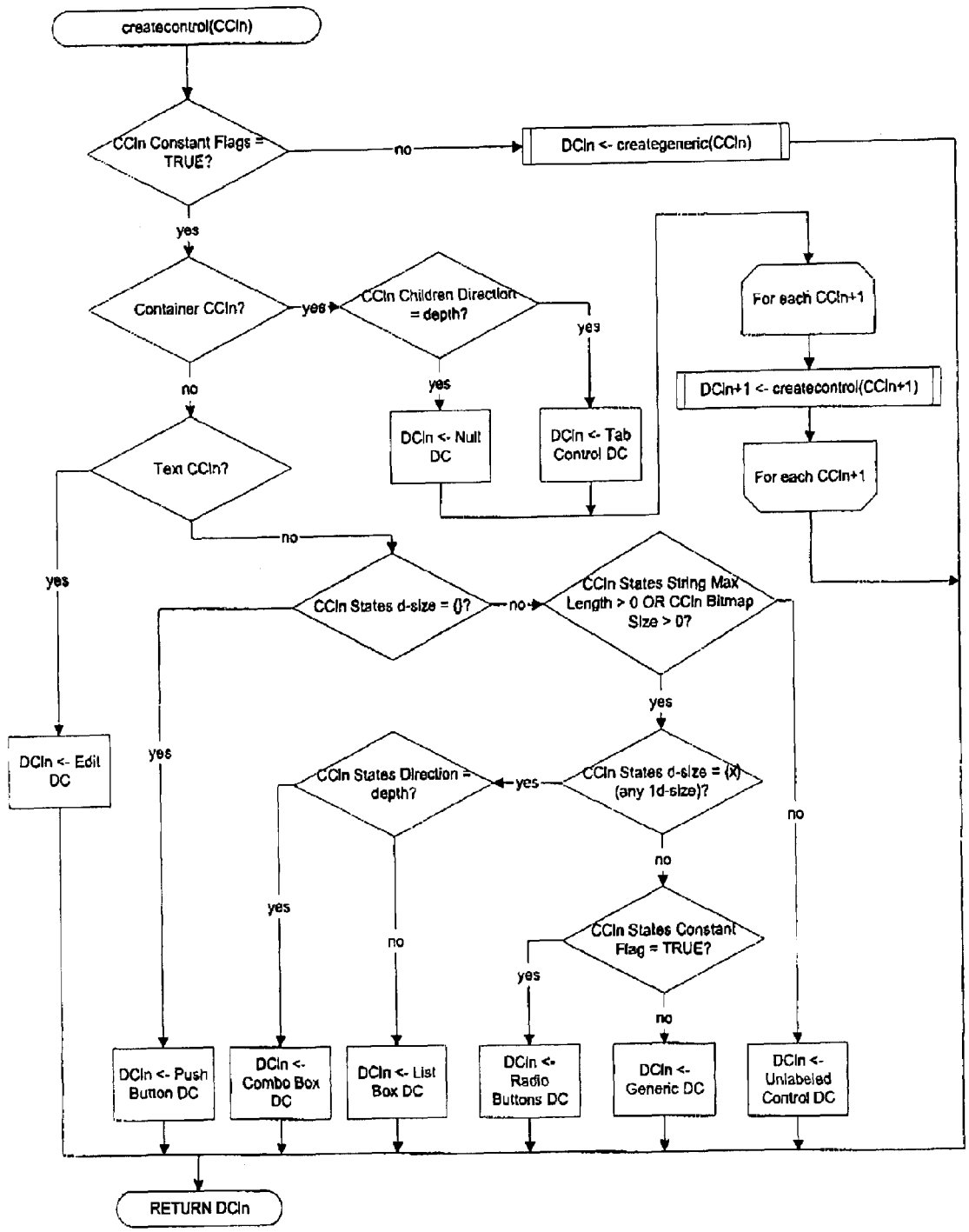

Referring to FIG. 23G, the child control construction flowchart verifies if the CC is qualified to become a child control CC. At this stage, depending on the CC attributes, the DC will be either Null DC, Tab Control DC, Edit DC, Push button DC, Combo Box DC, List Box DC, Radio Buttons DC or Unlabeled Control DC. Any other kind of CC cannot logically be constructed using child controls and is assumed to build a corresponding DC which type is generic. Generic DCs can render any CC and consequently are the DC typing bottom line that ensures the correct mapping of any CC tree for any platform, as explained in the next section.

Figure 23H:
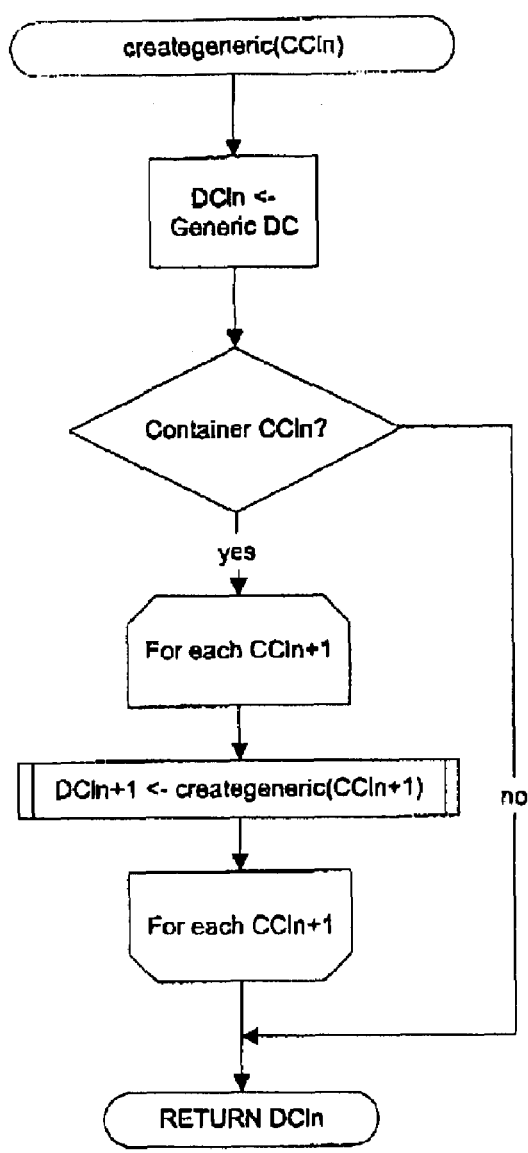

Finally, referring to FIG. 23H, it is shown than a Generic DC can only contain other Generic DCs.

Referring to all figures from FIG. 24A to FIG. 24E, a set of flowcharts illustrates the creation of Windows Native Components (NCs), starting from a created DC tree.

Figure 24A:
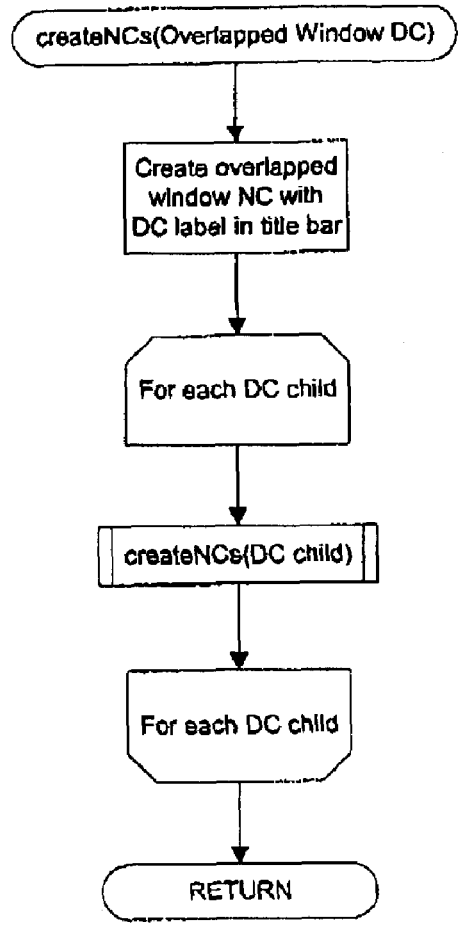
FIG. 24A to FIG. 24E show, using flowcharts, the NC construction algorithms for the Windows GUI.

Referring to FIG. 24A, the NC creation flowchart for an Overlapped Window DC simply creates the overlapped window NC and calls the appropriate NC creation algorithm that applies to each DC child of the DC.

Figure 24B:
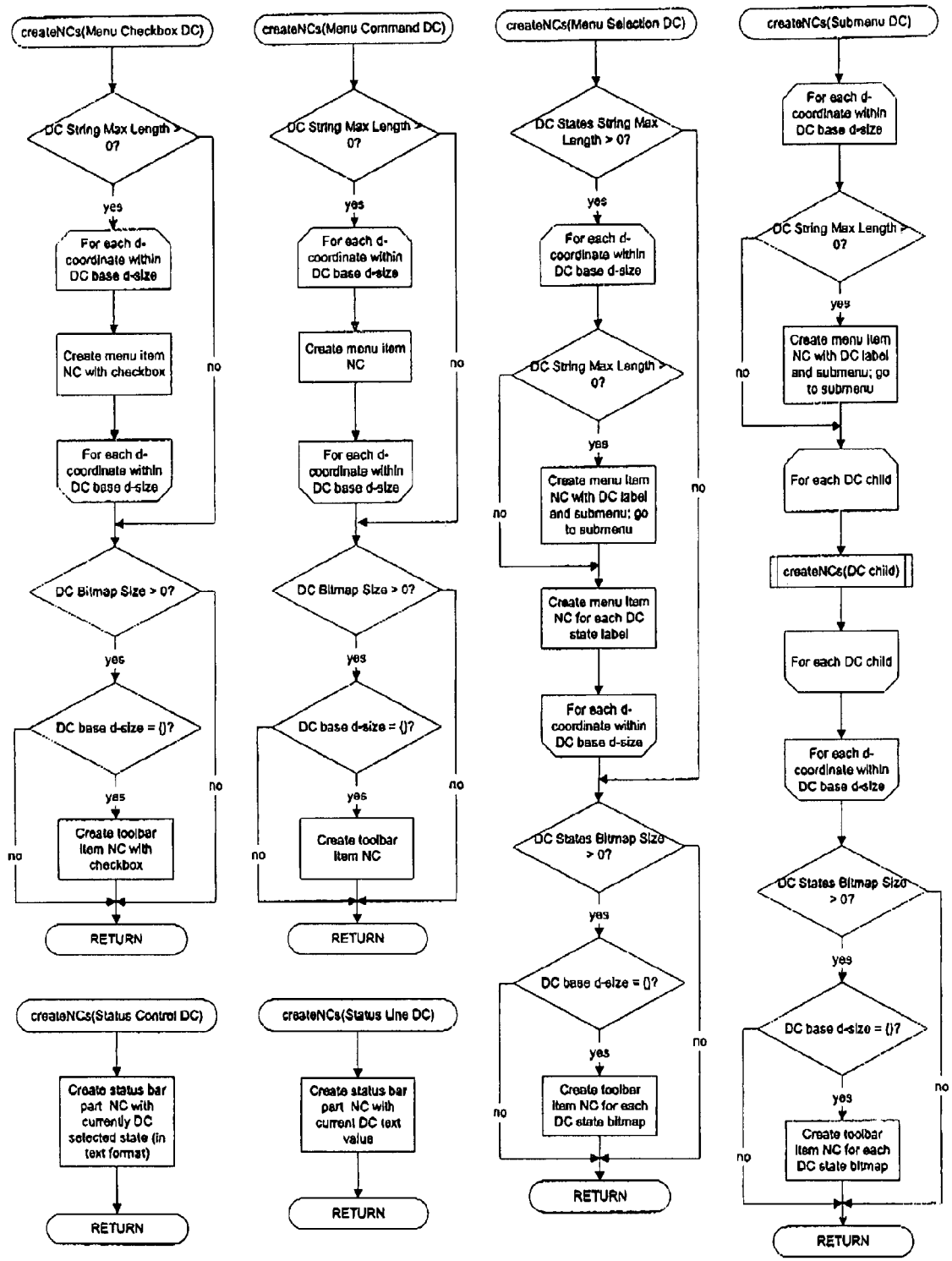

Referring to FIG. 24B, the flowcharts related to all menu and status bar DCs are illustrated. Correct menu items and submenu NCs are created for Menu Checkbox DCs, Menu Command DCs, Menu Selection DCs and Submenu DCs. Please note that NCs are created for all units of DC base d-size, in accordance with CUI rules regarding Values Matrix. Please also note that Windows toolbar items are created along with menu items when bitmapped labels are defined, to allow direct access to options. For the overlapped window status bar, the appropriate status bar parts NCs are created for Status Control and Status Line DCs. Since these DCs always have a 0-dimensioned Values Matrix, there is no need to loop through all base d-size units, which simplifies their NC creation flowcharts.

Figure 24C:
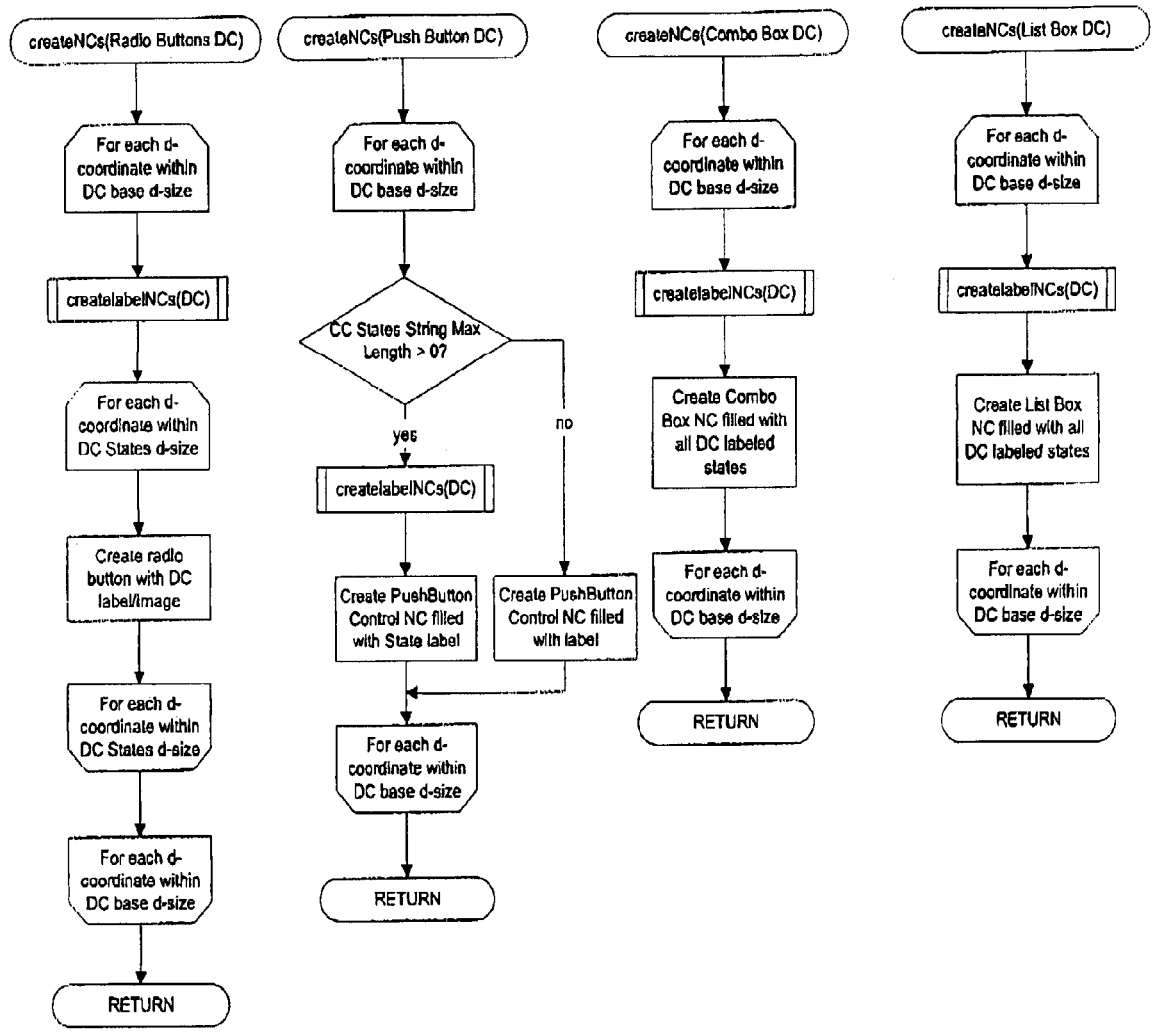
Figure 24D:
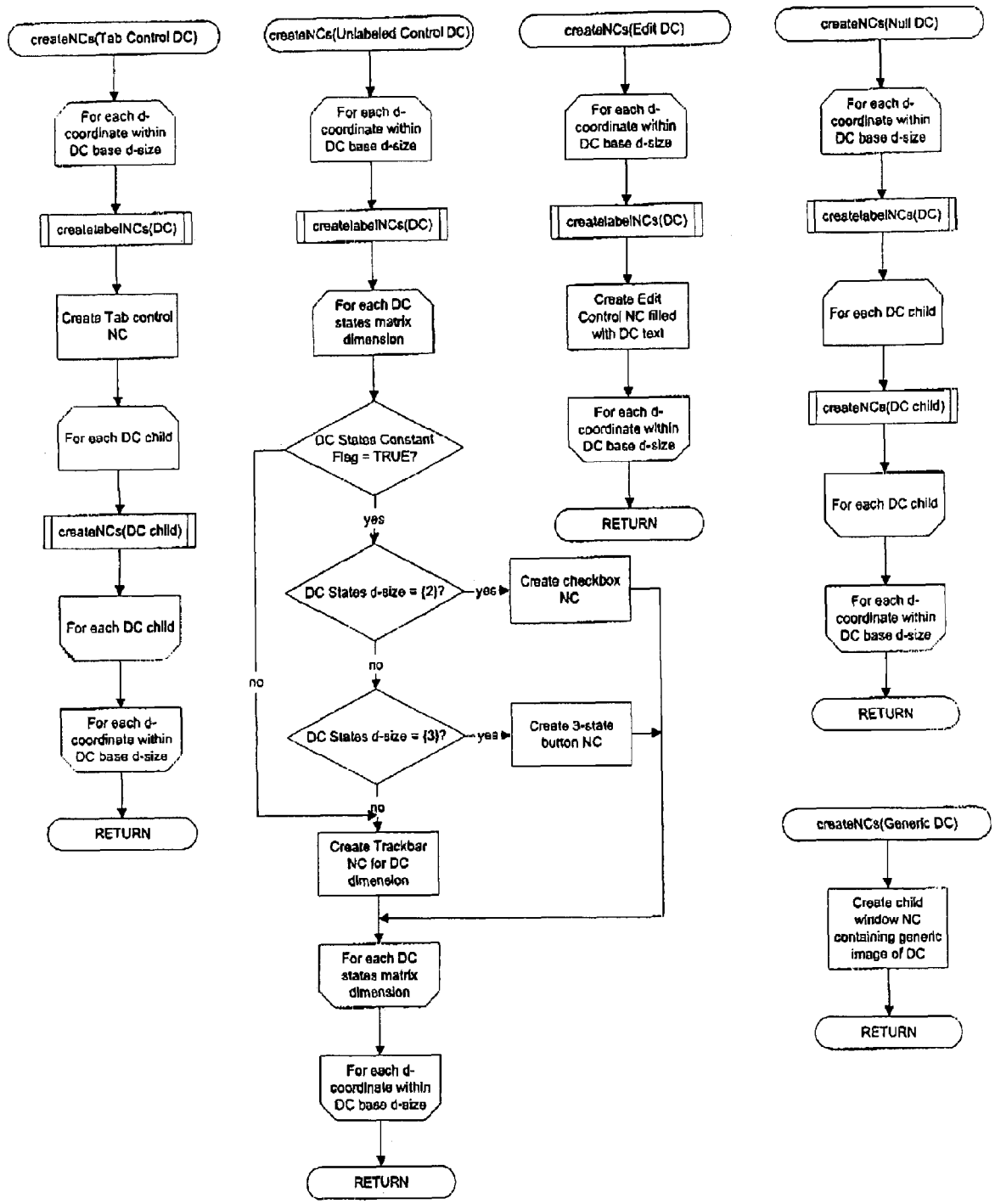
Figure 24E:
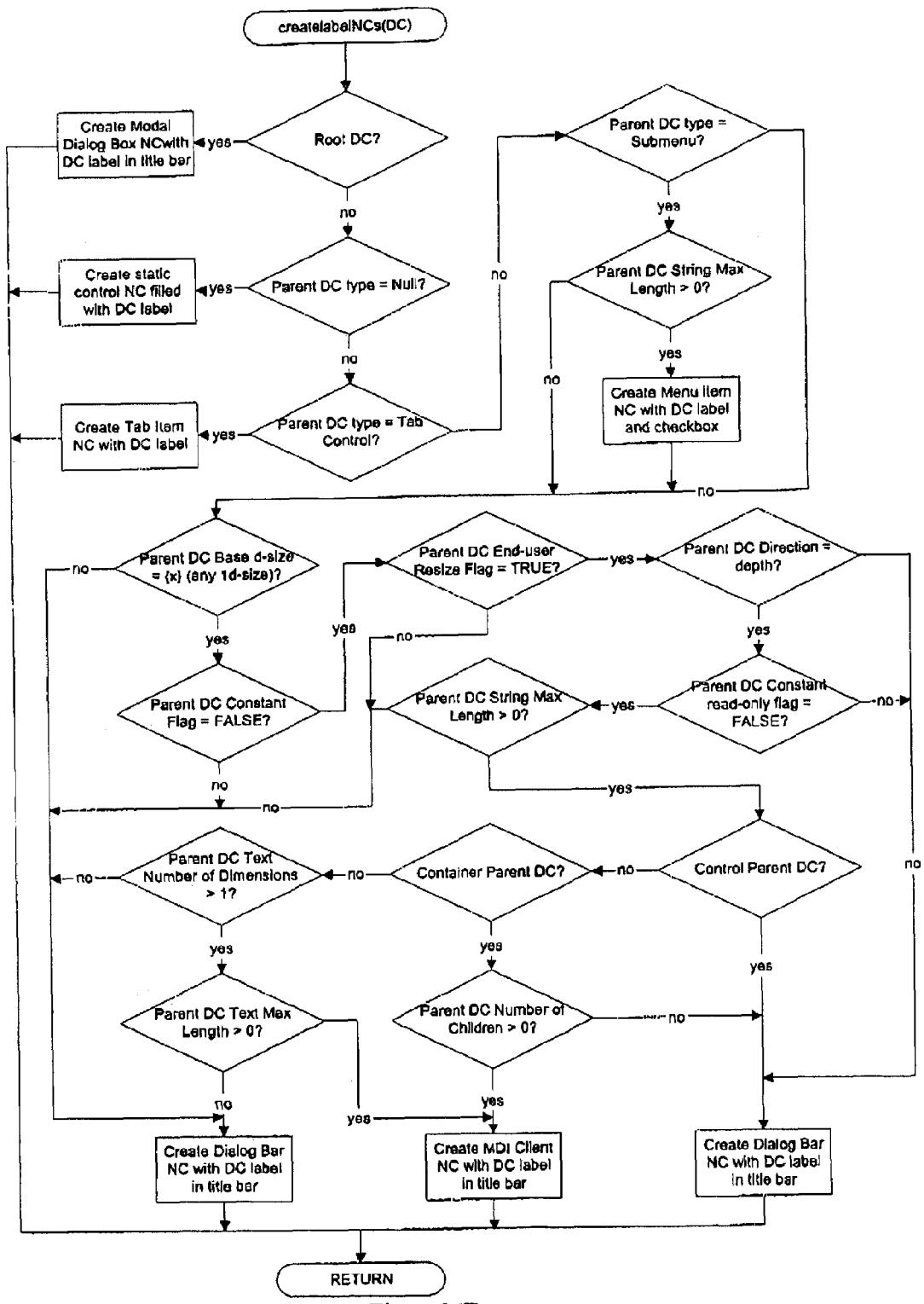

Referring to FIG. 24C and FIG. 24D, the NC creation flowcharts related to all child control DCs are displayed. Since all these DCs can have a Values Matrix that has dimensions, parsing through all Values Matrix units is required for creating NCs. Furthermore, for most DCs, the method createlabelNCs, detailed in FIG. 24E, has to be called to create label-related NCs such as static controls, dialog boxes, . . . The createNCs(Unlabeled Control DC) from FIG. 24D also shows that unlabeled controls have one anonymous selection child control per states matrix dimension, where the combination of child controls values form the selection (as shown in FIG. 11).

Figure 26:
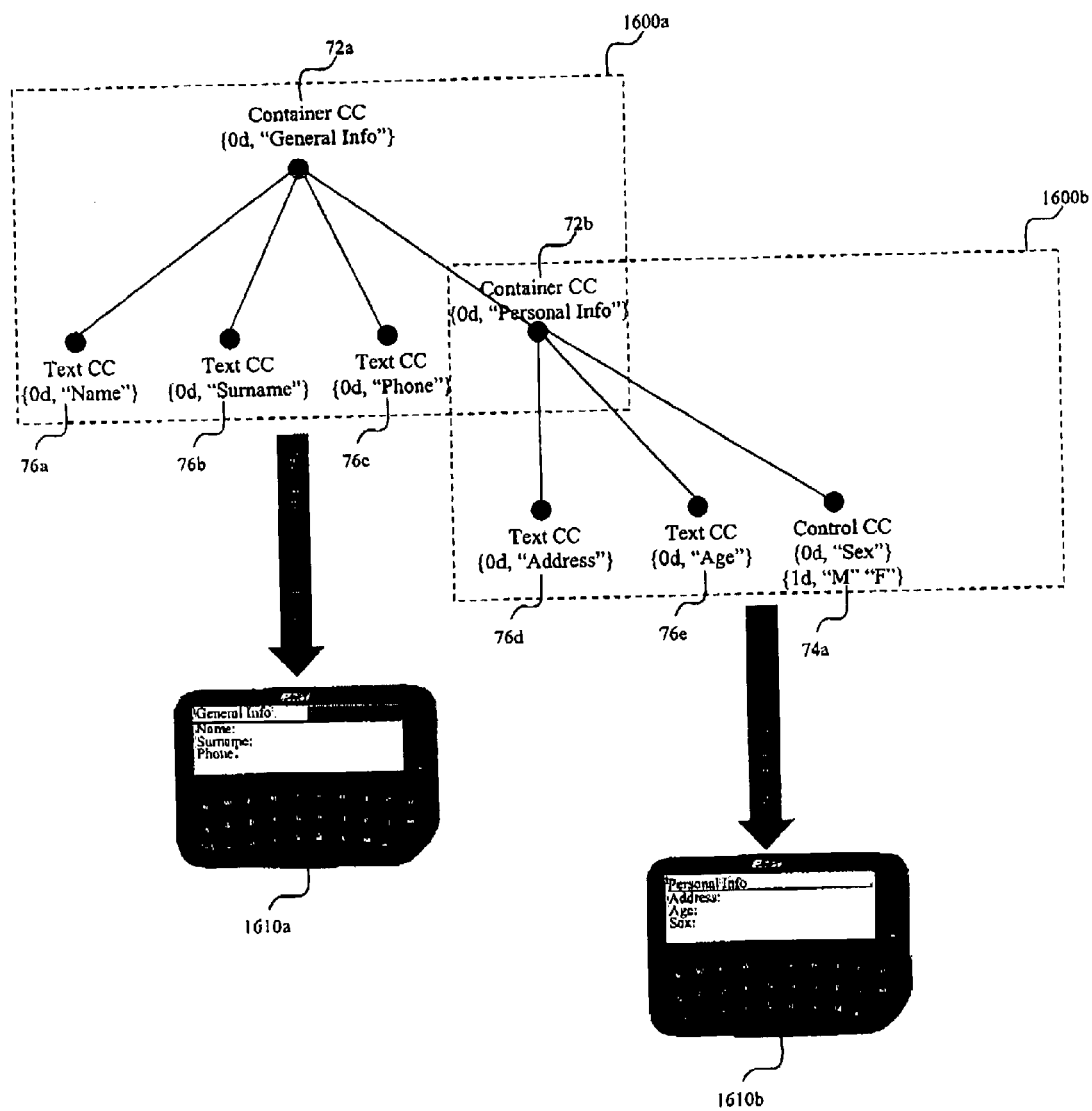
FIG. 26 shows the DC tree navigation principle applicable to platforms with limited user interface capabilities.

It has been demonstrated that for platform with sophisticated windowing interfaces, a DC tree can appear all at once to the end-user. For more limited platforms, in order to render complex DC trees within small displays, a navigation principle is often required. Referring to FIG. 26, a simple navigation example shows a Blackberry capable of displaying only one Children Set of a Container CC at a time. In order to navigate in the DC tree, consider the current end-user view 1600a, shown in the Blackberry 1610a, where the screen title has the Container CC 72a label, fields are labeled from the Text CC 76a, the Text CC 76b and the Text CC 76c and a menu option is taken from Container CC 72b. The end-user, in order to navigate down to view 1600b, must select in the Blackberry menu the Container CC 72b label. When selected, the screen title label is extracted form Container CC 72b and all fields and menu options are modified to reflect view 1600b in the Blackberry 1610b. The Blackberry menu will always have an extra "Close" option in order to go back from view 1600b to view 1600a. Besides this navigation principle, all principles and techniques that have been used in the Windows example, namely the state machine composed of DCs, the DC tree construction algorithm and the NC construction algorithms (all algorithms illustrated using flowcharts in this document) are equally applicable to the Blackberry and to any other platform.

A fast layout algorithm is desirable for Graphical User Interface (GUI) renderings to correctly arrange the different widgets within windows and dialog boxes. For this algorithm, the input is a set of rectangles (Device Components in this case), comprising widgets, organized in a tree structure. With respect to the tree structure, it is desirable to position the rectangles adequately. The reading order of the tree elements is important (e.g. in a tree with two leaves A and B, then, B can be positioned below or right of A in order to see A first, then B, but B cannot be put first, then A below or right).

This is in essence a combinatorial problem, but applied to GUIs. In order to solve it, a notation is used to express all possible rectangles arrangements. From this notation, rules are deduced that are fundamental in order to build the fast algorithm. A rectangle R is composed of a width, a height (in pixels in this case, both greater than or equal to 0) and a type (button, list box, etc.). The notation w(R) expresses the width of rectangle R and h(R) expresses the height of R.

Consider a simple tree of two rectangles, A and B. As noted previously, B can be vertically or horizontally aligned with A, which makes two combinations. Two operators will express "vertical" and "horizontal", namely - and |.

A|B means "B is horizontally aligned with A" (| is not related here to d-size accumulation); and A-B means "B is vertically aligned with A" (- is not related to "minus" here).

It will be understood that rectangular prisms could have been used (with a third depth dimension) instead of rectangles. This would require a third "depth" operator (/) if the layout domain. However, since a window is a two-dimensional object, it is not necessary here. It would be straightforward, however, to devise a 3D layout algorithm from the 2D algorithm presented here.

Both - and | operators return a surrounding rectangle C that accumulates (joins) A and B vertically or horizontally. Therefore, C=A|B really means:

w(C)=w(A)+w(B); and h(C)=MAX(h(A), h(B)), provided that MAX(x, y) returning the maximum number between x and y.

Additionally, C=A-B means:

w(C)=MAX(w(A), w(B)); and h(C)=h(A)+h(B).

Both operators are commutative (A|B=B|A) and associative (A|(B|C)=(A|B)|C=A|B|C). However, A|(B-C) is not equal to (A|B)-C. Therefore, parentheses are necessary in this notation, although only when priority conflicts occur.

Thus, the possible combinations of a set Q (not a tree) composed of rectangles a, b, c, . . . are the parentheses combinations of its elements, multiplied by two. As an example, there are three parentheses combinations for the set Q=(a, b, c):

(a,b,c)(a,(b,c))(a,b),c).

Since we have two possible operators between pairs of elements, we multiply these three possibilities by two.

(a|b|c)(a|(b-c))((a|b)-c)

(a-b-c)(a-(b|c))((a-b)|c)

To help design our algorithm, we will implement binary bracketing for all combinations, even those who have similar operators. By convention, A|(B|C) and A-(B-C) will be valid cases whereas (A|B)|C and (A-B)-C will be invalid cases. Therefore, our six combinations are the following, with respect to binary bracketing.

(a|(b|c))(a|(b-c))((a|b)-c)

(a-(b-c))(a-(b|c))((a-b)|c)

Figure 27:
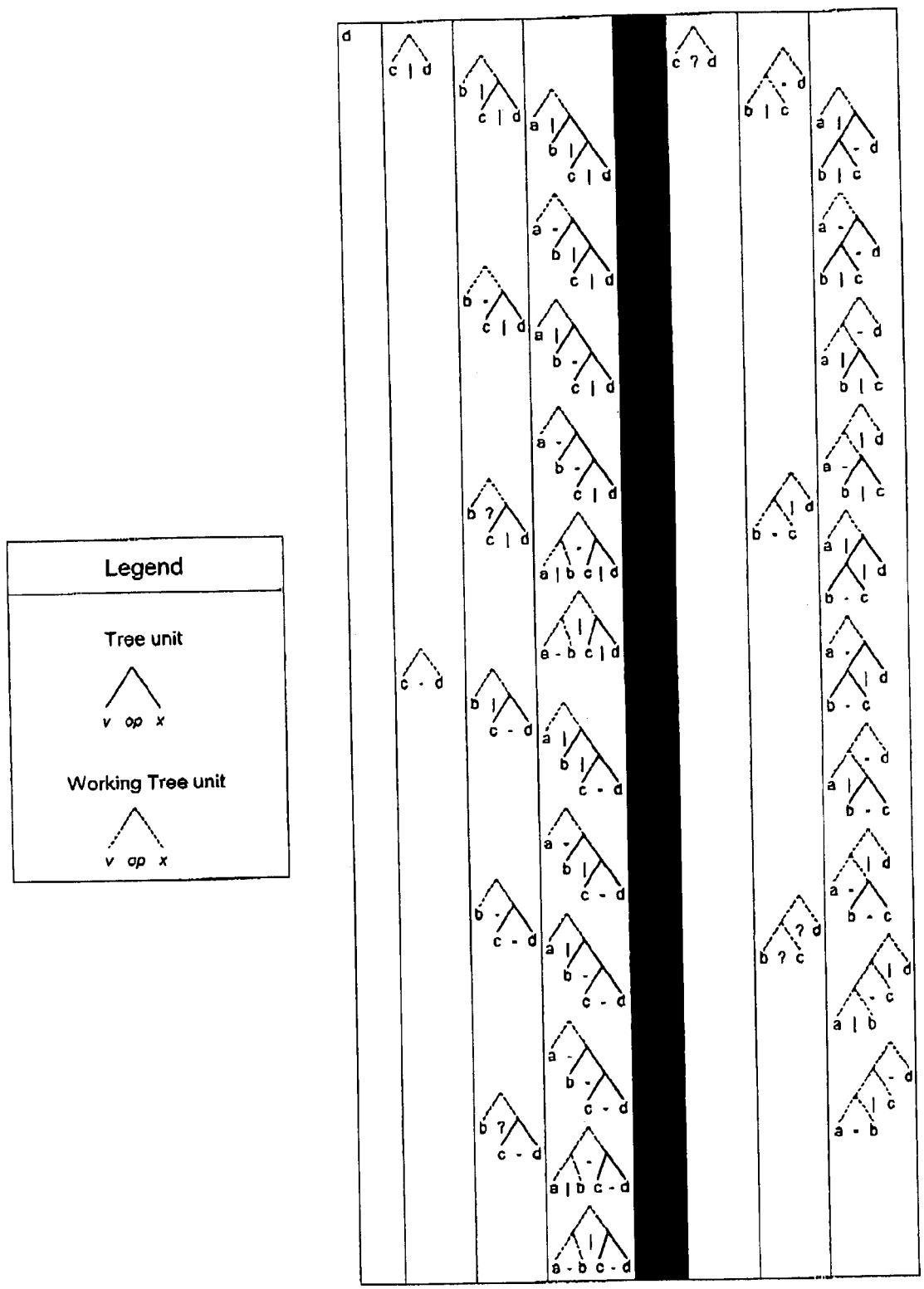
FIG. 27 shows a parsing example through a large Schroder sequence of 4 elements.

Referring to FIG. 27, binary tree notation can be used instead of parentheses combinations to express binary bracketing. Tree notation will be helpful in understanding the algorithm.

By the way, the integer sequence of combinations S generated from a growing number of elements n (starting from 1) in set Q goes this way:

$S_n$=1, 2, 6, 22, 90, 394, 1806, 8558, 41586, 206098, . . .

which corresponds to the large Schröder numbers. Its recursive relation is shown below.

$$S_n = S_{n-1} + \sum_{k=0}^{n-1} S_k S_{n-1-k}$$

When extending from a set to a tree (set of sets), we simply have to multiply the $S_n$ of all tree nodes to have the number of combinations. The n here corresponds to the number of children of a node, or 1 if the node has no child. Therefore, we can figure out the number of possible arrangements for any DC tree may be determined. The layout algorithm will have three tasks:

1. to parse through these possible arrangements;
2. to select the best one;
3. to display it correctly to the end-user.

Each of these tasks is outlined below.

There are many ways to parse through a Schröder sequence of elements, the easiest one being by directly following the recurrence formula. However, in the precise context of using it to accumulate widget rectangles to build successive candidate layouts, the ideal parsing should minimize rectangles accumulations, which also would have the fundamental side effect of implementing shortcuts to minimize the number of parses. Referring to FIG. 27, the example shown is used to parse through all binary trees for four rectangles a, b, c and d using the following pattern. It consists of a succession of addition, removal and downward-left moves of tree units. A tree unit is, according to the legend, a binary node that has on its left side v the rectangle the unit is linked to (a, b or c in our example, not d as we will realize) and on its right side x another tree unit which varies along parses. On the middle, there is an operator (- or |) that establish the relationship between the variable left side v and the right side x. Thus, we will iterate by adding moving, or changing the operator of dashed working tree units that will allow building the binary trees.

For the last rectangle d, we simply place it in order to create the next unit (for c). The goal of each unit is to create it (from the last rectangle to the first) and to move it downward-left until it reaches the bottom of the tree. At each location in the tree, three operators | and - (and ?, which is explained later) must be set. For the first two operators, a setting influences all upward-right tree units operators, which must alternate. For each operator setting, the next unit is created (for the previous rectangle) at the top of the tree (all left units rectangles were accumulated) that will also shift downward-left until it reaches the current one (it cannot go below the current one). The third ? operator is really | or - but it is not important to know because it will be changed by units located at the bottom left (the alternating rule). This time, the next unit is created and only located below the current one. When we are at the top of the tree to create the next unit and there is no more to create, all units are accumulated and we have a candidate layout that can be evaluated.

Figure 29E:
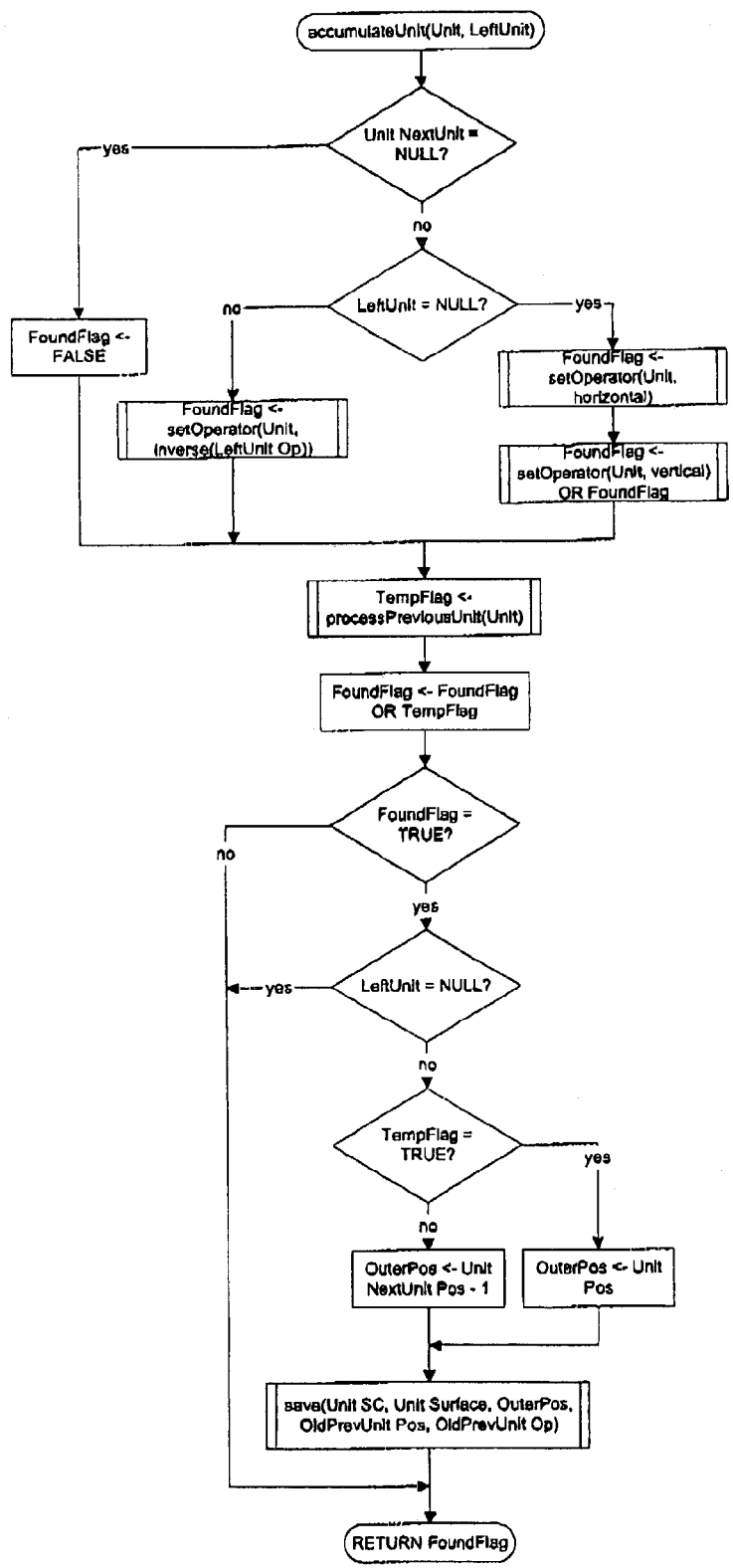
FIG. 29A to FIG. 29N show, using flowcharts, a layout parsing algorithm.
Figure 29F:
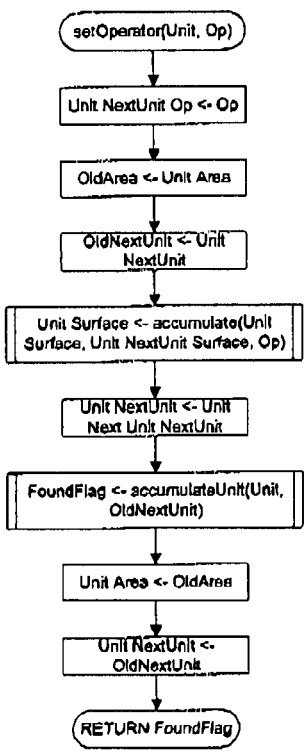
Figure 29G:
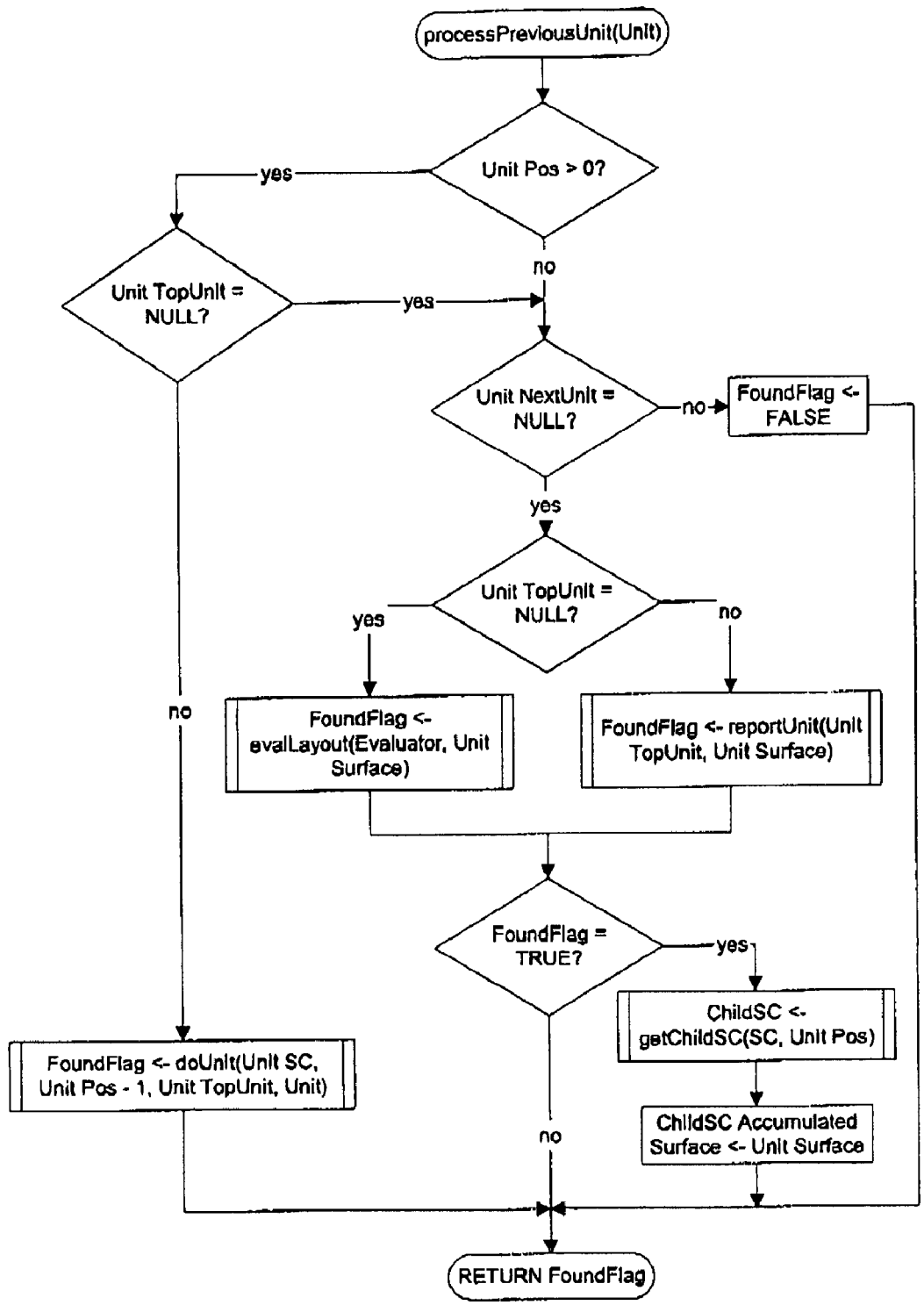
Figure 29H:
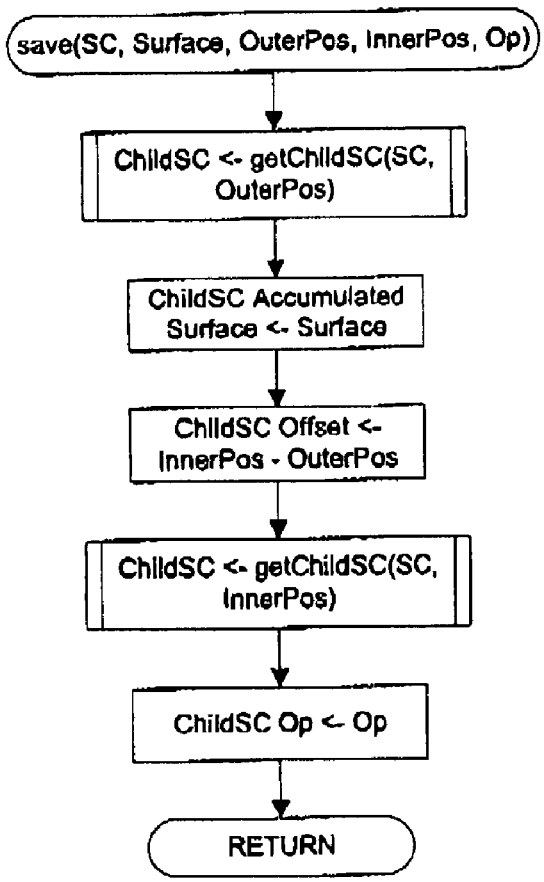
Figure 29I:
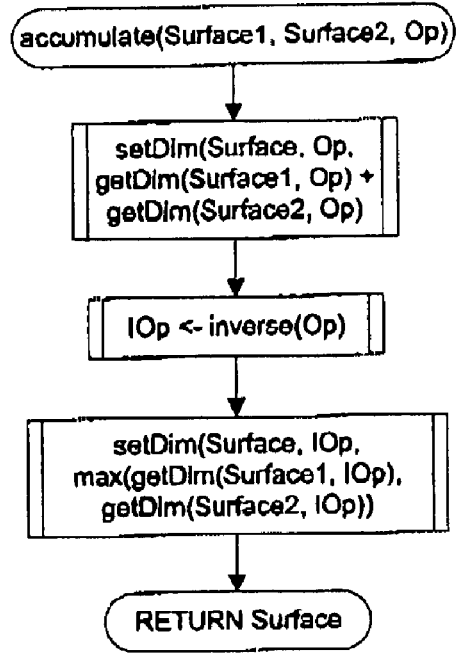
Figure 29J:
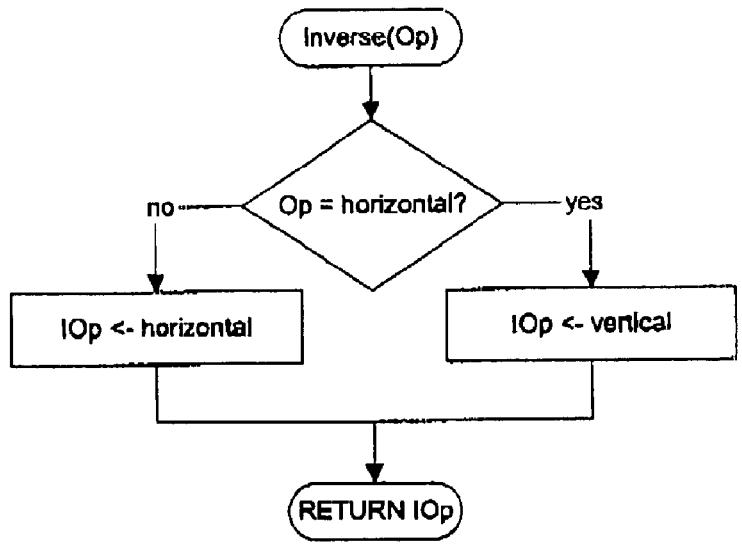
Figure 29K:
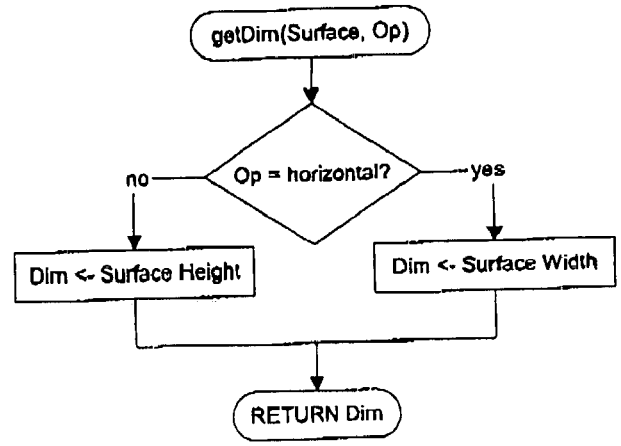
Figure 29L:
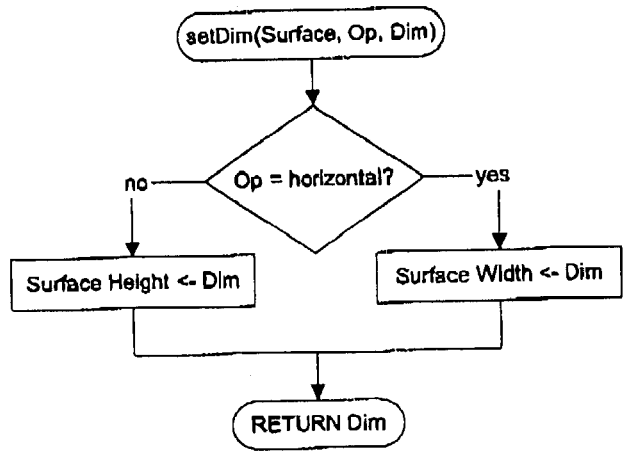
Figures 29M, 29N:
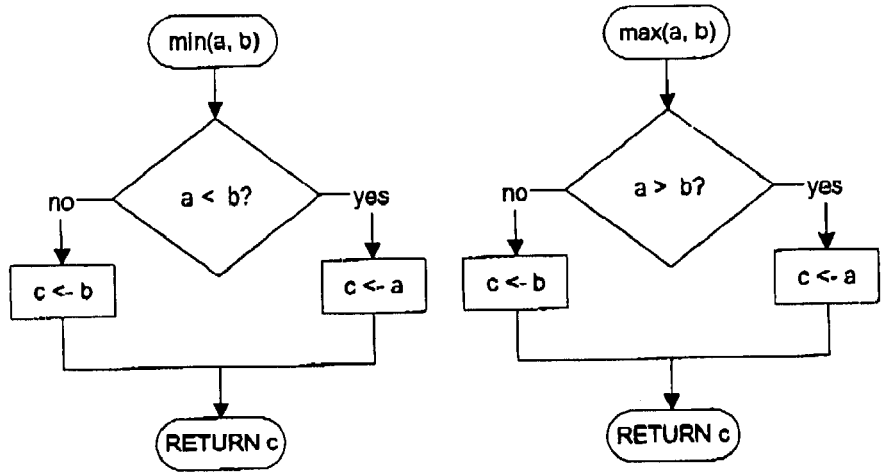

The set of flowcharts from FIG. 29A to FIG. 29N contains an implementation of this layout parsing. The layout parsing is associated with three data types. Referring to FIG. 28A, the Area type is the area of a rectangle, consisting of a width and a height, greater than or equal to 0. Referring to FIG. 28B, the Surface Component (SC) is a DC. In fact, all SCs are DCs, but not all DCs are SCs. A Button DC is an SC, but a Menu Command DC is not a SC. This is why an SC has its separate system for pointing its SC children, with NumSCs (number of SC children) and a Child SC set. The Surface area contains the overall surface of the DC array of NCs and is assumed, as for the previously introduced data members, to be initialized correctly before executing the layout algorithm. Three data members are going to be modified by the algorithm: Accumulated Surface, Offset and Op. They are used by the layout algorithm to "save" the best parenthesis combination and the accumulated surfaces of the combination.

Referring to FIG. 28C, a Unit is a tree unit like the ones shown in FIG. 27. Back to FIG. 28C, the Unit therefore contains SC, which is a reference to the parent SC that contains child SCs to be laid out, Pos is the index of its corresponding SC (at the right end of the tree unit), Op is the tree unit operator, TopUnit is a reference to the Unit that corresponds to SC (in case we have a tree of SCs which has more than one level), NextUnit is a reference to the right Unit in the binary tree and Surface is the accumulated surface of the surfaces of the left and right Units.

Referring to FIG. 29A, the main method getLayout(ParentSC, Pos) returns the best layout for displaying the SC (and its child SCs) pointed to by ParentSC and Pos. First the layout Evaluator is reinitialised, as will be detailed below. Then, the method doUnit is called, which does all the layout parsing and returns "true" if the best layout has been found, "false" otherwise (it should always return "true"). This value is returned to the caller of getLayout(ParentSC, Pos). In fact, from FIG. 29A to FIG. 29G, the return value always is "true" when, after executing the method, a better layout has been found, and "false" otherwise.

Referring to FIG. 29B, the method doUnit(SC, Pos, TopUnit, NextUnit) creates a new unit for the corresponding SC pointed to by its parameter parent SC at position Pos. Preferably (technical note: for computing languages allowing it, units should be allocated in the stack instead of in the heap space, as it is much faster). The doUnit method initializes the SC, Pos, TopUnit and NextUnit data members with the respective parameters of the method and simply calls processUnit(Unit) before deleting it. The return value will be the one returned by the call to processUnit(Unit).

Referring to FIG. 29C, the processUnit(Unit) method is used to handle trees of SCs. It checks if the Unit corresponding SC has itself child SCs. If so, it must recursively process all possible sub-layouts of the corresponding SC by recalling doUnit for the child SC. Otherwise, there is only one corresponding SC area which is immediately returned by calling reportUnit(Unit, child SC surface).

Referring to FIG. 29D, the reportUnit(Unit, Surface) method assigns a surface to the Unit parameter. Then, if the Unit Pos is greater than 0 (not the first child SC), the iteration process begins by calling accumulateUnit(Unit, NULL) (the NULL parameter specifies there is no left Unit pointed to by the current Unit).

Referring to FIG. 29E, accumulateUnit(Unit, LeftUnit) is a method that sets correct operators to the Unit and saves its previous accumulation (if there is one) if any operator setting has generated a new best layout. First, we check the Unit does point to a next Unit to generate an accumulation. If so, depending of whether or not there is a left Unit, we set the converse operator of the left Unit (alternating rule) or we successively set both operators. If not, we assume FoundFlag to be FALSE, temporarily and go to the next step. Then, we process the next unit that point to previous child SC, which means the case when the next Unit is at the bottom of the current one (operator "?"). We put the result in a separate TempFlag that will be used later and that is currently OR-ed with the primary FoundFlag. Then, if a new best layout has been found and there were a previous accumulation (specified by the existence of LeftUnit), we save that accumulation within the child SC storage area. The TempFlag is used to determine between the first and last accumulated child SC to store the accumulation, due to a minimal (but efficient) accumulation storage system that is deciphered by the display algorithm to position widgets.

Referring to FIG. 29F, the setOperator(Unit, Op) method performs the accumulation of the Unit Surface with its Next Unit and processes next accumulations. The Unit NextUnit operator to Op, the current Unit Area and Unit NextUnit are saved and the accumulation with Unit Next Unit Surface is done (overwriting Unit Area). To put the Unit NextUnit reference in sync with the accumulation, Unit NextUnit now points to Unit NextUnit NextUnit. Then, we continue accumulations by recursively calling accumulateUnit(Unit, OldNextUnit) with the backed up Unit Next unit to tell accumulateUnit we have done an accumulation before calling it (and to save it if required). Then, we undo the accumulation by restoring the backed up Unit Area and Unit NextUnit.

Referring to FIG. 29G, the processPreviousUnit(Unit) method does one verification, namely to see if there is actually more child SCs to create associated units. To do so, the current Unit Pos is compared to 0 (the first child SC position) and the Unit TopUnit existence is verified. If both conditions are true, then doUnit(Unit SC, Unit Pos−1, Unit TopUnit, Unit) is called again to create a new Unit with the previous pos and the NextUnit parameter as the caller Unit. If we have reached the last element, we verify all Units Surfaces have been accumulated (by checking Unit NextUnit to NULL). If so, we have a layout for the child SC set to be processed accordingly. If not, we have an invalid configuration (since there are no more Units to create) and we simply return "false". In the case we have a layout for the child SC set, we either report it to the Unit Top Unit as a new Surface for the Unit SC (to process SC trees accordingly) or we call the layout evaluation method if we are at the top of the SC tree, meaning we have a candidate layout. In both cases, if the layout generated a new best combination, we save its Unit Surface in the Unit child SC Accumulated Surface (in the case we have a single child SC, to store the Surface, which would not be done by the save method that takes care of saving accumulation of many SCs surface).

Referring to FIG. 29H, the save(SC, Surface, OuterPos, InnerPos, Op) method is called to store a surface accumulation that provided a new best layout. SC is the parent SC, Surface is the accumulation result, OuterPos is the index to store the accumulation and InnerPos is the right area first index (the left area starts at InnerPos−1). To save the accumulation, the child SC from SC at position OuterPos is retrieved and its Accumulated Surface and Offset are initialized to respectively Surface and InnerPos-OuterPos. Then, the Op parameter is saved, this time in the child SC pointed to by SC and position InnerPos. The repeated calls to save(SC, Surface, OuterPos, InnerPos, Op) will finally store a complete layout pattern.

FIG. 29I to FIG. 29N illustrate methods that are used throughout the parsing process. Referring to FIG. 29I, the accumulate(Surface1, Surface2, Op) method accumulates Surface1 and Surface2 with operator Op into Surface, according to the addition and maximum rules stated above, and returns Surface. Referring to FIG. 29J, the inverse(Op) method returns "vertical" if the Op parameter is "horizontal", and "horizontal" otherwise. Referring to FIG. 29K, the get-Dim(Surface, Op) returns the horizontal dimension (width) or vertical dimension (height) of Surface, depending on the Op parameter. Referring to FIG. 29L, the setDim(Surface, Op, Dim) sets to Dim the horizontal dimension (width) or vertical dimension (height) of Surface, depending on the Op parameter. Referring to FIG. 29M, the min(a, b) returns the minimum number between a and b. Finally, referring to FIG. 29N, the max(a, b) returns the maximum number between a and b.

The layout algorithm must be able to select the best layout among all the surfaces submissions from the parsing algorithm. To achieve it, we use a global object called Evaluator. Referring to FIG. 28D, the Evaluator type contains an InitFlag that must be set to "true" before executing the layout parsing, a BestArea number which expresses, in square pixels the area of the best layout found, a MinimalArea which expresses, in square pixels the minimum area found (which may not be equal to BestArea) and BestFibo, which expresses the Fibonacci score (explained later) of the best layout found.

Layout surfaces will be judges on two fundamental criteria: economy of surface and conformance to Fibonacci golden section. On the one hand, we want our widget arrangement to be clever so that surrounding windows are compact. On the other hand, we do not want to sacrifice the "beauty" of windows if the most compact arrangement means a 1000×10 window. Therefore, we will also rely on Fibonacci golden section, called Phi (1.61803 or 0.61803 or (5^(1/2)±1)/2), which mathematically indicates the most harmonious ratio between the width and height of windows.

We will then give a score to each surface (on 100%). 60% will be reserved for economy of surface and 40% will be used for Phi conformance (these ratios can be modified if wanted). Other criteria can be added if desired, to have a most selective evaluation algorithm. The layout which surface score is closest to 100% will be elected best layout. For our algorithm, we will calculate scores on 1000 instead of 100, to improve precision without using float numbers, which slows down the algorithm. Therefore, the surface score will be calculated on 600 and the Phi score, on 400.

Figures 30A, 30B:
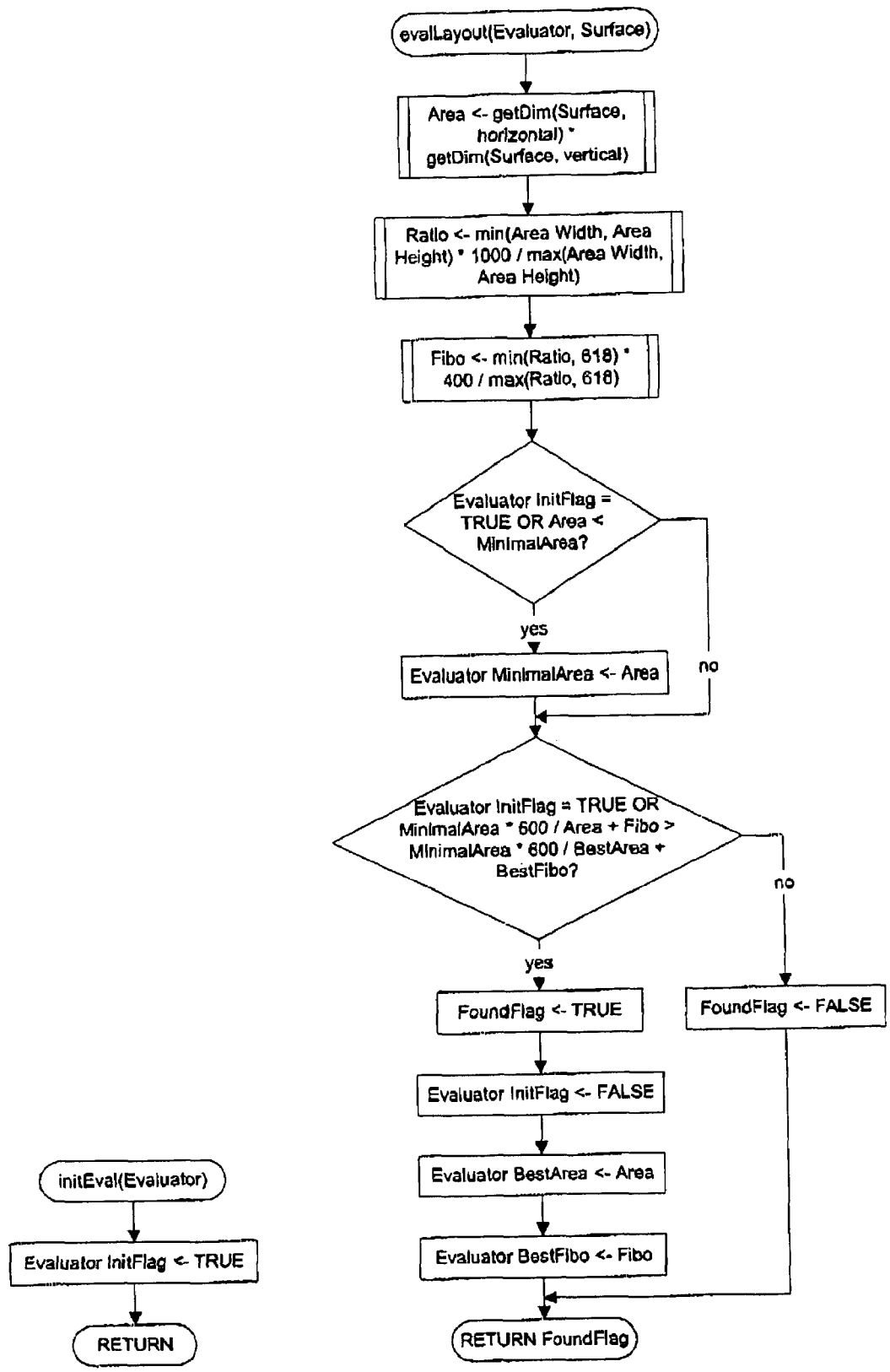
FIG. 30A and FIG. 30B show, using flowcharts, an evaluation algorithm applicable to all layouts generated by the layout parsing algorithm.

Referring to FIG. 30A, the initEval(Evaluator) method simply resets the Evaluator InitFlag to "true", which is mandatory before parsing through all layouts. Referring to FIG. 29A, it is therefore called by getLayout(ParentSC, Pos) before starting the parsing.

Referring to FIG. 30B, the evalLayout(Evaluator, Surface) method is called to compare a new layout from the parsing to the previous best one found, to see if the new one is better. It first calculate Area, which is Surface expressed in square pixels. Then, it calculates the Phi Score by first calculating the ratio between the minimum area dimension and the maximum area dimension (on 1000). This ratio is then divided by the Phi number (618 if we're on a thousand base) and multiplied by 400 to end up with the Phi score.

Then, if it is the first submitted layout since initialization (indicated by Evaluator InitFlag set to "true"), then all Evaluator members are initialized. MinimalArea and BestArea are set to the first Area, InitFlag is set to "false", BestFibo is set to Fibo and "true" is returned (the first submitted layout is always considered the best one, on a first basis for further comparisons).

There are two comparisons. The first one will be used to find the minimal area among all layouts submitted to evalLayout. The second comparison uses this minimal area to dynamically calculate the surface scores to compare, on 600. Then, their respective Phi score is added to have total scores, on 1000. If the contender layout has a better score than the best layout score found so far, the Evaluator members are set to reflect the new score and evalLayout returns "true". Otherwise, nothing changes (except maybe MinimalArea) and the method returns "false".

The final task of the Layout algorithm is to display the best layout found by the parsing algorithm using the evaluation method. At this time, the best layout is directly "saved" within SCs. Referring to FIG. 28B, all SCs Accumulated Surface, Offset and Op have been set correctly and now contain the information we need to display the selected layout.

Referring to FIG. 31A, the drawLayout(SC) method draws the specified layout for the SC tree which root is parameter SC. This method simply calls positionSC(SC, Pos, Size) with correct Pos and Size. Pos is a Surface (width and height should be considered x and y in this case) which indicates the position of the first SC child of SC, which is (0, 0). Size is the SC Accumulated Surface.

Referring to FIG. 31B, the positionSC(SC, Pos, Size) method sets the NC array of the DC SC at a specified Pos and Size with setSCPosition(SC, Pos) and setSCSize(SC, Size), which are not specified here since they depend on the target GUI platform. However, their ReturnCode is used so if one method fails, the layout drawing is stopped. If both return "true", positionSC does the inner layout if there are child SCs to arrange by calling position(SC, Pos, Size, 0, NumSCs).

Before describing how to display a child SC set, the concept of "line" will be explained. Binary bracketing was enforced all along the process to simplify it. However, at display time, unnecessary parentheses should be removed because it becomes necessary to identify child SCs that are on the same level. Children that are on the same level form a "line". For example, consider the best layout for 10 objects ranging from a to j the following, expressed with binary bracketing:

((a|(b|((c-(d-(e-(f-g))))|h)))-(i|j))

Removing unnecessary parentheses would give the following.

((a|b|(c-d-e-f-g)|h)-(i|j))

From this, we can identify the main line, which is on the first parenthesis level:

(abcdefgh)-(ij) (vertical line of two elements)

From it, by looking at the first element, we obtain a first sub-line, on the second parenthesis level:

a|b|cdefg|h (horizontal line of four elements)

The element cdefg is still composed from many SCs, so there is a sub-sub-line:

c-d-e-f-g (vertical line of four elements)

There is no more simplification here, but when going back, there is still one last sub-line on the second level:

i|j (horizontal line of four elements)

As will be seen, the operator always varies from one to the other when we go down the parentheses level. In tree notation, instead of having a binary tree, we transform it to a tree where nodes can have n branches. We do not need with this tree to write down operators. We only need to give the operator for the first level and assume the operator on level n to be the converse of the operator on level n−1.

For display purposes, we need lines because we have to display its elements within an allocated space that can be larger than the combined line length. Therefore, we must put an even space between each pair of elements.

We do not need to modify binary layout data in SCs. Referring to FIG. 28E, the Line type can be used to interpret binary layout data as lines. The Line data consists of a parent SC, the current element SC index, an offset to the next element, a limit (NumSCs) and the operator used between elements.

Figure 32A:
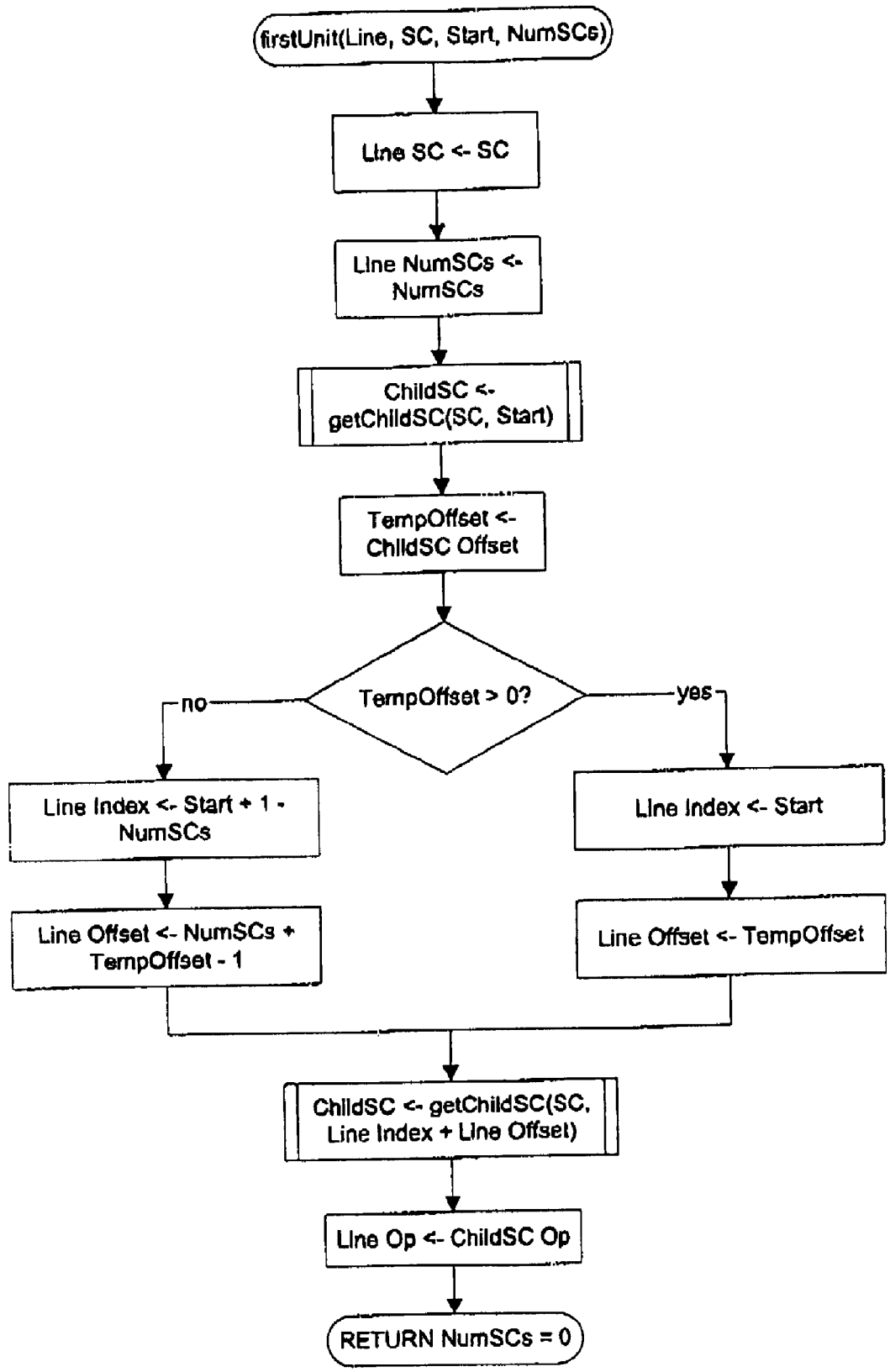

The Line type needs methods to interact with. Referring to FIG. 32A, the firstUnit(Line, SC, Start, NumSCs) method initializes a Line object and make the internal Line data to point to the first element. Its SC and NumSCs are set to SC and NumSCs parameters. Then, we must initialize Index and Offset. The Start parameter is the index of the child SC that has the first offset. We get that offset in TempOffset and test if it is positive because in the Line, we will force the Line Offset to always be positive. If TempOffset is positive, no conversion is done, Line Index is set to Start and Line Offset is set to TempOffset. Otherwise, we have to calculate Line Index from the last index in the line, which is Start. Since we know NumSCs, we simply add 1 to Start and remove NumSCs to find the first index and store it in Line Index. A positive Line Offset will be calculated from a negative or null TempOffset, subtracted by 1 and added to NumSCs. Finally, Line Op will be the operator found in the second element, pointed to by Line Index+Line Offset. The boolean return value tells whether or not the element parsing within a line is over by testing NumSCs (the number of elements to parse) to 0.

Figure 32B:
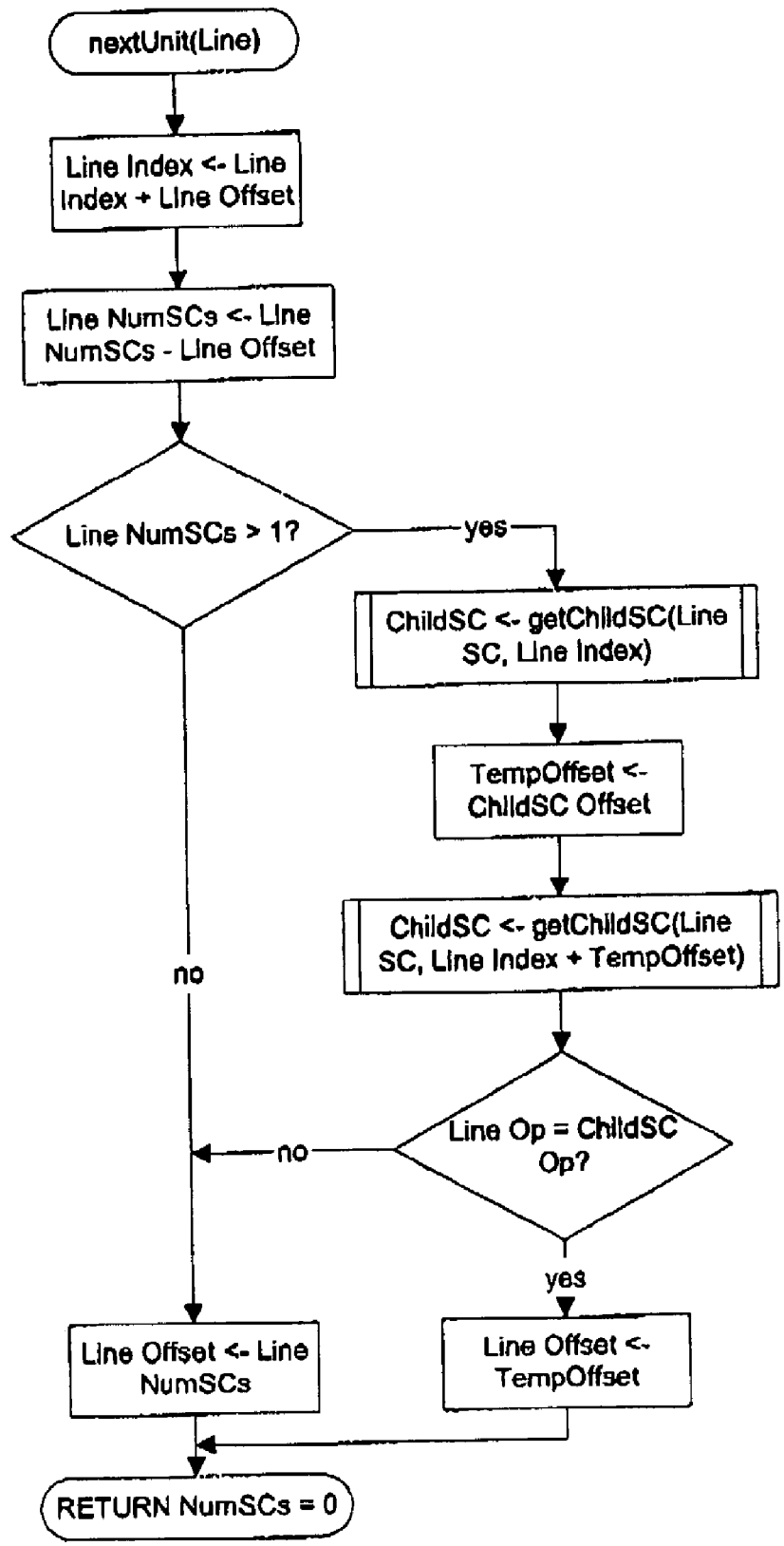

Referring to FIG. 32B, the nextUnit(Line) method sets Line internal data to point to the next element (if there is one), from the current element. Line Index is simply incremented by Line Offset. Line NumSCs is decremented by Line Offset. If we still have more than one element (Line NumSCs>1) and for the second element (which holds the operator between first and second), the Operator is the same as Line Op (meaning the Line will continue the next time nextUnit(Line) is called), the Line Offset will point to the second element and nextUnit(Line) returns "false" to signify the line is not over. Otherwise, the Line Offset will be equal to NumSCs, which will force either this call (if NumSCs was already 0) or the next call to nextUnit(Line) to return "true".

Referring to FIG. 32C, the getUnitArea(Line) method returns the Surface of the current Line element. Since the element is itself a sub-line (that has a start and number of SCs), the method first retrieves the child SC at the sub-line start. Then, if the sub-line has more than one element (Line Offset always contains the sub-line number of SCs), then the returned element area will the child SC Accumulated Surface. If the sub-line has one element (one SC), we test if this child SC has children. If so, the returned Surface will be the Accumulated Surface of the first grandchild SC. If the child SC has no children, the child SC Surface will be returned.

The next two methods allow parsing trough sub-lines of a line. All we need to parse the current sub-line of a Line is to create a new Line with Start and NumSCs parameters that reflect the sub-line coordinates. Referring to FIG. 32D, the getUnitStart(Line) method retrieves the sub-line Start parameter. It is always the index of the last SC in the sub-line, unless the sub-line is the last sub-line in the main line. In this case, the sub-line Start is the index of the first SC in the sub-line. Referring to FIG. 32E, the sub-line NumSCs is always equivalent to the current Line Offset, so it is blindly returned.

Figure 31C:
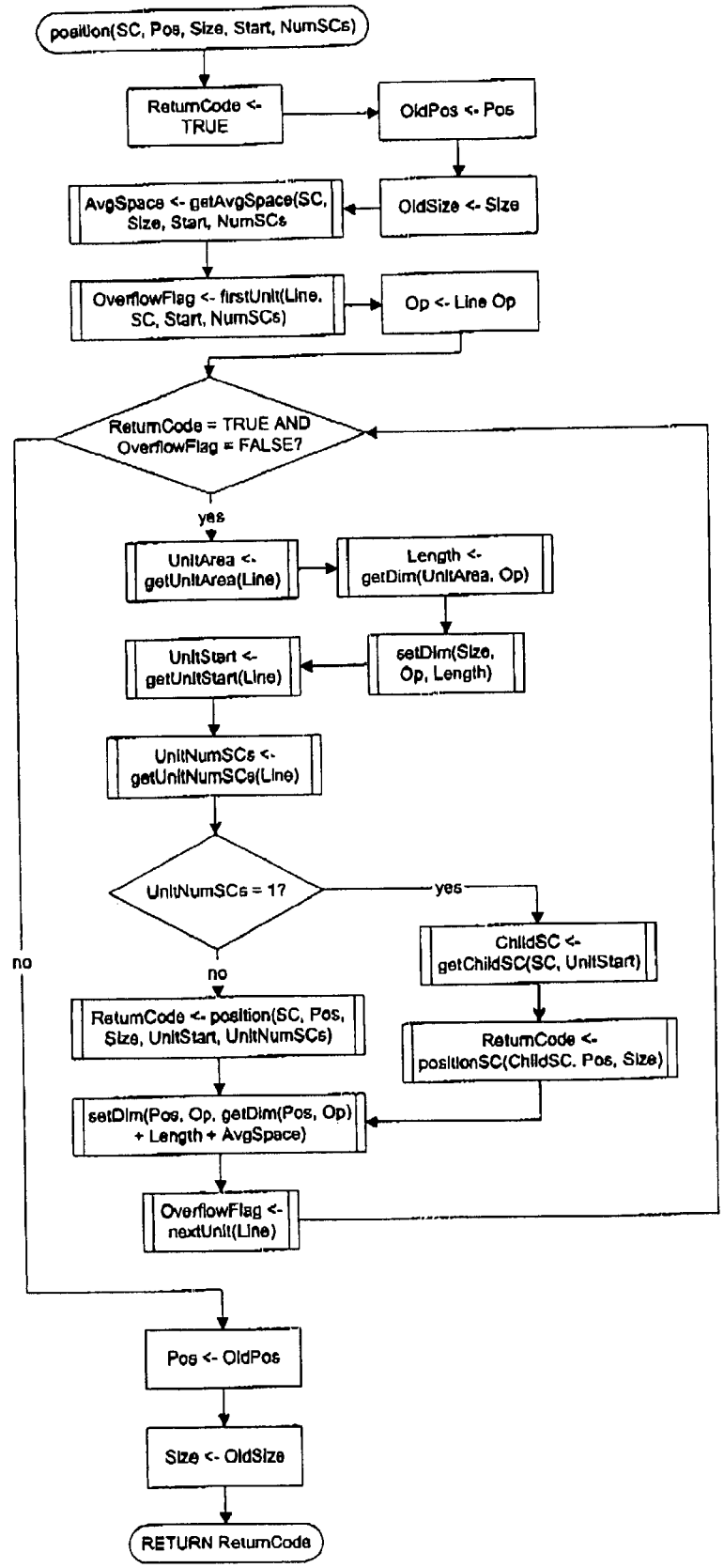

By mastering the concept of lines, it becomes way easier to display a set of child SCs. Referring to FIG. 31C, the method position(SC, Pos, Size, Start, NumSCs) effectively does this task. It loops through the elements of the main line, and recursively calls itself within each element to sub-loop in sub-lines, until it reaches elements composed of a single SC. It first saves the Pos and Size parameters and assumes Return-Code to be "true". Then, it calculates the average space that will be inserted betweens elements of the current line. Then, it begins the loop that terminates when there are no more elements in the line or if something went wrong (ReturnCode would be "false" in this case). Within the loop, we get the current line element area in UnitArea, and set the dimension of Size corresponding to the Line Op at the corresponding dimension in UnitArea. The Size now is equal to the Surface that will be occupied by the element. Then, the element sub-Start and element sub-NumSCs are saved in UnitStart and UnitNumSCs. Then, we test if there is a single SC within the current line element. If so, we call positionSC for this child SC with the current Pos and Size. Otherwise, we recursively call position(SC, Pos, Size, UnitStart, UnitNumSCs) to handle the sub-line. Then, we advance Pos in the Line Op by the Size in the Line Op plus the average space calculated previously. At the end of the loop, Pos and Size are restored (for keeping the state of previous recursive calls) and Return-Code is returned.

Figure 31D:
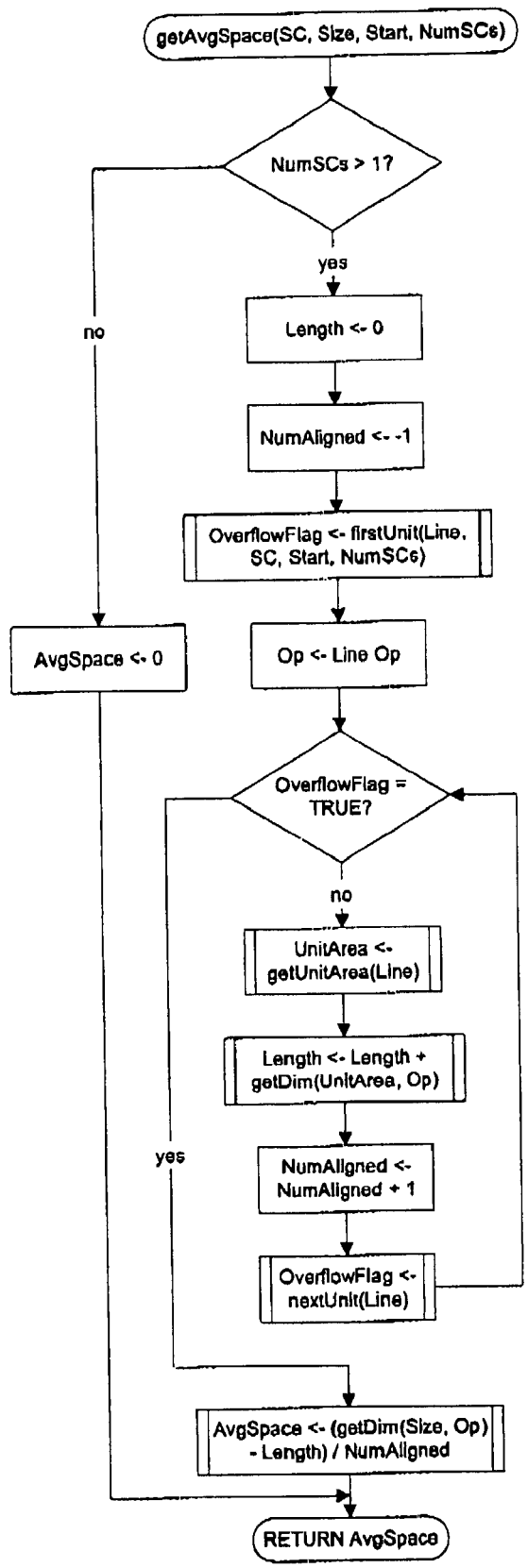

Referring to FIG. 31D, the getAvgSpace(SC, Size, Start, NumSCs) does a similar line loop to calculate the average space between elements in the line. It first ensures there are more than one element in the line (else, the returned average space is automatically 0). If so, the parsing is done with the variable Length adding the sizes of the elements for the Line Op dimension and incrementing NumAligned, which is the number of spaces in the line (line number of elements−1 in fact). The returned average space will be the division of the total line allocated size minus Length by NumAligned.

With FIG. 29A to FIG. 29N, we now have a proven method of parsing through all valid combinations of windowing arrangements. However, the more SCs we have, the longer it takes to parse through all combinations. For instance, a window containing 20 controls will have to evaluate 3236724317174 ($S_{20}$) combinations, which will take over 1 year on a 667 MHz computer, truly unacceptable especially if we want the whole process done in real time. Therefore, it is mandatory to drastically reduce the number of valid combinations for a large number of SCs.

The solution lies in considering widths and heights of SCs in the algorithm. So far, we blindly parse through all combinations without considering the properties of a SC. We know they have two properties, namely width and height that will prove to be very useful in reducing the number of valid combination.

It is recognized that the end result shown by the display algorithm is always made up of lines and sub-lines that are compressed, regardless of the parsed combinations. Thus, instead of blindly parsing through the entire Schröder combinations, which grows astronomically, the solution for predictability lies in only parsing through the valid combinations of compressed lines and sub-lines, which represents a tiny subset of Schröder layouts, easily computable in real-time. We have to start from the original parsing algorithm and put laws that will restrict the parsing to only generate lines and sub-lines. By applying these laws in the original parsing, the number of valid combinations drops from astronomical numbers to very low valid combinations, now computable in real time.

For instance, consider A, B, C as ordered Units. If both B and C fit below A, then you directly start a sub-line for B, therefore directly allowing A-(B|C)), with the width of A has a directive for maximal width of the sub-chain. Most importantly, this idea of width and height directive for next Units is very interesting especially with Units that have child SCs. It directly order the subset of child SCs to fit in top widths and heights directives. This is mostly required for PDAs that have windowing capabilities such as Windows CE, where the screen size is small. In this case, general width and height directives (correspondent to screen size) may be given at the very beginning of the algorithm to ensure the layout will fit in. On a lesser extent, it is also useful for desktops to ensure big windows to fit in the large screen.

The following rules, among others that can be easily devised, will assist in identifying the lines and sub-lines sets from the complete Schröder sets and can easily be added to the parsing algorithm.

Let A, B, C be rectangles or combinations of rectangles. Let X=(A|(B-C)) at any time in the parsing algorithm and X'=((A|B)-C). If h(X) is equal to h(X'), then X is not valid, meaning that rectangles after C should not be processed with combination X. Conversely, let X=(A-(B|C)) at any time in the parsing algorithm and X'=((A-B)|C). If w(X) is equal to w(X'), then X is not valid, meaning that rectangles after C should not be processed with combination X.

If B is placed at the right of A and C is at the bottom of B, then if C could be shifted left to be at the bottom of A, leaving space under B to put next rectangles, then it should be done before processing any further. This is always the case if and only if h(A)<=h(B). The same rule applies for the converse situation, namely B is at the bottom of A and C is at the right of B, if B can be shifted up (if and only if w(A)<=w(B)).

Let A, B, C be rectangles or combinations of rectangles. Let X=(A-(B|C)) at any time in the parsing algorithm and X'=(A-B). If w(X) is equal to w(X') and h(X) is equal to h(X'), then C has reached its upper limit for going up in the binary tree anymore for the operator |. In our example, cases such as ((A-B)|C) become invalid. Conversely, let X=(A|(B-C)) at any time in the parsing algorithm and X'=(A|B). If w(X) is equal to w(X') and h(X) is equal to h(X'), then C has reached its upper limit for going up in the binary tree anymore for the operator -. In our example, cases such as ((A|B)-C) become invalid.

This law may put limits in shifting up a rectangle to the root of the binary tree. It ensures that a rectangle totally included within two large rectangles is ideally positioned and cannot be moved anymore from this location. In the case B is at the bottom of A and C is at the right of B, C is totally included within A and B for the horizontal operator if and only if w(A)>=w(B)+w(C) and h(B)>=h(C). In the case B is at the right of A and C is at the bottom of B, C is totally included within A and B for the vertical operator if and only if h(A)>=h(B)+h(C) and w(B)>=w(C).

Let A, B, C be rectangles or combinations of rectangles. Let X=((A-B)|(C ... )) at any time in the parsing algorithm. If h(A) is approximately equal to h(C), the user will be falsely led to read the window fields with the wrong order A, C, ..., B instead of A, B, C, .... Therefore, this case should not be allowed. The converse case, where X=((A|B)-(C ... )) should not be considered even if w(A) is approximately equal to w(C), because the user has the tendency to read from left to right first, then from top to bottom.

Let A, and B be rectangles or combinations of rectangles. Let A' be the last sub-rectangle of A and B' be the first sub-rectangle of B. Let X=(A-B) at any time in the parsing algorithm, X'=(A-(A'|B)) and X"=((A|B')-B). If w(X')=w(X), then case X is invalid since part of A can enter in B without altering the width of X, meaning that A is too wide compared to B. Also, if w(X")=w(X), then case X is still invalid since part of B can enter in A without altering the width of X, meaning that B is too wide compared to A. Conversely, let X=(A |B) at any time in the parsing algorithm, X"'=(A|(A"-B)) and X"=((A-B')|B). If h(X')=h(X), then case X is invalid since part of A can enter in B without altering the height of X, meaning that A is too high compared to B. Also, if h(X")=h(X), then case X is still invalid since part of B can enter in A without altering the height of X, meaning that B is too high compared to A.

This law, contrary to all others, does relate to elements widths and heights. It relates to their DC type. We must not forget that SCs really are DCs with Surfaces. Since DCs have types, it is usual in user interface designs that consecutive DCs that share the same type should be grouped together. For instance, let A, B, C be SCs which DC types are respectively Button, Button and Edit field. Then, configurations (A|(B-C)) and (A-(B|C)) should not be allowed, since one button is on the top line and the other shares a sub-line with the edit field. However, ((A-B)|C), ((A|B)-C), (A|(B|C)) and (A-(B-C)) are perfectly viable. If the programmer really wants Button B to exclusively relate to Edit field C, he must explicitly specify it by creating a Container CC D containing B and C, and a top Container CC that contains A and D.

In the rendering process, there may be Conceptual Components (CCs) that cannot translate to DCs that closely relate to native control in the target device. For instance, it is probably the case for images or Container CCs with many children and a multi-dimensioned base d-size. There must be one DC type that corresponds to any untranslatable CCs, a Generic DC type. Referring to FIG. 22, there is one state in the State Machine 1300 that applies to CCs that could not be translated: the Generic Control 1395. The State Machine 1300 also shows that all descendant CCs of an untranslatable CC are also Generic Controls 1395, due to the circular transition in this state.

A set of generic DC will usually look like a table, or a matrix. The main task to build the generic DC table is to transform back and forth an abstract n-dimensional space such as a CC into a physical three-dimensional space that complies with the spatial nature of the universe. Even though most rendering devices use two-dimensional, delimited physical displays, at the logical level, the display is truly 3D and (almost) unbounded. For example, Windows uses scroll bars to overcome the limited display size on the width and the height. Components such as Tab controls and other means are used to benefit from the depth axis. RUIs make use of logical 3D spaces and, sometimes, of the display boundaries.

By convention, all 3D-numbers used in the 3-dimensional domain will apply the first value to the width axis, the second value to the height axis and the third value to the depth axis. For example, the 3D-number {5, 3, 90} refers to a 3D space of width 5, height 3 and depth 90. Thus, three methods must exist to operate conversions between n-dimensional CUIs and 3D RUIs.

The method 3dnum getcapacity(dnum size, dirlist dirs) gives the 3D-size of any d-size (type 3dnum refers to 3D-numbers and type dirlist refers to a list of directions—w for width, h for height, d for depth—such as {w, w, d, h}, corresponding to each dimension of size). For the sake of clarity, a d-size associated with a direction list will be referred to as a directional d-size. The method simply multiplies the values within size that have the same directions (for a direction never referred to within dirs, value 1 is used). For example, getcapacity({5, 4, 6, 2}, {w, d, w, w}) returns {60, 1, 4} and getcapacity({ }, { }) returns {1, 1, 1}. Many dimensions may share the same direction. In the previous example, the width is composed of the first dimension which is 5 times the third which is 6 times the fourth of size 2, meaning 60 units (5×6×2=60).

Figure 19A:
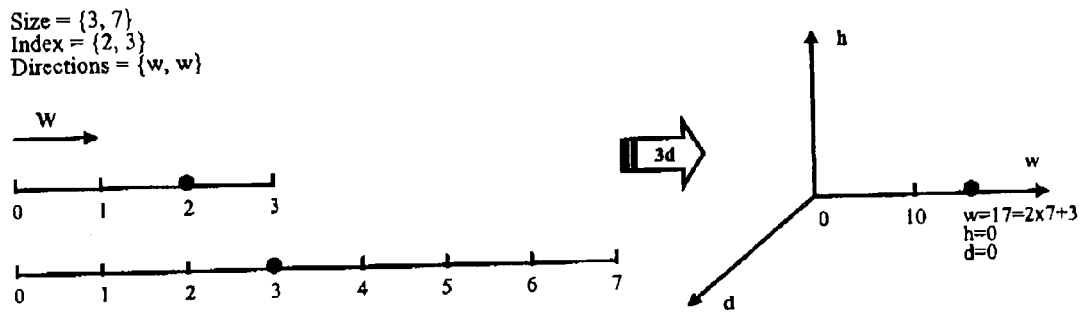
FIGS. 19A and 19B show the conversion of an n-dimensional coordinate to a 3-dimensional (Cartesian) system.
Figure 19B:
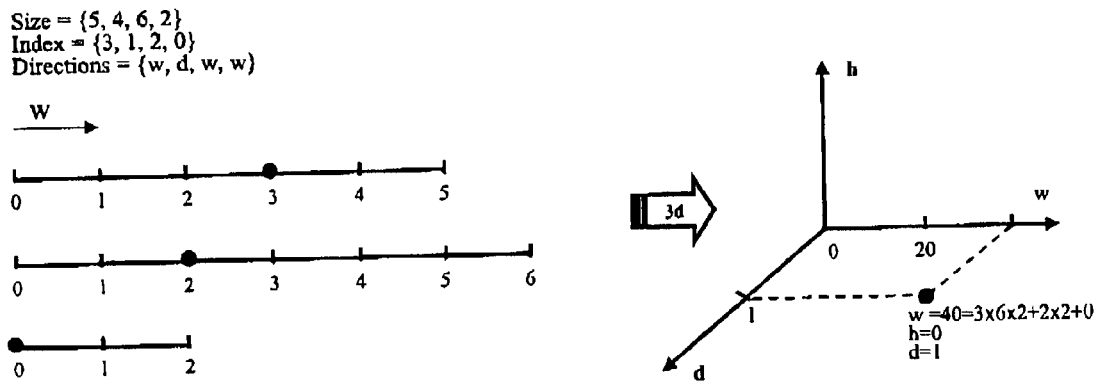

The method 3dnum get3dcoord(dnum size, dnum index, dirlist dirs) gives the corresponding 3d-coordinate of any d-coordinate within a d-size (for a direction never referred to within dirs, value 0 is used). For example, referring to FIG. 19A, get3dcoord({3, 7}, {2, 3}, {w, w}) returns {17, 0, 0} ({2×7+3, 0, 0}). Referring now to FIG. 19B, get3dcoord({5, 4, 6, 2}, {3, 1, 2, 0}, {w, d, w, w}) returns {40, 0, 1} ({3×6× 2+2×2+0, 0, 1}). Obviously get3dcoord ({ }, { }, { }) returns {0, 0, 0}.

Figure 19C:
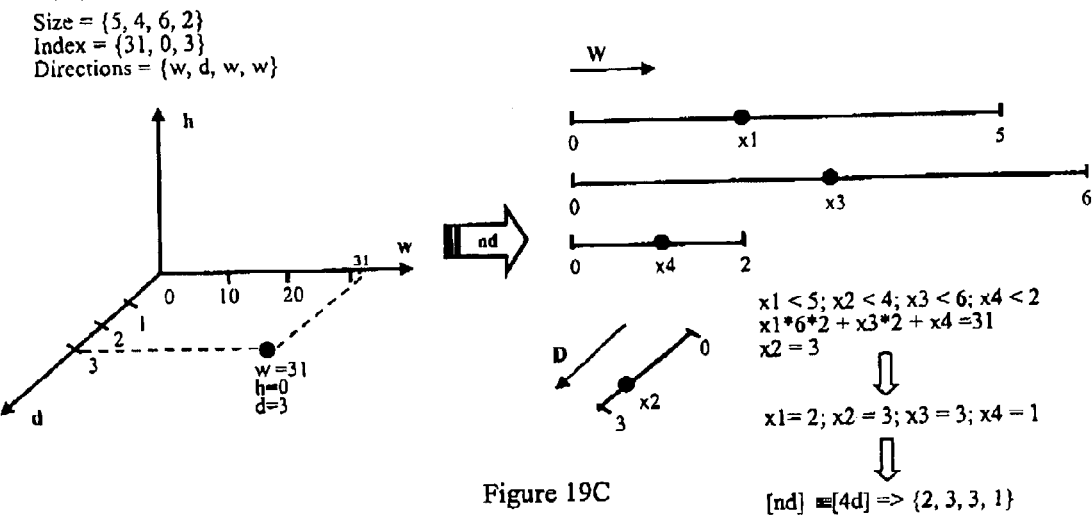
FIG. 19C shows the reverse conversion from 3-dimensional to n-dimensional system.

The method 3dnum getndcoord(dnum size, 3dnum index, dirlist dirs) is the opposite of the latter function. It gives the corresponding d-coordinate of any 3d-coordinate within a d-size (for a direction never referred to within dirs, value 0 is used). For example, referring to FIG. 19C, getndcoord({5, 4, 6, 2}, {31, 0, 3}, {w, d, w, w}) returns {2, 3, 3, 1}. It will be understood that getndcoord ({ }, {0, 0, 0}, { }) returns { }.

Since the base size of a CC is directional (with the directions parameter), the images are by their nature bi-directional (width×height), the children of Container CCs are also directional (with the children direction parameter), text dimensions in Text CCs are still directional (by default conventions) and finally, the CUI stack is also directional (throughout the depth axis), by using the methods described above, any CUI can be converted to a RUI and fit in a 3D space.

One last method operates 3D accumulation, 3dnum 3dacc (3dnum sizes[ ], Direction dir). It is used to accumulate (or pack) different 3d-sizes across one specified direction. The result will be a 3d-size that value across the direction will be the sum of all sizes values for the direction, and the two other values will be the maximal value of all sizes (just like Surface accumulation from the layout algorithm). For example, 3dacc ({{4, 5, 1}, {3, 2, 8}, {0, 4, 3}}, height) will return {4, 11, 8}. The 4 is the maximal width of all 3 sizes, the 11 is the sum of all heights and the 8 is the maximal depth of all sizes.

Before being able to render Generic DCs, some extra notions are needed, namely the matrix view, the element view and the user view, which are 3D-sizes.

The matrix view of a CC is the 3d-size of a rendered CC. It is usually different from one device to another, depending of the device characteristics (font size . . . ). It is calculated from the multiplication of the CC base d-size capacity (according to the CC directions) and the element view, which is the 3D-size of a unit within the CC matrix (the calculation of element views is explained later). Mathematically, it is expressed as:

Matrix view=getcapacity(base d-size, directions)× Element view

Figure 20A:
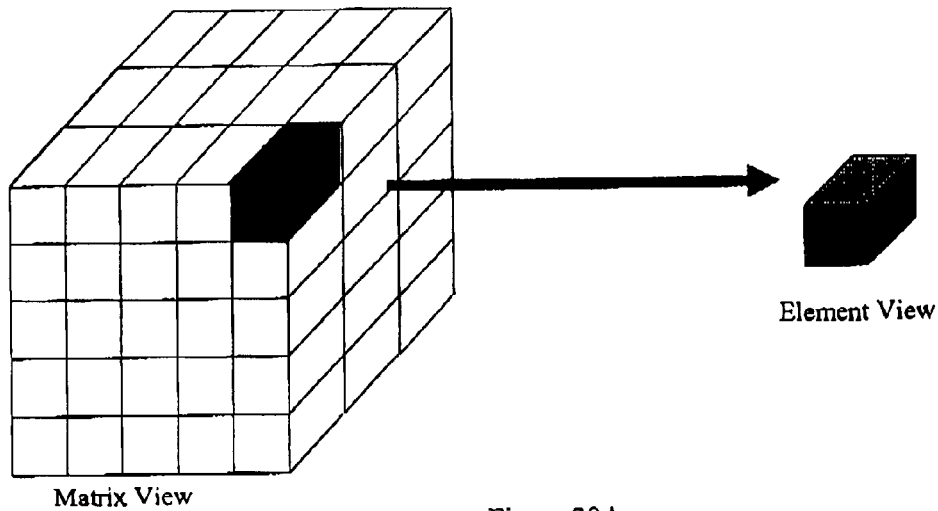
FIG. 20A shows the difference between the Matrix view and the element view.

It never takes into account the Container d-size of the CC, or where it is located in the CC tree. In other words, it ignores d-size accumulation. The Container CCs will take care of d-size accumulation in their own calculation of their element views. The interaction between the Matrix view and the Element view is presented schematically in FIG. 20A.

Figure 20B:
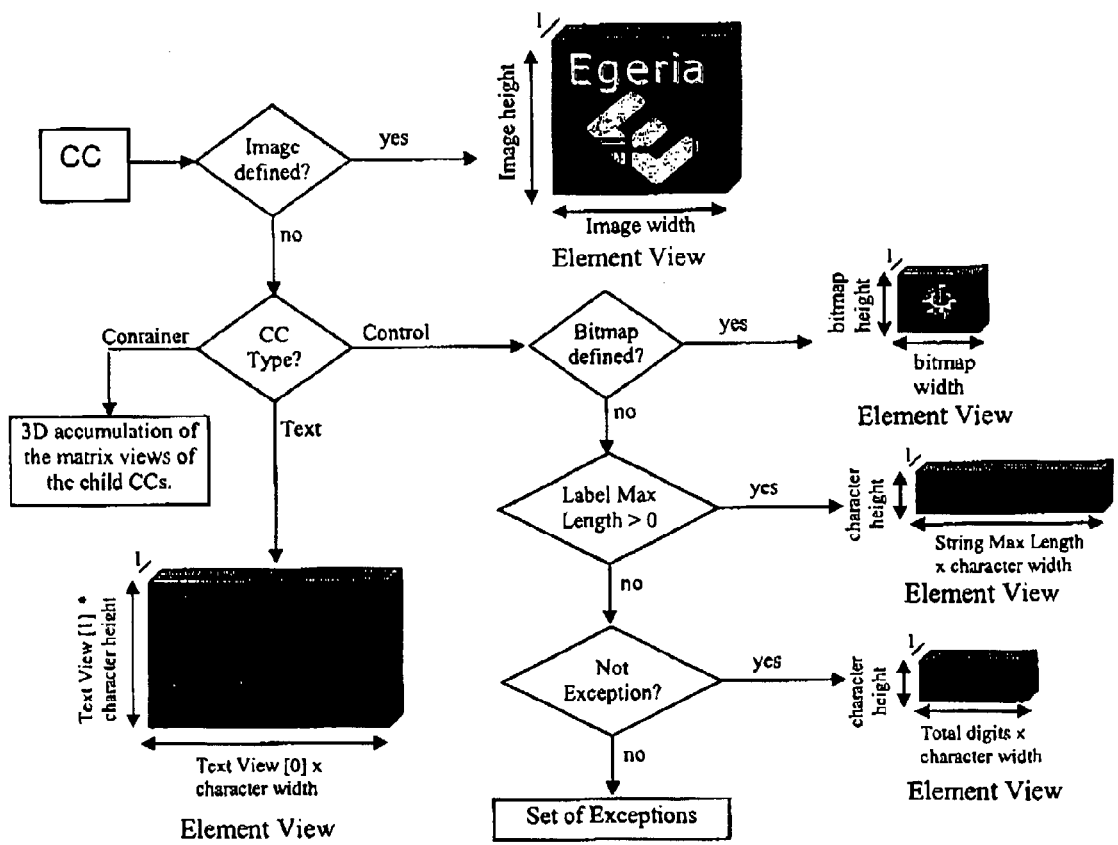
FIG. 20B shows the calculation rules of the element view for all CC types.

The element view of a CC is the 3d-size of one unit in the CC matrix. Its calculation, presented schematically in FIG. 20B, depends on the CC type (Control, Text or Container), except when images are defined in the CC (if their width and height are greater than 0). In this case:

Element view={image width, image height, 1}

For Control CCs, the element view corresponds to the view of a single state. By convention, the element of a Control CC is only the current selection state, not the whole or a part of the States Matrix. Therefore, the element view is one state view. Since a state can be labelled or unlabeled, there are two ways to calculate the Control CC element view.

If State Bitmap Size is greater than 0 and the device accepts bitmaps:

Element view={state bitmap width, state bitmap height, 1}

If State Bitmap Size is null and State String Max Length is greater than 0:

Element view={state string max length×character width, character height, 1}

If both State Bitmap Size and State String Max Length are null, a selection is viewed as a state d-coordinate. For all values in the d-coordinate, the maximal number of digits must be calculated. For constant dimensions, the calculation is based on the States Matrix d-size value, but for variable dimensions, the number of digits is 10, based on the maximal long value (2147483648). Since the total digits is the sum of all values number of digits:

Element view={total digits×character width, character height, 1}

There can be exceptions to this rule for some well-defined cases (for instance, constantly 2 unnamed states for a dimension, which is the definition of a switch box, which size can be calculated).

For Text CCs, considering that text view[0] is the first text view value (or 1 if not existing) and text view[1] is the second text view value (or 1 if not existing):

Element view={text view[0]×character width, text view[1]×character height, 1}

For Container CCs, the element view is the 3D accumulation of the matrix views (that must have been previously calculated by using a recursive algorithm parsing the CC tree) of the child CCs across the children direction:

Element view=3dacc(children matrix views, children direction)

Figure 20C:
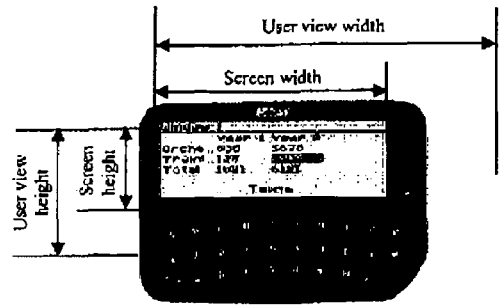
FIG. 20C shows the User View for the Blackberry.

The user view is a 3d-size, expressed in pixels, specifying the logical display, or what is immediately accessible by the end-user. For most devices, it is closely related to the display size. For example, in a 1600×1200 Windows screen, it can simply be {1600, 1200, 1}. However, since Windows computers can hold a lot of memory and consequently, can save much more information than what is displayed on a single screen, and since Windows makes an extensive use of the depth direction, it would be preferable to set it at say {2400, 1800, 4} (9 times bigger than {1600, 1200, 1}). Although the physical screen size still holds {1600, 1200, 1} pixels, any part of the logical display can be shifted into it so the user can view all information. Referring to FIG. 20C, on a black-and-white 132×65 display Blackberry pager with limited RAM, a reasonable user view would be {200, 100, 1} (the depth direction is not scarcely used in the Blackberry compared to more user-friendly environments such as Windows). The user view can be used to limit the number of values that are viewed at a time.

With these provisions, tables filled with a tree of Generic DCs can be programmed for any environment. Most of the programming deal with the same concepts and can be reused from one device to another. Each CC assigned to a Generic DC will be assigned an internal 3D position and 3D range specifying the user View Area within the whole Matrix View. Therefore, each CC must have, for implementation purposes, an internal View Area made of a 3D position and a 3D range. For CCs where values are user-defined, it means that updating a large range of values will in fact update the intersection between the 3D View Area and the update n-dimensioned area (here, the conversion methods stated above must be used to program the update correctly).

Although the invention has been described with reference to certain specific embodiments, various modifications thereof will be apparent to those skilled in the art without departing from the spirit and scope of the invention as outlined in the claims appended hereto.

The embodiment of the invention in which an exclusive property or privilege is claimed are defined as follows:

1. A method of generating displayed elements in a user interface (UI) on a device selected from a plurality of devices, comprising:
   a) providing three conceptual components to represent said displayed elements in said UI, said three conceptual components comprising
      a container component defining frame objects relating to parent objects in common frames in said UI and having a set of child conceptual components defining child elements in said common frames;
      a control component defining control objects used to generate input selections relating to said displayed elements in said UI; and
      a text component defining text entry objects used to process text entries relating to said displayed elements in said UI;
   b) providing a first data structure as a tree providing a representation of said UI, where each node of said tree represents a part of said displayed elements and comprises
      a second data structure for one of said three conceptual components;
      a third data structure for labels used to identify said frame objects, said control objects and said text entry objects;
      a vector parameter containing array data associating said labels to said frame objects, said control objects and said text entry objects;
      a set of directions representing a layout of said displayed elements in said UI and being mapped to each dimension of said vector parameter; and
      a fourth data structure comprising one of:
         a set of child conceptual components if said node is said container component;
         an input selection template, if said node is said control component, that allows a user to perform selections, comprising a label data structure providing selection domain and identifiers; and
         a text field template, if said node is said text component, that allows text to be entered by a user for said element;
   c) rendering said representation for said device to generate native controls used to display said displayed elements of said UI, utilizing
      said array data in said vector parameter to determine
         a size for said first data structure; and
         a size for said frame objects, said control objects and said text entry objects, corresponding to a size of said frame objects of a parent of said container component, if said parent exists, and said vector parameter; and
      in said each node in said tree, its vector parameter, the vector parameters of its parent nodes and its fourth data structure to render its element on said UI for said device; and
   d) rendering said displayed elements on said device using said native controls.

2. The method of generating displayed elements in a user interface as claimed in claim 1, wherein said representation is displayed by pushing instances of said three conceptual components of first data structures onto a stack, and the user is allowed to interact with only the conceptual component at the top of the stack.

3. The method of generating displayed elements in a user interface as claimed in claim 2, wherein said stack has at least two entries and said first data structure at the top of the stack is rendered as a dialog box.

4. The method of generating displayed elements in a user interface as claimed in claim 3, wherein said elements of said UI are represented in a multi-dimensional array associated with said conceptual components.

5. The method of generating displayed elements in a user interface as claimed in claim 4, wherein said third data structure includes a labels matrix including identifiers associated with elements in the array.

6. The method of generating displayed elements in a user interface as claimed in claim 5, wherein the multi-dimensional size of said labels matrix is equal to said vector parameter.

7. The method of generating displayed elements in a user interface as claimed in claim 5, wherein said identifiers are used to display corresponding elements of the user interface.

8. The method of generating displayed elements in a user interface as claimed in claim 7, wherein the multi-dimensional size of said labels matrix is equal to said vector parameter.

9. The method of generating displayed elements in a user interface as claimed in claim 5, wherein said identifiers include text strings.

10. The method of generating displayed elements in a user interface as claimed in claim 5, wherein said identifiers include bitmap images.

11. The method of generating displayed elements in a user interface as claimed in claim 10, wherein said identifiers include text strings.

12. The method of generating displayed elements in a user interface as claimed in claim 4, wherein each element of said frame objects, said control objects or said text entry objects include a binary flag indicative of whether modification of said element of the user interface is permitted.

13. The method of generating displayed elements in a user interface as claimed in claim 4, wherein each element of said frame objects, said control objects or said text entry objects include an image providing an alternative rendering for said each element.

14. The method of generating displayed elements in a user interface as claimed in claim 1, wherein control component provides an interface selected from a group comprising at least: push buttons, list boxes, radio buttons and check boxes.

15. The method of generating displayed elements in a user interface as claimed in claim 1, wherein said rendering said representation to generate native controls comprises utilizing a set of device control processes associated with said device to generate a fifth data structure containing device components mapped from said conceptual components in said tree, said device components indicating which said native controls to generate for said device, said set of device control processes selected to map boundary information related to said conceptual components to graphical mapping boundaries associated with said device.

16. The method of generating displayed elements in a user interface as claimed in claim 15, wherein said rendering said representation comprises traversing said fifth data structure to identify types of native objects related to each of said conceptual components using type information associated with said device provided in said fifth data structure.

17. The method of generating displayed elements in a user interface as claimed in claim 16, wherein said rendering said representation further comprises traversing said fifth data structure in a second instance to determine the layout of objects and to calculate physical boundaries of objects related to containers defined in conceptual components located in said second instance, using said boundary information associated with said device provided in said fifth data structure.

18. The method of generating displayed elements in a user interface as claimed in claim 17, wherein said rendering said representation further comprises traversing said fifth data structure in a third instance to generate a final user interface for said device, objects and a layout for said objects using data from each node in said fifth data structure to determine native component type and position data, using native control information associated with said device provided in said fifth data structure.

19. The method of generating displayed elements in a user interface as claimed in claim 18, wherein for a particular node of said tree its vector parameter defines the number of its labels.

20. The method of generating displayed elements in a user interface as claimed in claim 19, wherein for said particular node, data from its vector parameter is accumulated with data from a parent vector parameter from all of its parent nodes to define sizes of its frame, control or text entry data structures.

21. The method of generating displayed elements in a user interface as claimed in claim 20, wherein said rendering said representation comprises calculating a layout for elements of said UI for said device in a second bottom-up pass utilizing said conceptual components and their related third data structures and their frame, control or text entry data structures to generate said elements for said UI to accumulate the size of components from child nodes into the size of components from parent nodes to the root node.

22. The method of generating displayed elements in a user interface as claimed in claim 21, wherein said rendering said representation further comprises parsing said nodes of said tree in a third pass in a top-down manner to generate selected native controls, lay them out and render them after collecting relevant underlying data to render and lay out said native controls in said first and second passes.

23. The method of generating displayed elements in a user interface as claimed in claim 22, wherein said rendering said representation further comprises repeating said parsing said nodes of said tree as per said third pass to generate arrays of homogeneous selected native controls according to size data provided in vector parameters of said nodes to render multiple native controls each having a type that is uniquely defined by each said node attributes.

24. The method of generating displayed elements in a user interface as claimed in claim 16, wherein said traversing said tree is done in a top-down manner to select which of said native controls to generate.

25. The method of generating displayed elements in a user interface as claimed in claim 24, wherein said rendering said representation further comprises selecting for each particular node of said tree which native controls to generate by referencing a set of said native controls related to said device.

26. The method of generating displayed elements in a user interface as claimed in claim 25, wherein said rendering said representation further comprises selecting for said each particular node which native controls to generate utilizing data of user interface parameters, user interface guidelines, form factors, and characterizations for said UI for said device, wherein said data is specific to a class of devices that includes said device.

27. The method of generating displayed elements in a user interface as claimed in claim 26, wherein said rendering said representation further comprises selecting for said each particular node what said native controls to generate utilizing the types of native controls previously identified from its parent nodes in order for said native controls to fit within their selected frame control.

28. The method of generating displayed elements in a user interface as claimed in claim 27, wherein said rendering said representation further comprises selecting for said each particular node what said native controls to generate utilizing its said vector and data in its third data structure and its frame, control or text entry data structures to select an appropriate native control to process the number of values defined by the sizes of said data structures.

29. The method of generating displayed elements in a user interface as claimed in claim 28, wherein said rendering said representation recursively traverses said fifth data structure to select one device component of said device components according to a state machine having states related to target device native control types.

30. The method of generating displayed elements in a user interface as claimed in claim 29, wherein in said state machine, a previous state before selecting said one device component relates to a frame object type defined by its parent component.

31. The method of generating displayed elements in a user interface as claimed in claim 30, wherein
a new state in said state machine is determined by its previous state and properties of the corresponding conceptual component; and
said new state specifies a native control type that complies with conceptual component settings and a context frame used to embed instances of said new state.

32. The method of generating displayed elements in a user interface as claimed in claim 15, wherein said device components represent multi- dimensional arrays of said displayed elements of said UI.

33. The method of generating displayed elements in a user interface as claimed in claim 15, wherein said boundary information relates to one or more of said vector parameter, conceptual component type, and dimensions.

34. A system for generating displayed elements in a user interface (UI) on a device, comprising:
   electronic memory for storing and updating a plurality of data structures;
   a first data structure of said plurality of data structures, said first data structure being a tree providing a representation of said UI, where each node of said tree represents a part of said displayed elements and comprises
      a second data structure for one of said three conceptual components;
      a third data structure for labels used to identify said frame objects, said control objects and said text entry objects;
      a vector parameter containing array data associating said labels to said frame objects, said control objects and said text entry objects;
      a set of directions representing a layout of said displayed elements in said UI and being mapped to each dimension of said vector parameter; and
      a fourth data structure comprising one of:
         a set of child conceptual components if said node is said container component;
         an input selection template, if said node is said control component, that allows a user to perform selections, comprising a label data structure providing selection domain and identifiers; and
         a text field template, if said node is said text component, that allows text to be entered by a user for said element;
   a processor for accessing said electronic memory and executing instructions;
   a display; and
   a rendering engine providing instructions to said processor for rendering said representation for said device to generate native controls used to generate said displayed elements of said UI on said display, said rendering engine providing instructions to said processor to render said displayed elements on said display using said native controls, said rendering engine utilizing said array data in said vector parameter to determine
      a size for said first data structure;
      a size for said frame objects, said control objects and said text entry objects, corresponding to a size of said frame objects of a parent of said container component, if said parent exists, and said vector parameter; and in said each node in said tree, its vector parameter, the vector parameters of its parent nodes and its fourth data structure to render its element on said UI for said device.

35. The system for generating displayed elements in a user interface (UI) on a device as claimed in claim 34, wherein said rendering engine utilizes a set of device control processes associated with said device to generate a fifth data structure containing device components mapped from said conceptual components in said tree, said device components indicating which said native controls to generate for said device, said set of device control processes selected to map boundary information related to said conceptual components to graphical mapping boundaries associated with said device.

* * * * *